US012747393B2

(12) United States Patent
Zhou et al.

(10) Patent No.: US 12,747,393 B2
(45) Date of Patent: Sep. 29, 2026

(54) LIQUID CRYSTAL COMPOSITION AND DISPLAY PANEL

(71) Applicant: TCL CHINA STAR OPTOELECTRONICS TECHNOLOGY CO., LTD., Shenzhen (CN)

(72) Inventors: Hao Zhou, Shenzhen (CN); Xiao Liu, Shenzhen (CN); Ji Li, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/017,370

(22) Filed: Jan. 10, 2025

(65) Prior Publication Data

US 2026/0125600 A1 May 7, 2026

(30) Foreign Application Priority Data

Nov. 6, 2024 (CN) ......................... 202411579665.2

(51) Int. Cl.
*C09K 19/34* (2006.01)
*C09K 19/12* (2006.01)
(Continued)

(52) U.S. Cl.
CPC .......... *C09K 19/3402* (2013.01); *C09K 19/12* (2013.01); *C09K 19/3003* (2013.01);
(Continued)

(58) Field of Classification Search
CPC ..................................................... C09K 19/34
See application file for complete search history.

(56) References Cited

U.S. PATENT DOCUMENTS

2019/0121178 A1* 4/2019 Park .................. G02F 1/133617

* cited by examiner

*Primary Examiner* — Chanceity N Robinson
(74) *Attorney, Agent, or Firm* — PV IP PC; Christopher S. Ruprecht; Wei Te Chung

(57) ABSTRACT

A liquid crystal composition and a display panel are provided herein. The liquid crystal composition includes a liquid crystal compound, a self-alignment compound, and a first polymerizable compound. The self-alignment compound is represented by the following formula I, and the first polymerizable compound is represented by the following formula II-1:

I

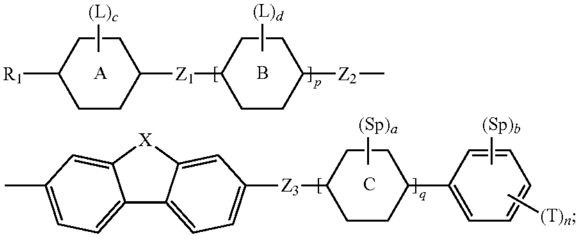

II-1

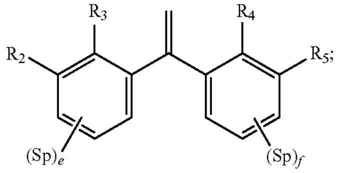

The display panel includes a first substrate; a second substrate disposed opposite to the first substrate; a liquid crystal layer disposed between the first substrate and the second substrate; an alignment layer disposed (Continued)

at least on a side of the first substrate close to the liquid crystal layer, where the alignment layer comprises a polymerization product of the self-alignment compound and the first polymerizable compound in the liquid crystal composition.

20 Claims, 1 Drawing Sheet

(51) Int. Cl.
*C09K 19/30* (2006.01)
*C09K 19/54* (2006.01)
*G02F 1/1337* (2006.01)

(52) U.S. Cl.
CPC ........ *C09K 19/3491* (2013.01); *C09K 19/542* (2013.01); *G02F 1/133788* (2013.01); *C09K 2019/122* (2013.01); *C09K 2019/3009* (2013.01); *C09K 2019/3425* (2013.01); *C09K 2019/548* (2013.01)

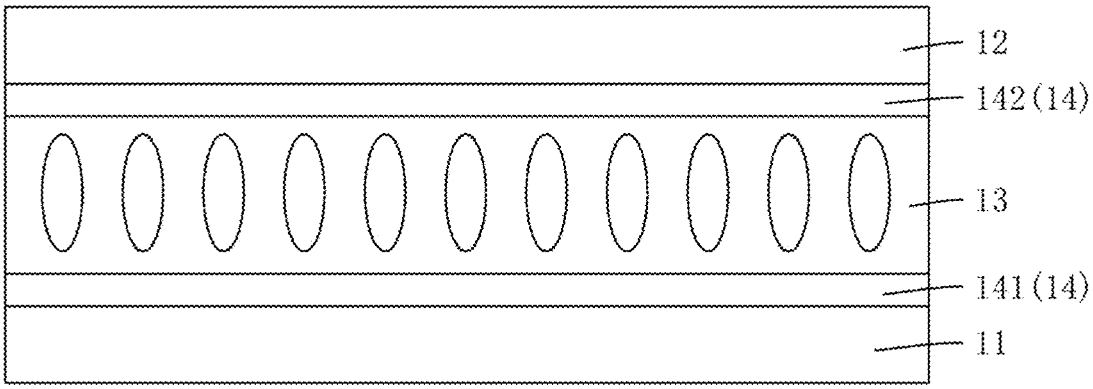
12
142(14)
13
141(14)
11

LIQUID CRYSTAL COMPOSITION AND DISPLAY PANEL

CROSS-REFERENCE TO RELATED APPLICATION

This application claims the priority to and benefits of Chinese Patent Application No. 202411579665.2, filed on Nov. 6, 2024, the disclosure of which is incorporated herein by reference in its entirety.

TECHNICAL FIELD

The disclosure relates to the field of display, and in particular, to a liquid crystal composition and a display panel.

BACKGROUND

Liquid crystal materials are widely used in various display devices such as mobile phones, televisions, and computers. Liquid crystals in a thin film transistor liquid crystal display panel (TFT-LCD) function as "light valves", and the liquid crystals adjust the brightness of a display device by controlling the transmittance of backlight of the display device.

A traditional vertical alignment (VA) liquid crystal display panel is composed of a thin film transistor (TFT) substrate, a color filter (CF) substrate, and polyimide (PI) alignment layers and liquid crystals disposed between the TFT substrate and the CF substrate, in which vertical alignments of liquid crystal molecules are achieved through the PI alignment layers. When the voltage applied on the display device including the VA liquid crystal display panel that displays in a VA mode is 0 V, long axis directions of the liquid crystal molecules are perpendicular to the TFT substrate and the CF substrate. After passing through a polarizer disposed on the TFT substrate, natural light forms linearly polarized light. Since a polarization state and a polarization direction of the linearly polarized light cannot be changed by the liquid crystal molecules, the linearly polarized light will be absorbed by a polarizer disposed on the CF substrate, that is, incident light perpendicular to the TFT substrate and the CF substrate cannot pass through the display device, resulting in a dark display effect of the display device, and therefore, the display device in the VA mode has negative dielectric anisotropy (Δε) and high contrast.

At present, the display device including the liquid crystal display panel have a plurality of film structures that require a large number of manufacturing processes. Therefore, liquid crystal materials suitable for reducing manufacturing processes may need to be developed.

SUMMARY

Embodiments of the disclosure provide a liquid crystal composition including a liquid crystal compound, a self-alignment compound, and a polymerizable compound including a first polymerizable compound, the self-alignment compound is represented by the following formula I, and the first polymerizable compound is represented by the following formula II-1;

I

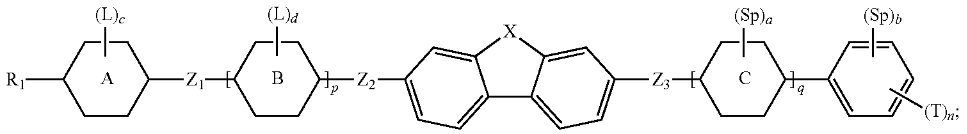

II-1

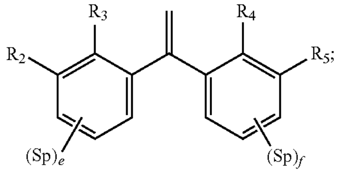

in which $R_1$ is selected from —H, an alkyl group having 1-10 carbon atoms, an alkoxy group having 1-10 carbon atoms, an alkenyl group having 2-10 carbon atoms, an alkenyloxy group having 2-10 carbon atoms, a cycloalkyl group having 3-10 carbon atoms, or an aromatic group having 6-10 ring atoms; one or more $—CH_2—$ groups not connected together in $R_1$ are not replaced, or, one or more $—CH_2—$ groups not connected together in $R_1$ are independently replaced by —O—, —S—, —CO—, —C(O)O—, —OC(O)—, —OC(O)O—, $—CH_2CH_2—$, $—(CH_2)_3—$, $—CH_2O—$, $—OCH_2—$, —CH═CH—, or —C≡C—; and one or more H atoms in $R_1$ are unsubstituted, or, one or more H atoms in $R_1$ are independently substituted by F, Cl, Br, or I;

$Z_1$, $Z_2$, and $Z_3$ are independently selected from a single bond, —O—, —S—, —CO—, —C(O)O—, —OC(O)—, $—CF_2O—$, $—OCF_2—$, $—CH_2CH_2—$, $—CH_2O—$, $—OCH_2—$, —CH═CH—, an alkylidene group having 1-10 carbon atoms, an alkenylidene group having 2-10 carbon atoms, or an alkynyl group having 2-10 carbon atoms; one or more $—CH_2—$ groups not connected together in $Z_1$, $Z_2$, and $Z_3$ are not replaced or, one or more —$CH_2$— groups not connected together in $Z_1$, $Z_2$, and $Z_3$ are independently replaced by —O—, —S—, —CO—, —C(O)O—, —OC(O)—, —$CF_2O$—, —$OCF_2$—, —$CH_2CH_2$—, —$CH_2O$—, —$OCH_2$—, —CH═CH—, or —C≡C—; and one or more H atoms in $Z_1$, $Z_2$, and $Z_3$ are unsubstituted, or, one or more H atoms in $Z_1$, $Z_2$, and $Z_3$ are independently substituted by F, Cl, Br, or I;

X is selected from a single bond, —O—, —S—, —CO—, —$CH_2$—, or —$CF_2$—;

L is independently selected from —H, —F, —Cl, —$CF_3$, -Sp, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, an alkynyloxy having 2-10 carbon atoms, a cycloalkyl group having 3-10 carbon atoms, or an aromatic group having 6-10 ring atoms; one or more —$CH_2$— groups not connected together in L are replaced, one or more —$CH_2$— groups not connected together in L are independently replaced by —O—, —S—, —CO—, —C(O)O—, —OC(O)—, —OC(O)O—, —$CH_2CH_2$—, —$(CH_2)_3$—, —$CH_2O$—, —$OCH_2$—, —CH═CH—, or —C≡C—; and one or more H atoms in L are unsubstituted, or, one or more H atoms in L are independently substituted by F, Cl, Br, or I;

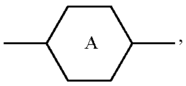, 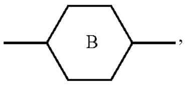, and

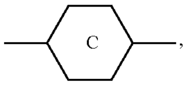, are independently selected from

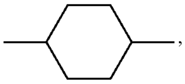, 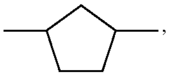, or

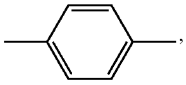, in which one or more —$CH_2$— groups not connected together in

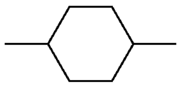 and 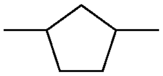

are not replaced or independently replaced by —O—;

Sp is independently selected from an ether group, an alkyl group, an alkoxy group, an alkenyl group, an alkenyloxy group, or a polymerizable group, and at least one Sp is a polymerizable group;

T is a group containing a hydroxyl group;

one or more H atoms in benzene rings of the formula I are unsubstituted, or, one or more H atoms in benzene rings of the formula I are independently substituted by —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms;

$R_2$, $R_3$, $R_4$, and $R_5$ are independently selected from —H, —F, —$CF_3$, an alkyl group having 1-5 carbon atoms, an alkoxy group having 1-5 carbon atoms, an alkenyl group having 2-5 carbon atoms, or an alkenyloxy group having 2-5 carbon atoms; and one or more H groups in $R_2$, $R_3$, $R_4$, and $R_5$ are unsubstituted, or, one or more H atoms in $R_2$, $R_3$, $R_4$, and $R_5$ are independently substituted by F, Cl, Br, or I;

n is selected from 1, 2, or 3;

a, b, c, and d are independently selected from 0, 1, 2, or 3, and a sum of a and b is greater than or equal to 1;

p and q are independently selected from 0, 1, or 2; and e and f are independently selected from 0, 1, or 2, and a sum of e and f is greater than or equal to 1.

Embodiments of the disclosure further provide a display panel, including:

a first substrate;

a second substrate disposed opposite to the first substrate;

a liquid crystal layer disposed between the first substrate and the second substrate; and an alignment layer disposed at least on a side of the first substrate close to the liquid crystal layer, in which the alignment layer is prepared by the polymerization of the self-alignment compound and the polymerizable compound in the liquid crystal composition as described above.

BRIEF DESCRIPTION OF THE DRAWINGS

In order to explain technical solutions in embodiments of the disclosure more clearly, the following will briefly introduce the drawings needed to be used in description of the embodiments. Apparently, the drawings in the following description are only some embodiments of the disclosure. For ordinary skilled in the art, other drawings can be obtained from these drawings without paying creative effort.

In order to understand the disclosure and beneficial effects thereof more completely, the following will be described in combination with the drawings. In the following description, the same reference characters indicate the same elements.

FIG. 1 is a schematic structural diagram of a display panel according to some embodiments of the disclosure.

REFERENCE CHARACTERS

11, first substrate; 12, second substrate; 13, liquid crystal layer; 14, alignment layer; 141, first alignment layer; and 142, second alignment layer.

DETAILED DESCRIPTION

The following will provide detailed descriptions of the disclosure in conjunction with the drawings. It should be understood that the embodiments described herein are for the purpose of explaining the disclosure and are not intended to limit the disclosure. The order of description of the following embodiments below is not intended to limit the preferred order of the embodiments.

Unless otherwise specified, all terms (including technical and scientific terms) used herein have the same meanings as understood by an ordinary person skill in the art to which the inventive concept of the disclosure belongs. It can be understood that terms, such as those defined in commonly used dictionaries, should be construed to have the meanings consistent with their meanings in related art and the disclosure, and will not be construed in an idealized or overly formal sense unless clearly so defined herein.

In the disclosure, an aryl group, an aromatic group, and an aromatic ring system have the same meaning and may be interchanged.

In the disclosure, a heteroaryl group, a heteroaromatic group, and a heteroaromatic ring system have the same meaning and may be interchanged.

In the disclosure, a cycloalkyl group and a cyclic alkyl group have the same meaning and may be interchanged.

In the disclosure, "substituted" means that a hydrogen atom in a group to be substituted is substituted by a substituent group.

In the disclosure, a same substituent group at different substituent site may be independently selected from the same group or different groups. For example, if a formula includes multiple R groups, each of the R groups may be independently selected from the same group or different groups.

In the disclosure, "number of ring atoms" refers to a number of atoms constituting a ring of a structural compound obtained by atomic bonding, for example, a monocyclic compound, a fused ring compound, a cross-linked compound, a carbon ring compound, or a heterocyclic compound. In a ring substituted by a substituent group, the atoms contained in the substituent group are not included in the atoms forming the ring. The same applies to "number of ring atoms" described below unless otherwise specified. For example, the number of ring atoms in benzene is 6, the number of ring atoms in naphthalene is 10, and the number of ring atoms in thiophene is 5.

In the disclosure, "substituted or unsubstituted" means that a defined group may be substituted or not be substituted. When the defined group is substituted, it can be understood that the defined group may be substituted by one or more substituent R groups. The R groups are independently selected from, but not limited to, a deuterium atom, a cyanoyl group, an isocyanoyl group, a nitro group, a halogen atom (for example, F, Cl, Br, or I), an alkyl group having 1-20 carbon atoms, a heterocyclic group having 3-20 ring atoms, an aromatic group having 6-20 ring atoms, a heteroaromatic group having 5-20 ring atoms, —NR'R", a silyl group, a carbonyl group, an alkoxycarbonyl group, an aryloxycarbonyl group, an aminoformyl group, a haloformyl group, a formyl group, an isocyanate group, a thiocyanate group, an isothiocyanate group, a hydroxyl group, or a trifluoromethyl group, and the groups may further be substituted by acceptable substituent groups in the art. Understandably, R' and R" in the NR'R" are independently selected from, but not limited to, H, a deuterium atom, a cyanoyl group, an isocyanoyl group, a nitro group, a halogen atom (for example, F, Cl, Br, or I), an alkyl group having 1-10 carbon atoms, a heterocyclic group having 3-20 ring atoms, an aromatic group having 6-20 ring atoms, or a heteroaromatic group having 5-20 ring atoms. In some embodiments, R is selected from, but not limited to, a deuterium atom, a cyanoyl group, an isocyanoyl group, a nitro group, a halogen atom (for example, F, Cl, Br, or I), an alkyl group having 1-10 carbon atoms, a heterocyclic group having 3-10 ring atoms, an aromatic group having 6-20 ring atoms, a heteroaromatic group having 5-20 ring atoms, a silyl group, a carbonyl group, an alkoxycarbonyl group, an aryloxycarbonyl group, an aminoformyl group, a haloformyl group, a formyl group, an isocyanate group, a thiocyanate group, an isothiocyanate group, a hydroxyl group, or a trifluoromethyl group, and the groups may further be substituted by acceptable substituent groups in the art.

In the disclosure, "an aryl group or an aromatic group" refers to an aromatic hydrocarbon group derived from a basis of an aromatic ring compound removing one hydrogen atom. The aromatic hydrocarbon group may be a monocyclic aryl group, a fused ring aryl group, or a polycyclic aryl group. For a polycyclic ring type, at least one ring is an aromatic ring system. For example, "a substituted or unsubstituted aryl group having 6-40 ring atoms" refers to an aryl group having 6-40 ring atoms, a substituted or unsubstituted aryl group having 6-30 ring atoms, a substituted or unsubstituted aryl group having 6-18 ring atoms, or a substituted or unsubstituted aryl group having 6-14 ring atoms, and the aryl group is optionally further substituted. Suitable examples of the aryl group or the aromatic group include, but not limited to, a phenyl group, a biphenyl group, a triphenyl group, a naphthyl group, an anthracyl group, a phenanthryl group, a fluoranthenyl group, a triphenylene group, a pyrenyl group, a perylene group, a tetraphenyl group, a fluorenyl group, an acenaphthenyl group, and derivatives thereof. Understandably, multiple aryl groups may further be disconnected by short non-aromatic units (for example, a non-hydrogenium atom contenting less than 10%, such as C, N, or O). In some embodiments, a 9,9-diarylfluorene group, a triarylamine group, or a diaryl ether system may be further included in the definition of the aryl group.

In the disclosure, "a heteroaryl group or a heteroaromatic group" refers to a basis of an aryl group with at least one carbon atom replaced by a non-carbon atom, and the non-carbon atom may be N, O, S, or the like. For example, "a substituted or unsubstituted heteroaryl group having 5-40 ring atoms" refers to a heteroaryl group having 5-40 ring atoms, a substituted or unsubstituted heteroaryl group having 6-30 ring atoms, a substituted or unsubstituted heteroaryl group having 6-18 ring atoms, or a substituted or unsubstituted heteroaryl group having 6-14 ring atoms, and the heteroaryl group is optionally further substituted. Suitable examples of the heteroaryl group or the heteroaromatic group include, but not limited to, a thienyl group, a furyl group, a pyrrolyl group, an imidazolyl group, a diazole group, a triazole group, a pyridinyl group, a bipyridyl group, a pyrimidinyl group, a triazinyl group, an acridinyl group, a pyridazinyl group, a pyrazinyl group, a quinolinyl group, an isoquinolinyl group, a quinazolinyl group, a quinoxalinyl group, a phthalazinyl group, a pyridino pyrimidinyl group, a pyridino pyrazinyl group, a benzothiophenyl group, a benzofuranyl group, an indolyl group, a pyrrolo imidazolyl group, a pyrrolopyrrolyl group, a thiophenopyrrolyl group, a thiophenothiophenyl group, a furanopyrrolyl group, a furanofuranyl group, a thiophenofuranyl group, a benzoisoxazolyl group, a benzoisothiazolyl group, a benzimidazolyl group, an ortho-diazonaphthalyl group, a phenanthridinyl group, a berberine group, a quinazolinketone group, a dibenzothiophenyl group, a dibenzofuranyl group, a carbazolyl group, and derivatives thereof.

In the disclosure, "an alkyl group" refers to a linear alkyl group, a branched alkyl group, and/or a cyclic aliphatic hydrocarbon group. The number of carbon atoms in the alkyl group may range from 1 to 50, 1 to 30, 1 to 20, 1 to 10, or 1 to 6. The term having the alkyl group, such as "a $C_{1-9}$ alkyl group", refers to an alkyl group having 1 to 9 carbon atoms. The $C_{1-9}$ alkyl group is independently selected from a $C_1$ alkyl group, a $C_2$ alkyl group, a $C_3$ alkyl group, a $C_4$ alkyl group, a $C_5$ alkyl group, a $C_6$ alkyl group, a $C_7$ alkyl group, a $C_8$ alkyl group, or a $C_9$ alkyl group at each occurrence.

Examples of the alkyl group include, but not limited to, methyl, ethyl, n-propyl, isopropyl, n-butyl, sec-butyl, tert-butyl, isobutyl, 2-ethylbutyl, 3,3-dimethylbutyl, n-pentyl, isopentyl, neopentyl, tert-pentyl, cyclopentyl, 1-methylpentyl, 3-methylpentyl, 2-ethylpentyl, 4-methyl-2-pentyl, n-hexyl, 1-methylhexyl, 2-ethylhexyl, 2-butyhexyl, cyclohexyl, 4-methylcyclohexyl, 4-tert-butylcyclohexyl, n-heptyl, 1-methylheptyl, 2,2-dimethylheptyl, 2-ethylheptyl, 2-butyl-heptyl, n-octyl, tert-octyl, 2-ethyloctyl, 2-butyl-octyl, 2-hexyl-octyl, 3,7-dimethyloctyl, cyclooctyl, n-nonyl, n-decanyl, an adamantine group, 2-ethyldecyl, 2-butyldecyl 2-hexyldecyl, 2-octyldecyl, n-undecyl, n-dodecyl, 2-ethyldodecyl 2-butyldodecyl, 2-hexyldodecyl, 2-octyldodecyl, n-tridecyl, n-tetradecyl, n-pentadecyl, n-hexadecyl, 2-ethylhexadecyl, 2-butylhexadecyl, 2-hexylhexadecyl, 2-octylhexadecyl, n-heptadecyl, n-octadecyl, n-nonadecyl, n-eicosyl, 2-ethyleicosyl, 2-butyeicosyl, 2-hexyleicosyl, 2-octyleicosyl, n-heneicosyl, n-docosyl, n-tricosyl, n-tetracosyl, n-pentacosyl, n-hexacosyl, n-heptacosyl, n-octacosyl, n-nonacosyl, n-triacontyl, and the like.

In the disclosure, abbreviations of substituent groups are as follows: normal (n), secondary (see), iso (i), tertiary (tert), ortho (o), meta (m), para (p), methyl (Me), ethyl (Et), propyl (Pr), butyl (Bu), n-amyl (Am), hexyl (Hx), and cyclohexyl (Cy). and a tert-butoxy group (—O—C($CH_3$)$_3$ or —OtBu).

In the disclosure, "an amino group" refers to a derivative of the amine and has a structural feature of a group represented by formula —N(X)$_2$, in which X is independently selected from —H, a substituted or unsubstituted alkyl group, a substituted or unsubstituted cycloalkyl group, a substituted or unsubstituted heterocyclic group, or the like. Examples of the amino group include, but not limited to, —$NH_2$, —N(alkyl)$_2$, —NH(alkyl), —N(cycloalkyl)$_2$, —NH (cycloalkyl), —N(heterocyclic)$_2$, —NH(heterocyclic), —N(aryl)$_2$, —NH(aryl), —N(alkyl)(aryl), —N(alkyl)(heterocyclic), —N(cycloalkyl)(heterocyclic), —N(aryl)(heteroaryl), —N(alkyl)(heteroaryl), and the like.

In the disclosure, "a cycloalkyl group" or "a cyclic alkyl group" refers to a monovalent group having one or more saturated rings in which all ring atoms are carbon atoms. "Alkyl groups" in the "cycloalkyl group" and the "cyclic alkyl group" have the same meaning as the "alkyl group" as defined above.

In the disclosure, "a heterocyclic group" or "heterocyclic" refers to a non-aromatic cyclic group that is fully saturated or partially unsaturated. The non-aromatic cyclic group has one or more heteroatoms, such as an oxygen atom, a sulfur atom, a silicon atom, or a nitrogen atom, in which the nitrogen atom and the sulfur atom are optionally oxidized and the nitrogen atom is optionally quaternized. In some embodiments, the heterocyclic group is connected to any atom or any carbon atom in a ring or a ring system, and the heterocyclic group is unsubstituted or substituted by one or more aryl groups as described above.

In the disclosure, unless otherwise specified, a hydroxyl group refers to —OH, a carboxyl group refers to —COOH, a carbonyl group refers to —C(═O)—, an amino group refers to —$NH_2$, a formyl group refers to —C(═O)H, a haloformyl group refers to —C(═O)Z (Z refers to a halogen atom, such as F, Cl, Br or I), a carbamoyl group refers to —C(═O)$NH_2$, an isocyanate group refers to —NCO, and an isothiocyanate group refers to —NCS.

In the disclosure, "an alkoxy group" refers to a group having a structure of "—O-alkyl", that is, the alkyl group as defined above is connected to other groups through an oxygen atom to form the alkoxy group. Suitable examples of the alkoxy group include, but not limited to, a methoxy group (—O—$CH_3$ or —OMe), an ethoxy group (—O—$CH_2CH_3$ or —OEt), and a tert-butoxy group (—O—C($CH_3$)$_3$ or —OtBu).

In the disclosure, "*" connected to a single bond indicates a linking site or a fused site.

In the disclosure, when a linking site in a group is not specified, it means that any of connectable sites in the group may be selected as the linking site.

In the disclosure, when a fused site in a group is not specified, it means that any of fusible sites in the group may be selected as the fused site. For example, two or more adjacent sites in the group form a fused site.

In the disclosure, when there are more than one substituent groups with the same symbol on the same group, the substituent groups may be the same or different. For example, in formula

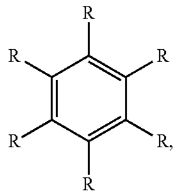

six R groups in a benzene ring may be the same or different.

In the disclosure, a single bond connected to a substituent group and penetrated a corresponding ring indicates that the substituent group may be connected to any site of the ring. For example,

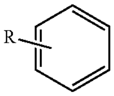

means that R may be connected to any substituent site of the benzene ring, and

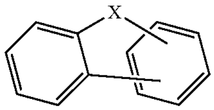

means that

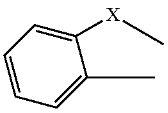

may be connected to any substituent site of

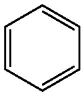

to form two rings connected to each other.

In the disclosure, "adjacent two groups" refer to two groups absent of substitutable sites between the two groups.

In the disclosure, "adjacent two $R_1$, adjacent two $R_3$, or adjacent two $R_5$ form a ring with each other" indicates that adjacent two $R_1$, adjacent two $R_3$, or adjacent two $R_5$ are connected to each other to form a ring system. In some embodiments, the ring system is selected from an aliphatic hydrocarbon ring, an aliphatic heterocyclic ring, an aromatic hydrocarbon ring, or an aromatic heterocyclic ring. For example, the ring system is

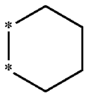, 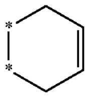, or 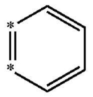.

In the disclosure, one or more end groups in a group are not replaced, or one or more end groups in the group are independently replaced by a substituent group, indicating that, one or more end groups in a group are not replaced at each occurrence, or one or more end groups in the group are independently replaced by a substituent group at each occurrence. For example, one or more end groups in R are not replaced, or, one or more end groups in R are independently replaced by —CN or —$CF_3$, indicating that, one or more end groups in R are not replaced at each occurrence, or, one or more end groups in R are independently replaced by —CN or —$CF_3$ at each occurrence.

In the disclosure, one or more H atoms in a group are unsubstituted, or one or more H atoms in the group are independently substituted by a substituent group, indicating that, one or more H atoms in a group are unsubstituted at each occurrence, or one or more H atoms in the group are independently substituted by a substituent group at each occurrence. For example, one or more H atoms in R are unsubstituted, or, one or more H atoms in R are independently substituted by F, Cl, Br, or I, indicating that, one or more H atoms in R are unsubstituted at each occurrence, or, one or more H atoms in R are independently substituted by F, Cl, Br, or I at each occurrence.

In the disclosure, one or more —$CH_2$— groups in a group are not replaced, or one or more —$CH_2$— groups in the group are independently replaced by a substituent group, indicating that, one or more —$CH_2$— groups in a group are not replaced at each occurrence, or one or more —$CH_2$— groups in the group are independently replaced by a substituent group at each occurrence. For example, one or more —$CH_2$— groups in R are not replaced, or, one or more —$CH_2$— groups in R are independently replaced by —O—, —S—, —CO—, —C(O)O—, —OC(O)—, —OC(O)O—, —$CH_2CH_2$—, —$(CH_2)_3$—, —$CH_2O$—, —$OCH_2$—, —CH═CH—, or —C≡C—, indicating that, one or more —$CH_2$— groups in R are not replaced at each occurrence, or, one or more —$CH_2$— groups in R are independently replaced by —O—, —S—, —CO—, —C(O)O—, —OC(O)—, —OC(O)O—, —$CH_2CH_2$—, —$(CH_2)_3$—, —$CH_2O$—, —$OCH_2$—, —CH═CH—, or —C≡C— at each occurrence.

Some embodiments of the disclosure provide a liquid crystal composition, the liquid crystal composition includes a liquid crystal compound, a self-alignment compound, and a polymerizable compound that includes a first polymerizable compound. The self-alignment compound is represented by the following formula I, and the first polymerizable compound is represented by the following formula II-1:

I

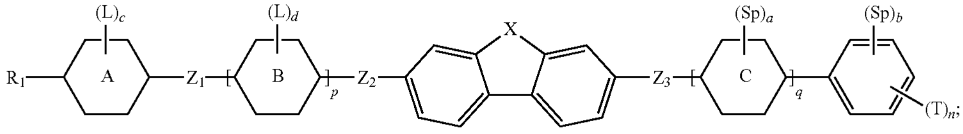

II-1

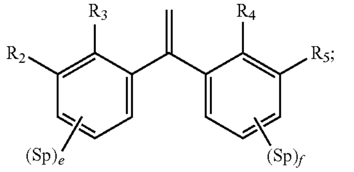

in which $R_1$ is selected from —H, an alkyl group having 1-10 carbon atoms, an alkoxy group having 1-10 carbon atoms, an alkenyl group having 2-10 carbon atoms, an alkenyloxy group having 2-10 carbon atoms, a cycloalkyl group having 3-10 carbon atoms, or an aromatic group having 6-10 ring atoms; one or more —$CH_2$— groups not connected together in $R_1$ are not replaced, or, one or more —$CH_2$— groups not connected together in $R_1$ are independently replaced by —O—, —S—, —CO—, —C(O)O—, —OC(O)—, —OC(O)O—, —$CH_2CH_2$—, —$(CH_2)_3$—, —$CH_2O$—, —$OCH_2$—, —CH═CH—, or —C≡C—; and one or more H atoms in $R_1$ are unsubstituted, or, one or more H atoms in $R_1$ are independently substituted by F, Cl, Br, or I;

$Z_1$, $Z_2$, and $Z_3$ are independently selected from a single bond, —O—, —S—, —CO—, —C(O)O—, —OC(O)—, —$CF_2O$—, —$OCF_2$—, —$CH_2CH_2$—, —$CH_2O$—, —$OCH_2$—, —CH═CH—, an alkylidene group having 1-10 carbon atoms, an alkenylidene group having 2-10 carbon atoms, or an alkynyl group having 2-10 carbon atoms; one or more —$CH_2$— groups not connected together in $Z_1$, $Z_2$, and $Z_3$ are not replaced or, one or more —$CH_2$— groups not connected together in $Z_1$, $Z_2$, and $Z_3$ are independently replaced by —O—, —S—, —CO—, —C(O)O—, —OC(O)—, —$CF_2O$—, —$OCF_2$—, —$CH_2CH_2$—, —$CH_2O$—, —$OCH_2$—, —CH═CH—, or —C≡C—; and one or more H atoms in $Z_1$, $Z_2$, and $Z_3$ are unsubstituted, or, one or more H atoms in $Z_1$, $Z_2$, and $Z_3$ are independently substituted by F, Cl, Br, or I;

X is selected from a single bond, —O—, —S—, —CO—, —$CH_2$—, or —$CF_2$—;

L is independently selected from —H, —F, —Cl, —$CF_3$, -Sp, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, an alkynyloxy having 2-10 carbon atoms, a cycloalkyl group having 3-10 carbon atoms, or an aromatic group having 6-10 ring atoms; one or more —$CH_2$— groups not connected together in L are replaced, one or more —$CH_2$— groups not connected together in L are independently replaced by —O—, —S—, —CO—, —C(O)O—, —OC(O)—, —OC(O)O—, —$CH_2CH_2$—, —$(CH_2)_3$—, —$CH_2O$—, —$OCH_2$—, —CH═CH—, or —C≡C—; and one or more H atoms in L are unsubstituted, or, one or more H atoms in L are independently substituted by F, Cl, Br, or I;

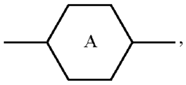, 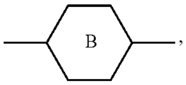, and

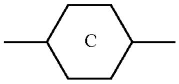

are independently selected from

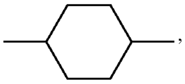, 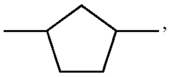, or

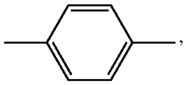, in which one or more —$CH_2$— groups not connected together in

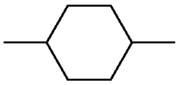 and 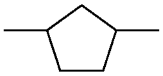

are not replaced or independently replaced by —O—;

Sp is independently selected from an ether group, an alkyl group, an alkoxy group, an alkenyl group, an alkenyloxy group, or a polymerizable group, and at least one Sp is a polymerizable group;

T is a group containing a hydroxyl group;

one or more H atoms in benzene rings of the formula I are unsubstituted, or, one or more H atoms in benzene rings of the formula I are independently substituted by —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms;

$R_2$, $R_3$, $R_4$, and $R_5$ are independently selected from —H, —F, —$CF_3$, an alkyl group having 1-5 carbon atoms, an alkoxy group having 1-5 carbon atoms, an alkenyl group having 2-5 carbon atoms, or an alkenyloxy group having 2-5 carbon atoms; and one or more H groups in $R_2$, $R_3$, $R_4$, and $R_5$ are unsubstituted, or, one or more H atoms in $R_2$, $R_3$, $R_4$, and $R_5$ are independently substituted by F, Cl, Br, or I;

n is selected from 1, 2, or 3;

a, b, c, and d are independently selected from 0, 1, 2, or 3, and a sum of a and b is greater than or equal to 1;

p and q are independently selected from 0, 1, or 2; and e and f are independently selected from 0, 1, or 2, and a sum of e and f is greater than or equal to 1.

In the embodiments of the disclosure, by providing the liquid crystal composition including the self-alignment compound represented by formula I and the first polymerizable compound represented by formula II-1, when the liquid crystal composition is placed between two substrates, the self-alignment compound and the first polymerizable compound undergo polymerization reaction under ultraviolet light irradiation, so as to form a polymer layer on surfaces of the substrates. Moreover, the rigid chain functional groups in the self-alignment compound may function as stereo barriers perpendicular to the substrates, so as to guide the liquid crystal molecules to arrange in a direction perpendicular to the substrates, achieving self-aligning function of the liquid crystal molecules, omitting the preparation of PI alignment layers, reducing the manufacturing processes of the display panel, and reducing the manufacturing cost of the display panel. In addition, in the first polymerizable compound represented by formula II-1, vinyl is connected between two benzene rings. Since the vinyl can disrupt the electronic cloud structure of the benzene rings that is the main chain structure of the first polymerizable compound, the reaction activity decreases and the reaction rate slows down during the polymerization reaction of the first polymerizable compound under ultraviolet light irradiation (e.g. wavelength λ of 313 nm), reducing the formation rate of the pre-tilt angle of liquid crystal molecules during the alignment process and improving the uniformity of light irradiation.

In the disclosure, T is a functional group that anchors to the substrates, and T contains a hydroxyl group for forming hydrogen bonds with the substrates, so that the self-alignment compound anchors to the surfaces of the substrates.

In some embodiments, T is represented by the following formula (1):

(1)

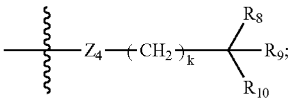

in which $R_8$, $R_9$, and $R_{10}$ are independently selected from —H, —OH, —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms; one or more end groups in $R_8$, $R_9$, and $R_{10}$ are independently replaced by —OH, —CN, or —$CF_3$, and at least end group in $R_8$, $R_9$, and $R_{10}$ is —OH; one or more —$CH_2$— groups in $R_8$, $R_9$, and $R_{10}$ are not replaced, or, one or more —$CH_2$— groups in $R_8$, $R_9$, and $R_{10}$ are independently replaced by —O—, —S—, —CO—, —C(O)O—, —OC(O)—, —$CF_2O$—, —$OCF_2$—, —$CH_2CH_2$—, —$CH_2O$—, —$OCH_2$—, —CH═CH—, or —C≡C—, and heteroatoms therein directly linked to C are not directly linked to each other; and one or more H atoms in $R_8$, $R_9$, and $R_{10}$ are unsubstituted, or, one or more H atoms in $R_8$, $R_9$, and $R_{10}$ are independently substituted by F, Cl, Br, or I;

$Z_4$ is selected from a single bond, —O—, —S—, —CO—, —C(O)O—, —OC(O)—, —$CF_2$O—, —O$CF_2$—, —$CH_2CH_2$—, —$CH_2$O—, —O$CH_2$—, —CH═CH—, an alkylidene group having 1-10 carbon atoms, an alkenylidene group having 2-10 carbon atoms, or an alkynyl group having 2-10 carbon atoms; one or more —$CH_2$— groups not connected together in $Z_4$ are not replaced, or, one or more —$CH_2$— groups not connected together in $Z_4$ are independently replaced by —O—, —S—, —CO—, —C(O)O—, —OC(O)—, —$CF_2$O—, —O$CF_2$—, —$CH_2CH_2$—, —$CH_2$O—, —O$CH_2$—, —CH═CH—, or —C≡C—; and one or more H atoms in $Z_4$ are unsubstituted, or, one or more H atoms in $Z_4$ are independently substituted by F, Cl, Br, or I; and k is any integer from 0 to 10, for example, 0, 1, 2, 3, 4, 5, 6, 7, 8, 9, or 10.

In some embodiments, Sp is independently selected from an ether group containing or not containing a branched chain, an alkyl group containing or not containing a branched chain, an alkoxy group containing or not containing a branched chain, an alkenyl group containing or not containing a branched chain, an alkenyloxy group containing or not containing a branched chain, or a polymerizable group containing or not containing a branched chain, and at least one Sp is a polymerizable group.

In some embodiments, Sp is independently represented by the following formula (2) or formula (3):

(2)

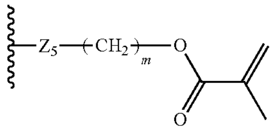

;

(3)

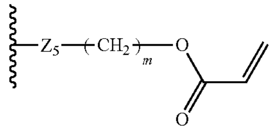

;

in which $Z_5$ is independently selected from a single bond, —O—, —S—, —CO—, —C(O)O—, —OC(O)—, —$CF_2$O—, —O$CF_2$—, —$CH_2CH_2$—, —$CH_2$O—, —O$CH_2$—, —CH═CH—, an alkylidene group having 1-10 carbon atoms, an alkenylidene group having 2-10 carbon atoms, or an alkynyl group having 2-10 carbon atoms; one or more —$CH_2$— groups not connected together in $Z_5$ are not replaced, or, one or more —$CH_2$— groups not connected together in $Z_5$ are independently replaced by —O—, —S—, —CO—, —C(O)O—, —OC(O)—, —$CF_2$O—, —O$CF_2$—, —$CH_2CH_2$—, —$CH_2$O—, —O$CH_2$—, —CH═CH—, or —C≡C—; and one or more H atoms in $Z_5$ are unsubstituted, or, one or more H atoms in $Z_5$ are independently substituted by F, Cl, Br, or I; and m is any integer from 0 to 10, for example, 0, 1, 2, 3, 4, 5, 6, 7, 8, 9, or 10.

In some embodiments, at least one Sp in the self-alignment compound represented by formula I is a polymerizable group, and the polymerizable group is a group containing at least one unsaturated bond, such as a carbon-carbon double bond or a carbon-carbon triple bond.

In some embodiments, the sum of a and b is greater than or equal to 1.

In some embodiments, a and b are independently selected from 0, 1, or 2, c and d are independently selected from 0 or 1, n is selected from 1 or 2, and p and q are independently selected from 0, 1, or 2.

In some embodiments, the self-alignment compound is selected from at least one of a group consisting of compounds represented by the following formulae I-1 to I-20:

I-1

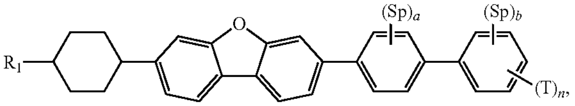

,

I-2

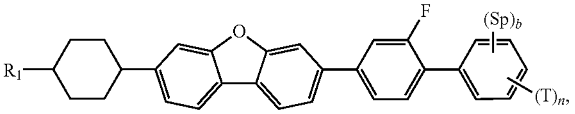

,

I-3

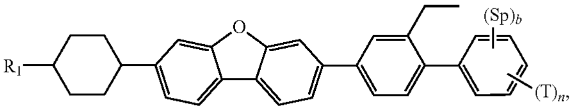

,

I-4

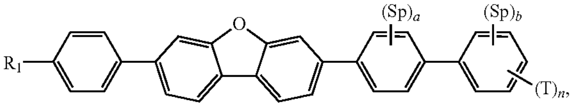

,

I-5

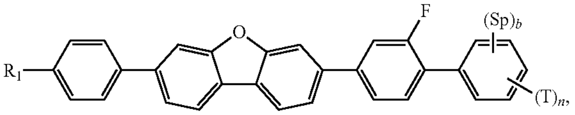

,

I-6

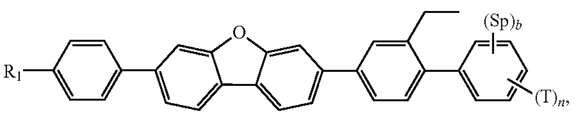

,

I-7

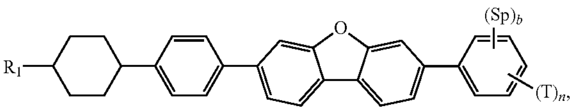

,

I-8

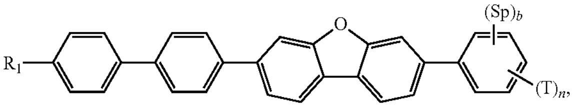

,

I-9

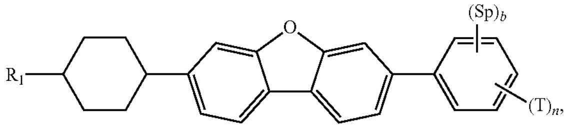

,

-continued

I-10

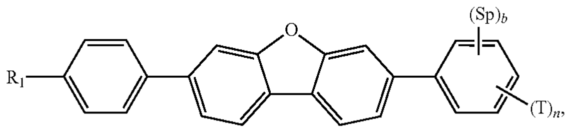

I-11

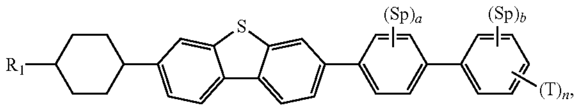

I-12

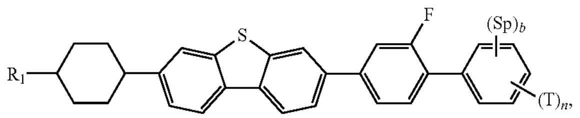

I-13

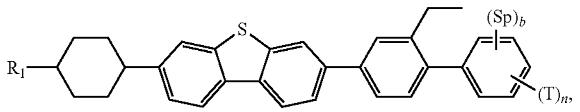

I-14

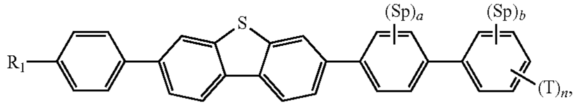

I-15

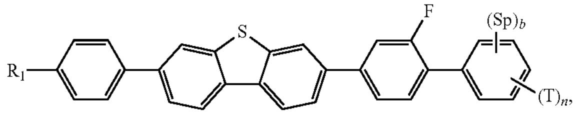

I-16

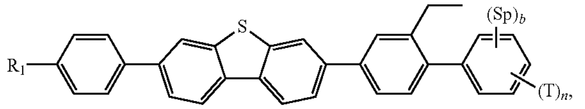

-continued

I-17

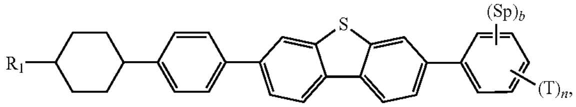

I-18

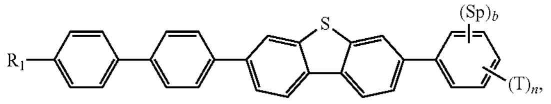

I-19

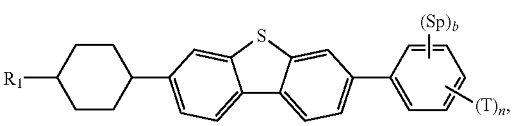

and

I-20

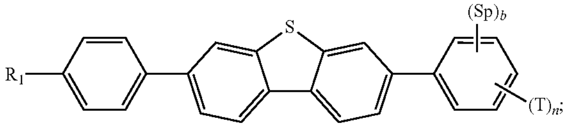

in which Sp is independently selected from an ether group, an alkyl group, an alkoxy group, an alkenyl group, an alkenyloxy group, or a polymerizable group, and at least one Sp in each of formulae I-1 to I-20 is a polymerizable group; and T is a group containing a hydroxyl group;

a and b are independently selected from 0, 1, or 2, and the sum of a and b is greater than or equal to 1;

n is independently selected from 1 or 2; and definitions of $R_1$ in formulae I-1 to I-20 are the same as the definition of $R_1$ in formula I.

In some embodiments, the self-alignment compound is selected from at least one of a group consisting of compounds represented by the following formulae I-1-1 to I-20-4:

I-1-1

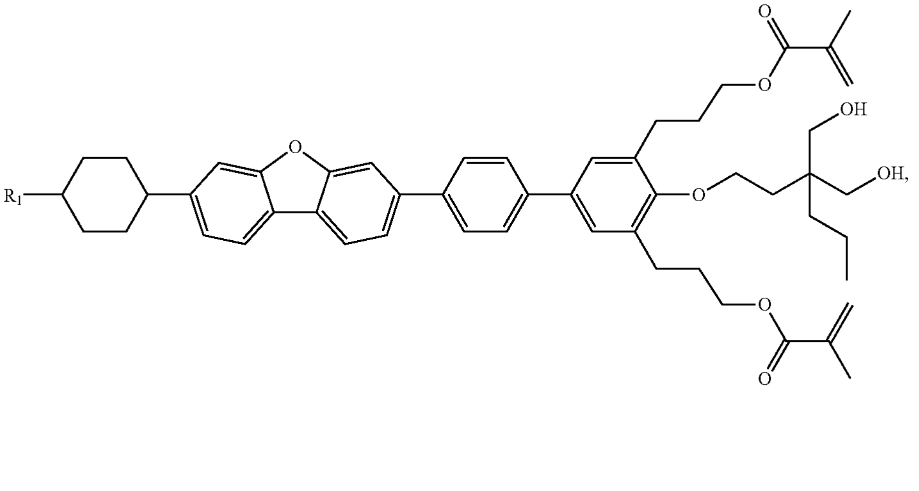

-continued
I-1-2
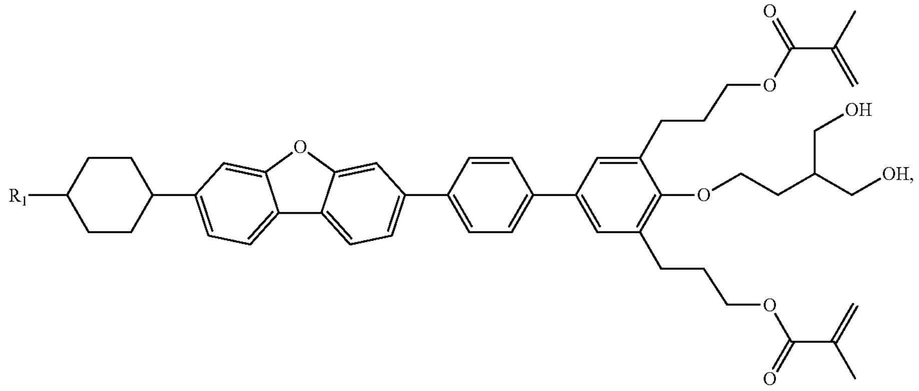
I-1-3
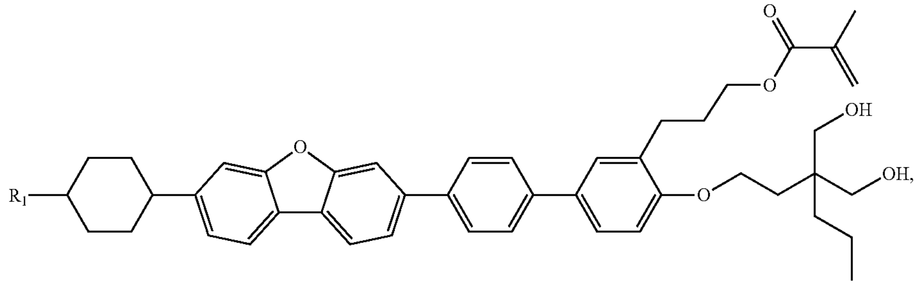
I-1-4
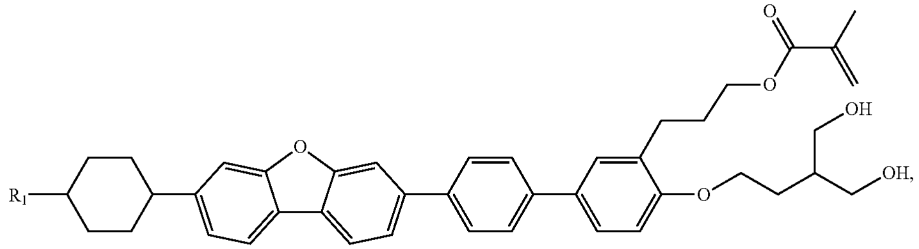
I-1-5
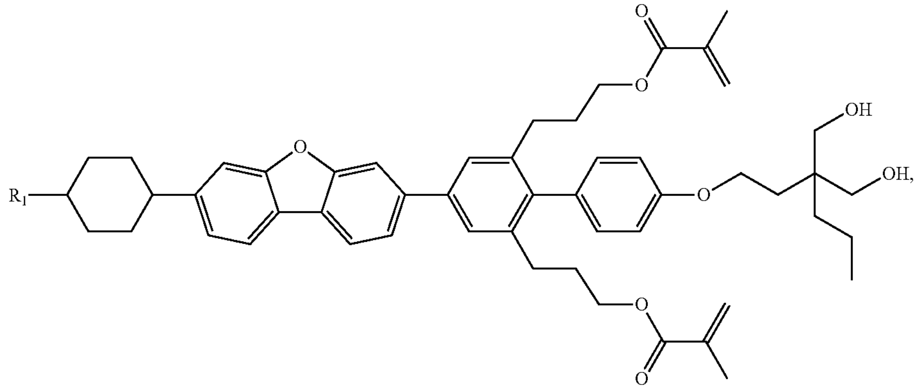

-continued
I-1-6
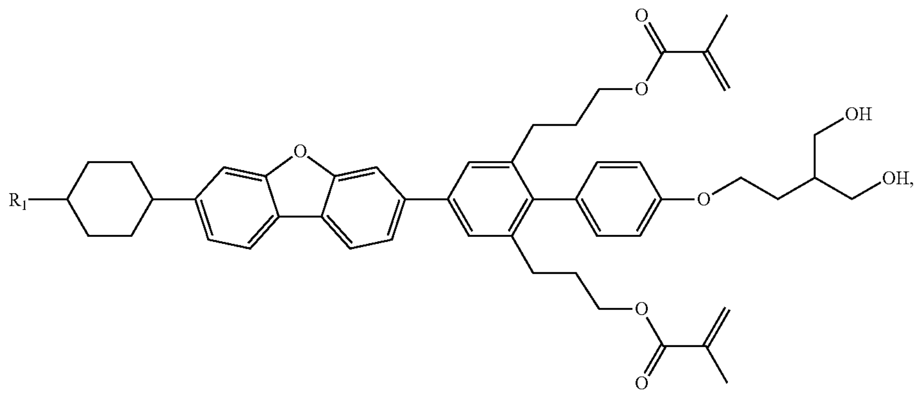
I-1-7
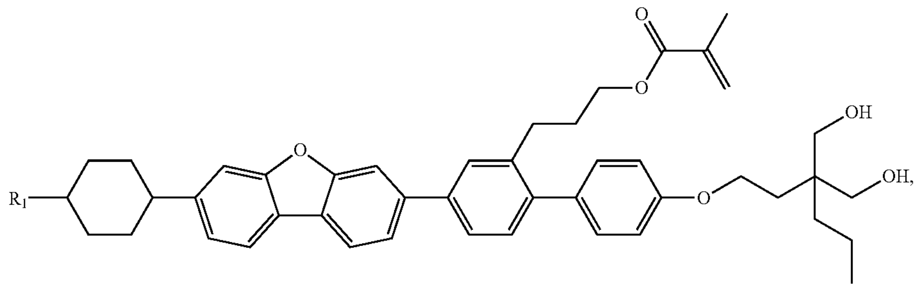
I-1-8
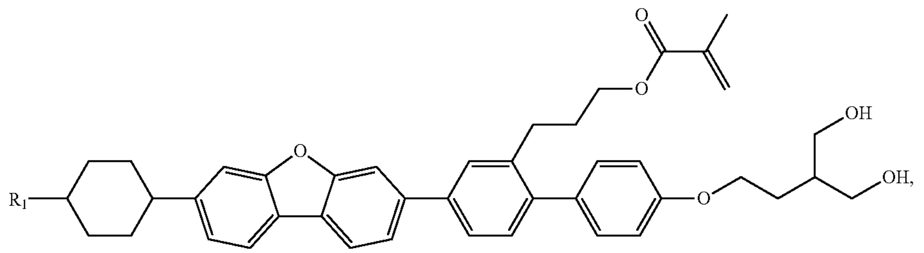
I-2-1
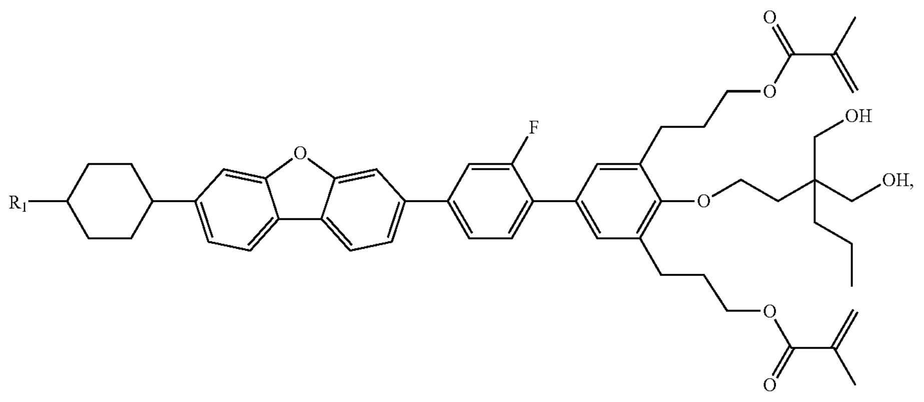

-continued
I-2-2
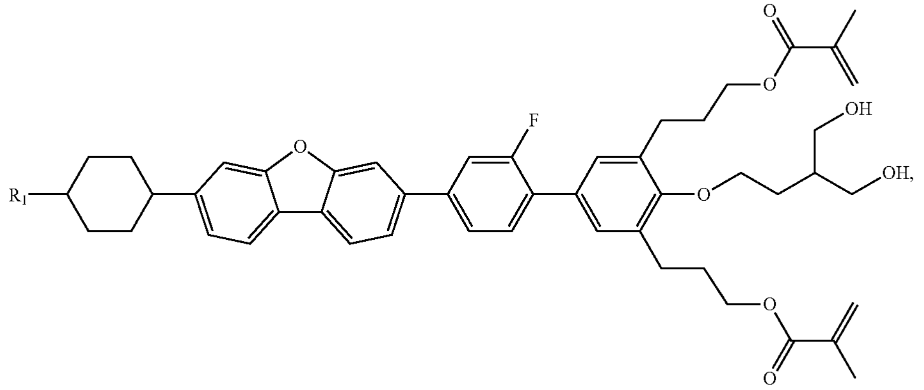
I-2-3
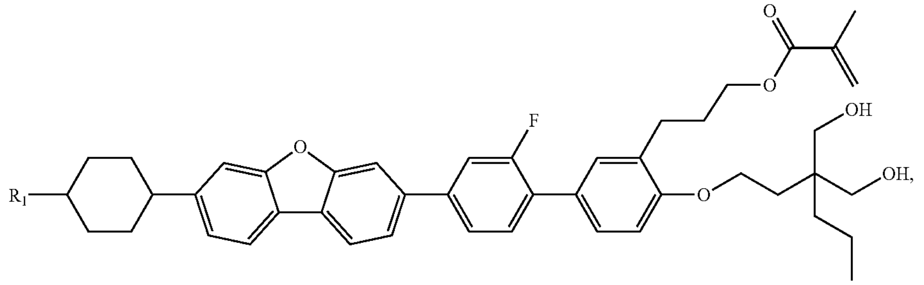
I-2-4
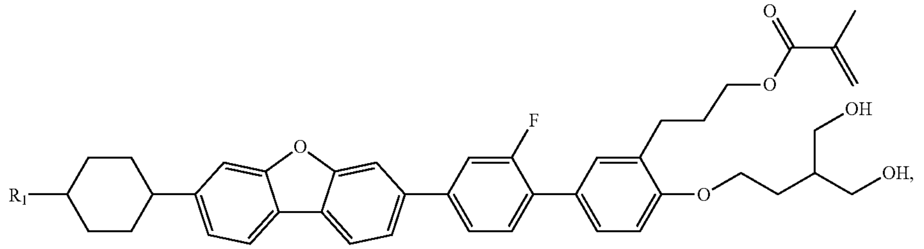
I-3-1
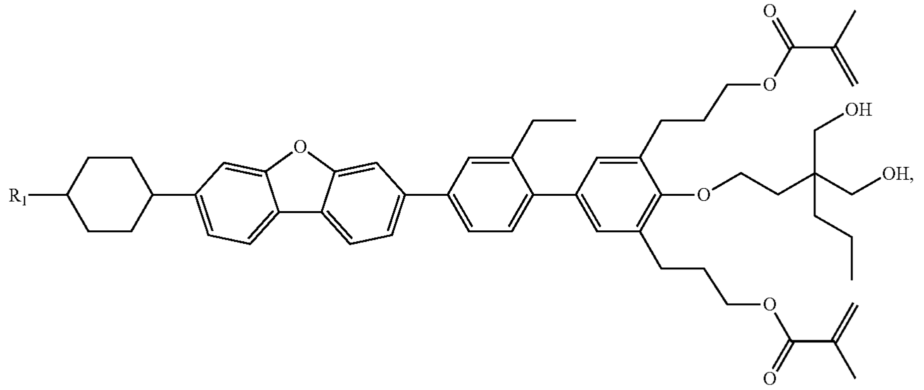

-continued
I-3-2
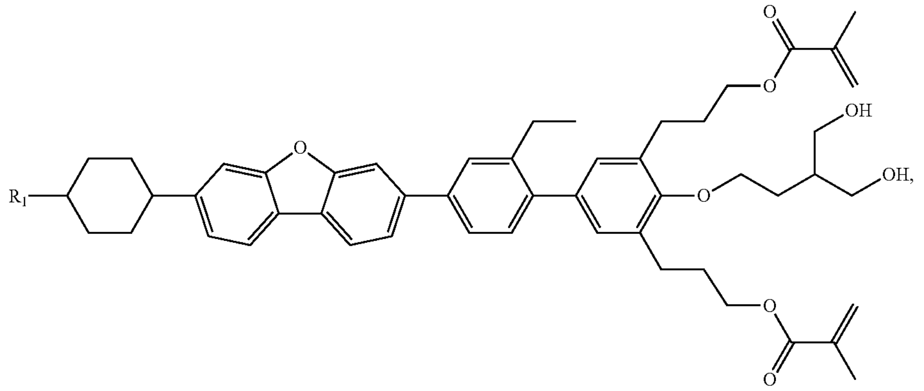
I-3-3
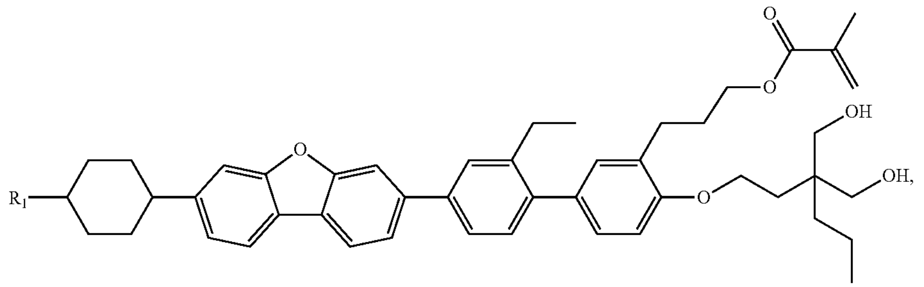
I-3-4
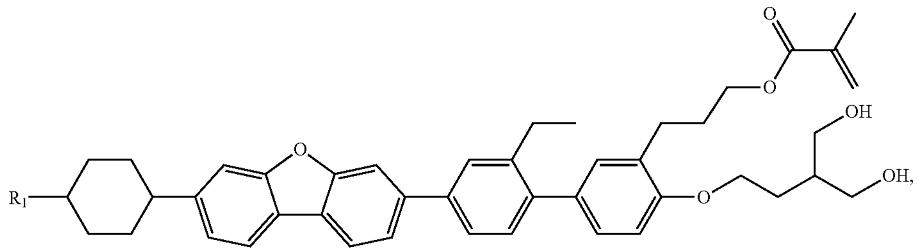
I-4-1
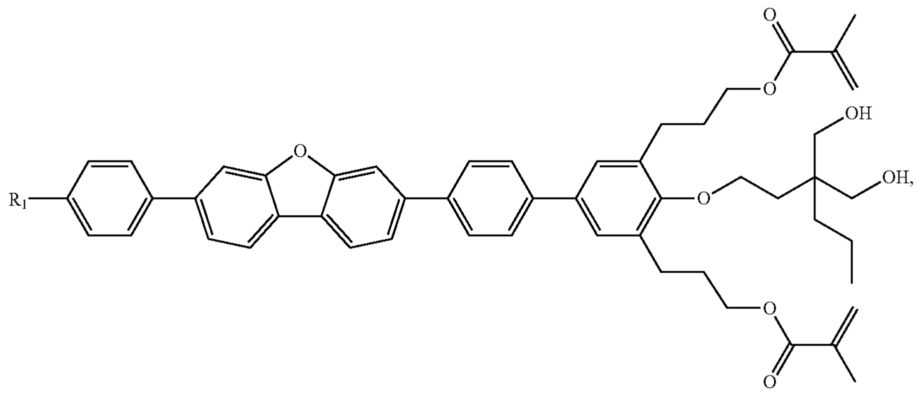

-continued
I-4-2
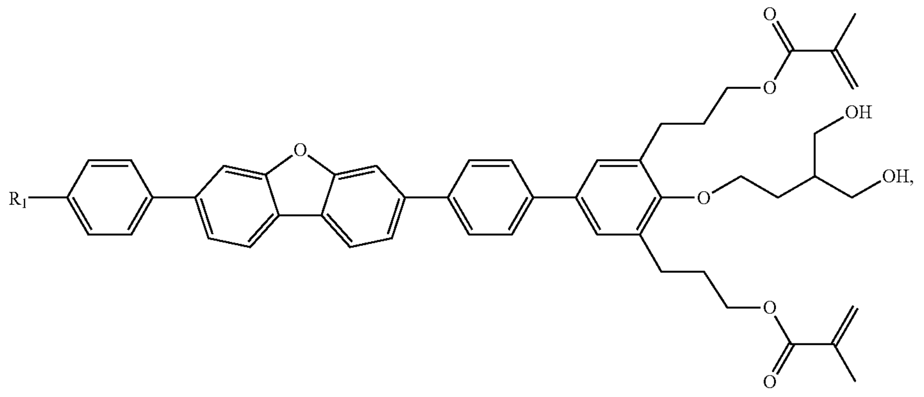
I-4-3
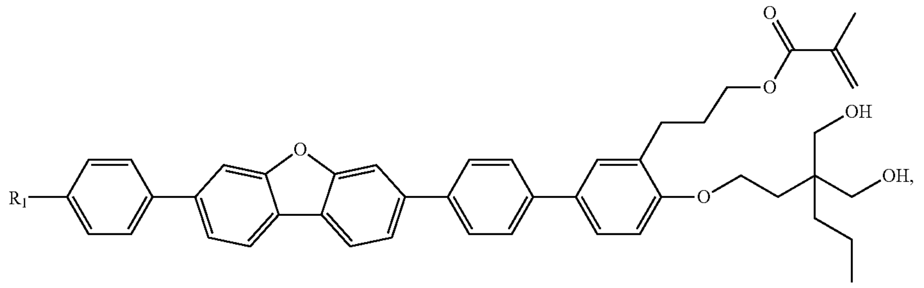
I-4-4
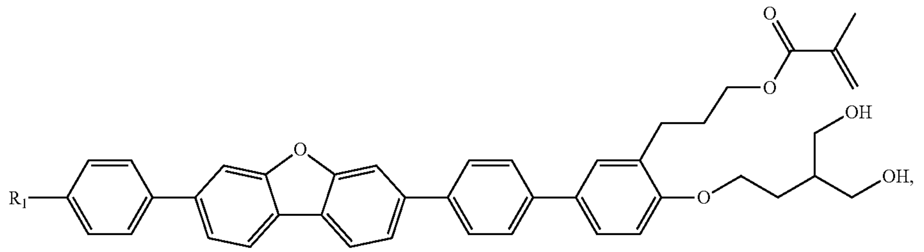
I-4-5
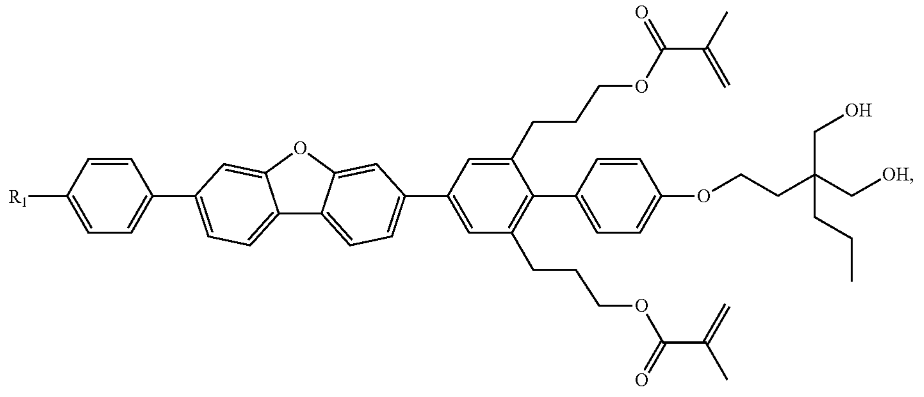

-continued
I4-6
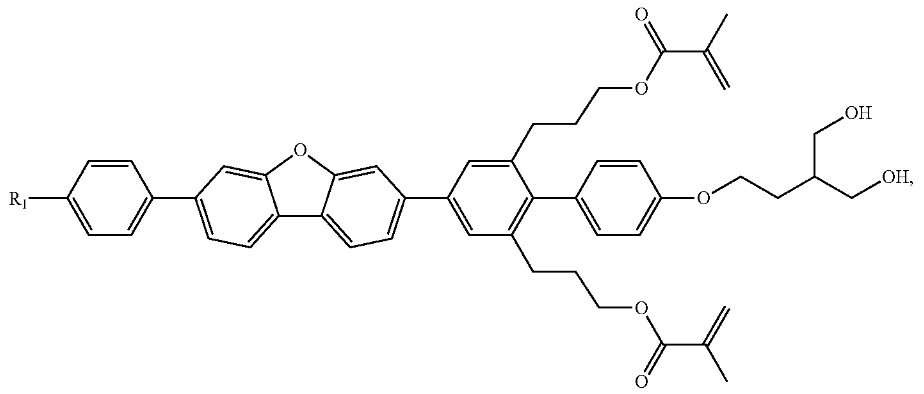
I-4-7
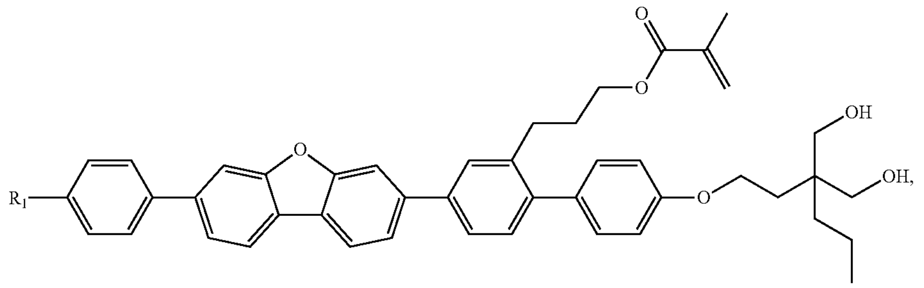
I-4-8
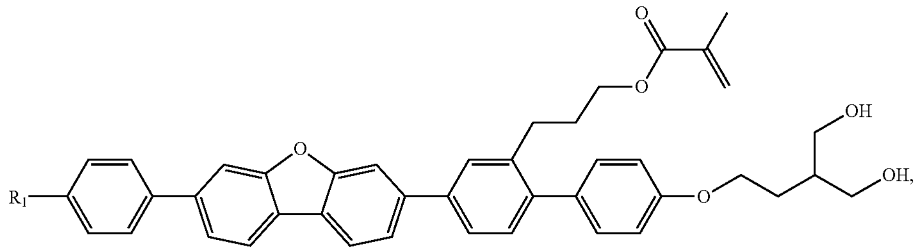
I-5-1
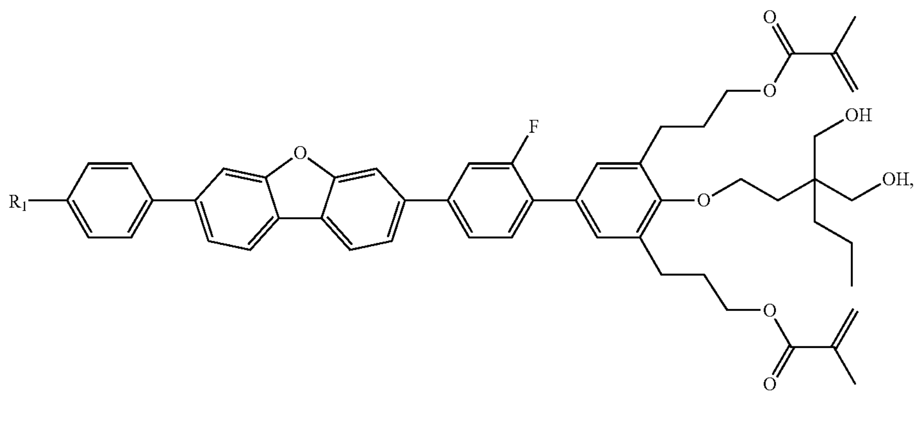

-continued
I-5-2
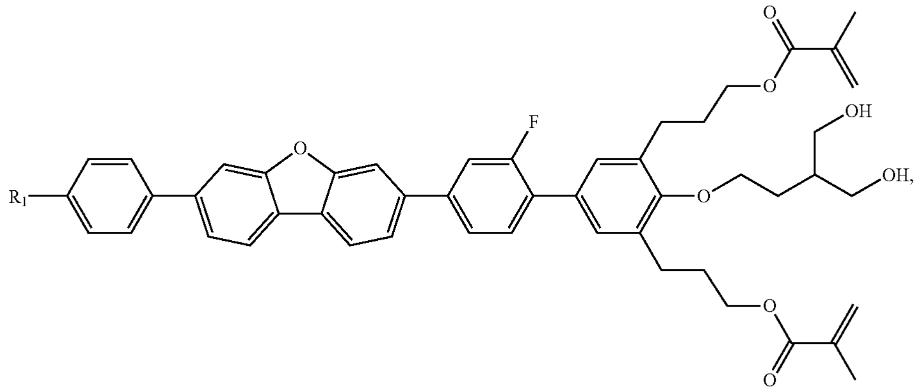
I-5-3
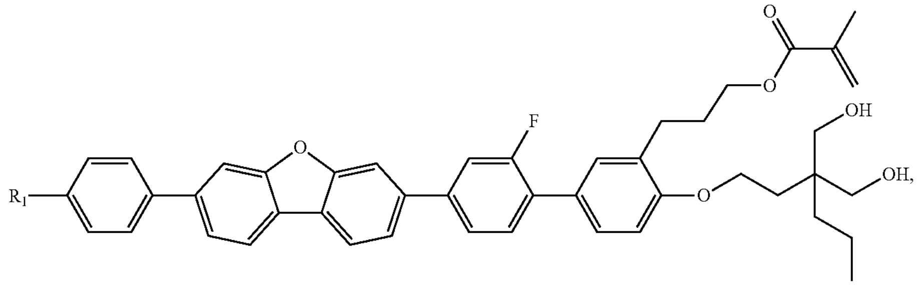
I-5-4
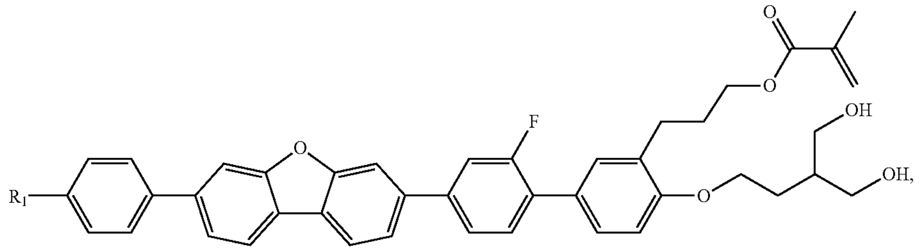
I-6-1
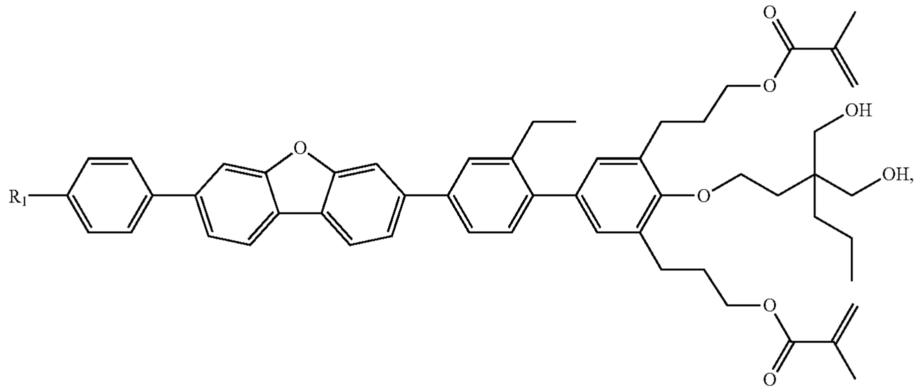

-continued
I-6-2
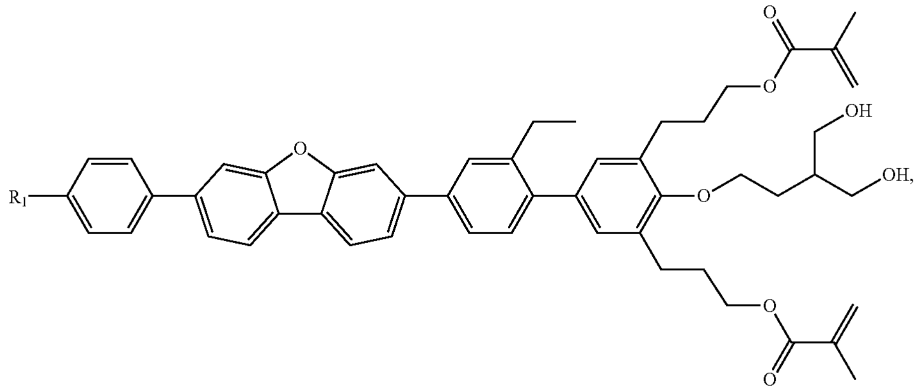
I-6-3
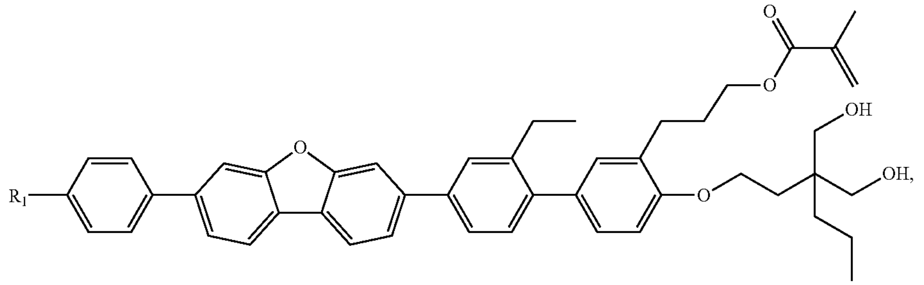
I-6-4
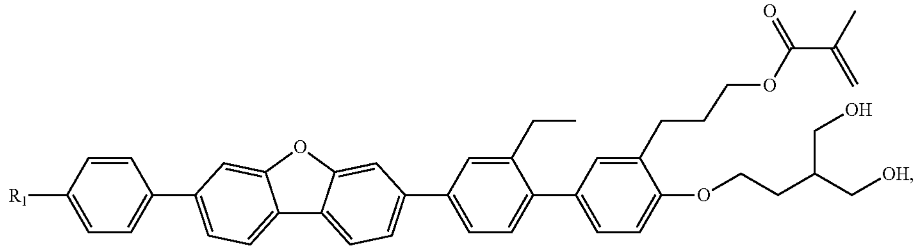
I-7-1
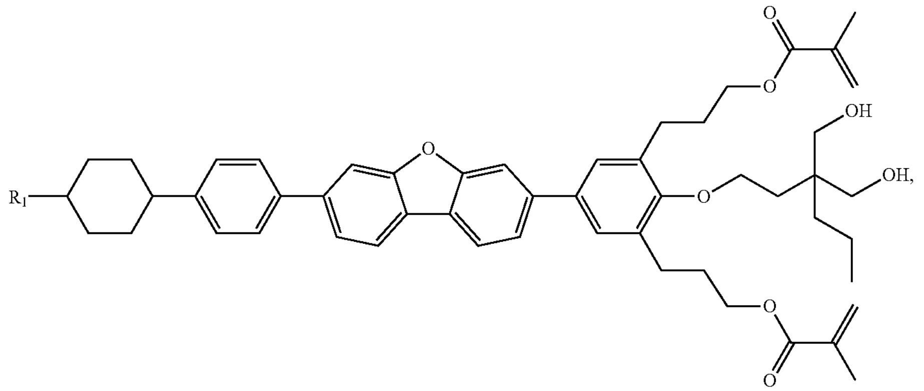

-continued
I-7-2
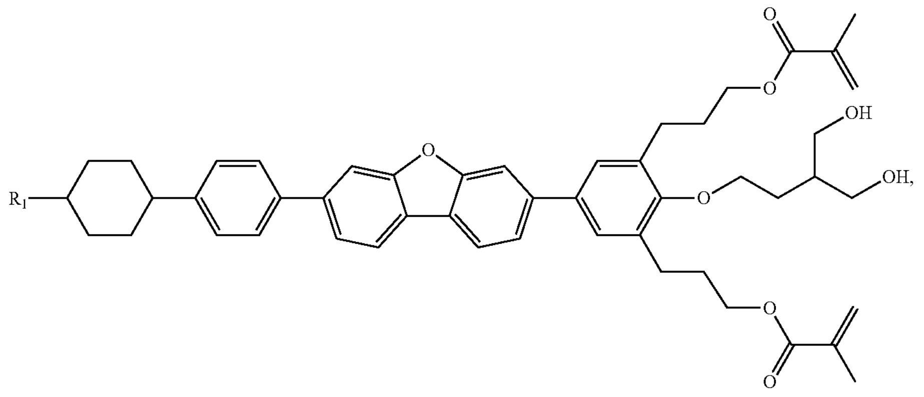
I-7-3
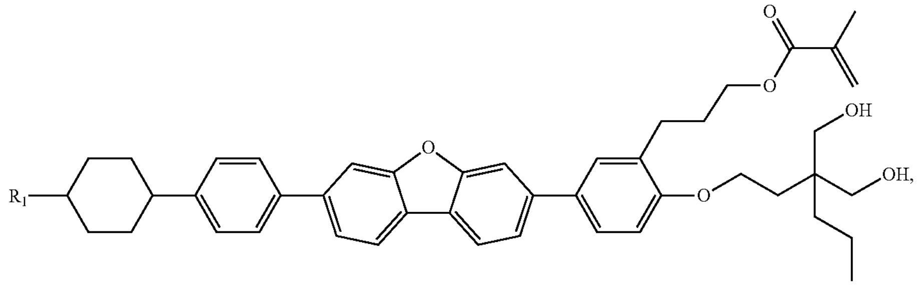
I-7-4
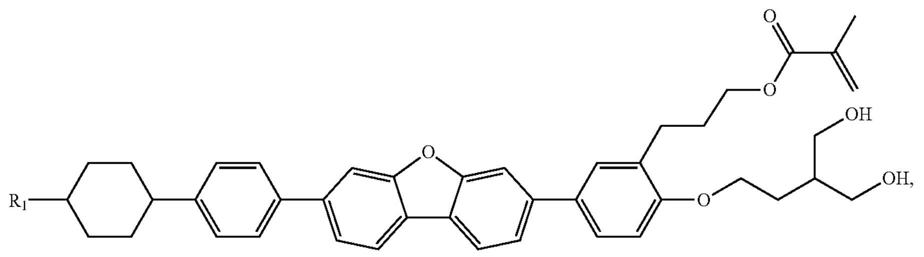
I-8-1
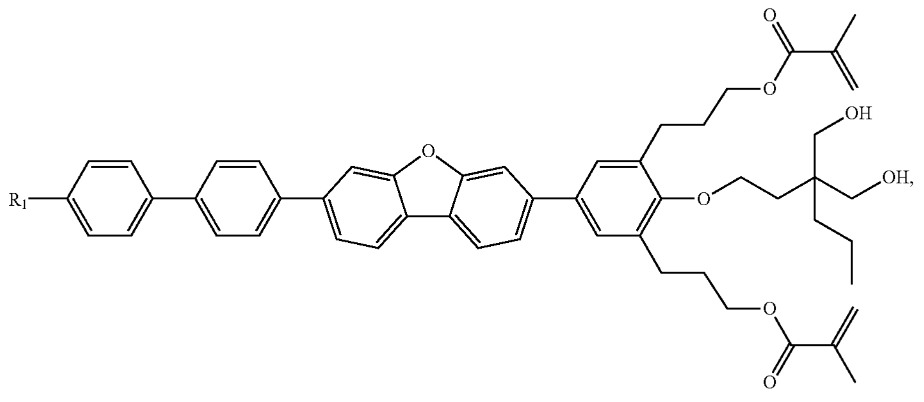

-continued
I-8-2
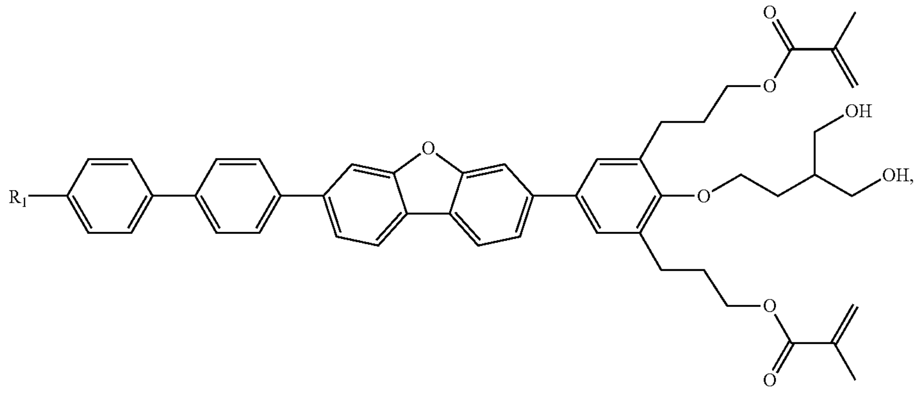
I-8-3
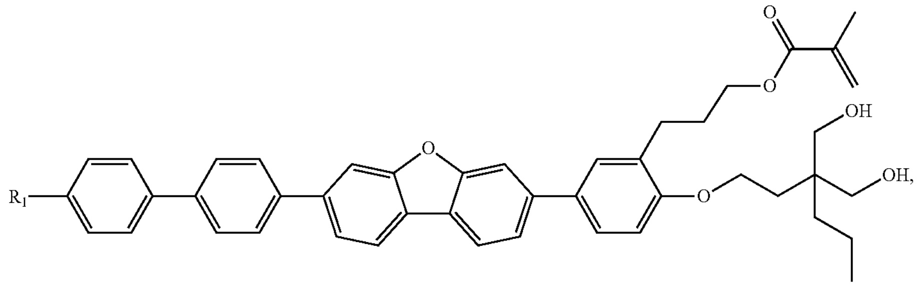
I-8-4
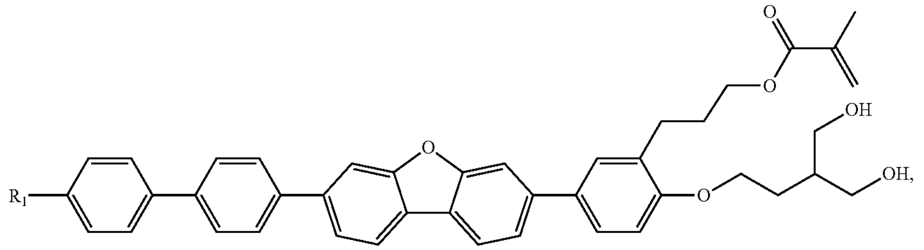
I-9-1
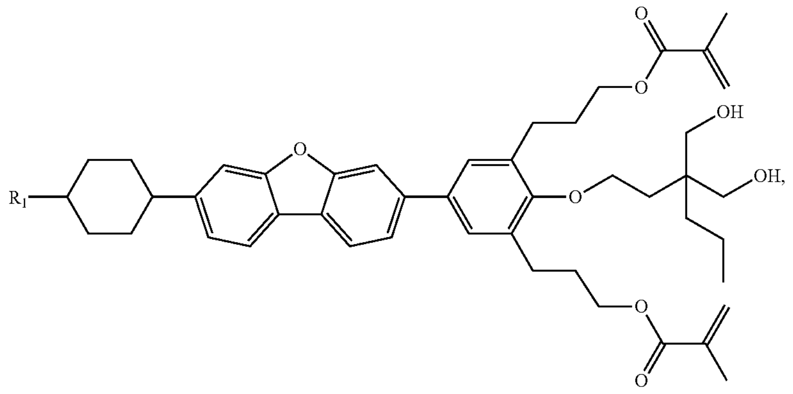

-continued
I-9-2
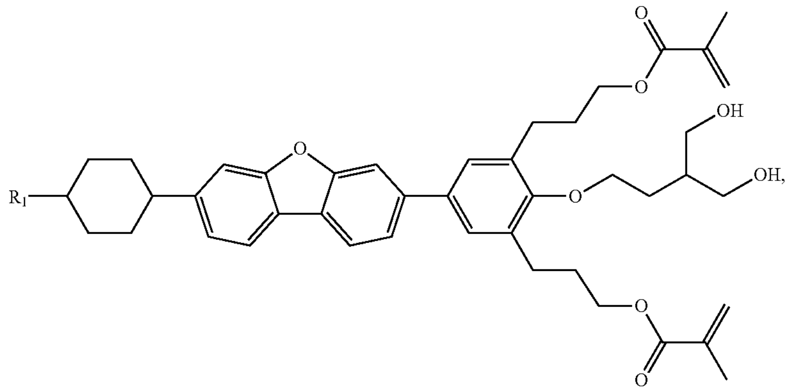
I-9-3
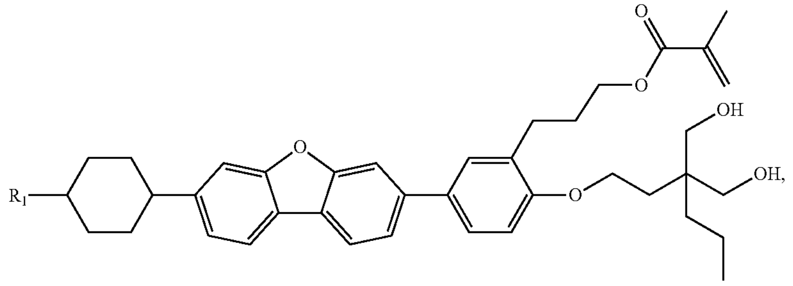
I-9-4
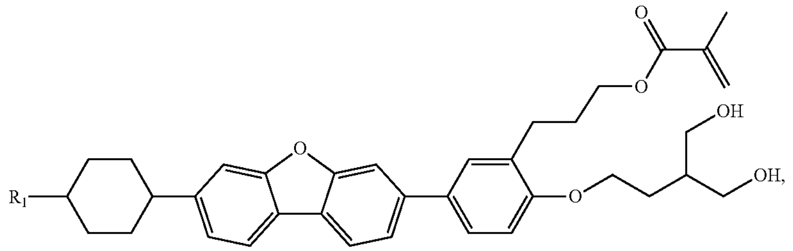
I-10-1
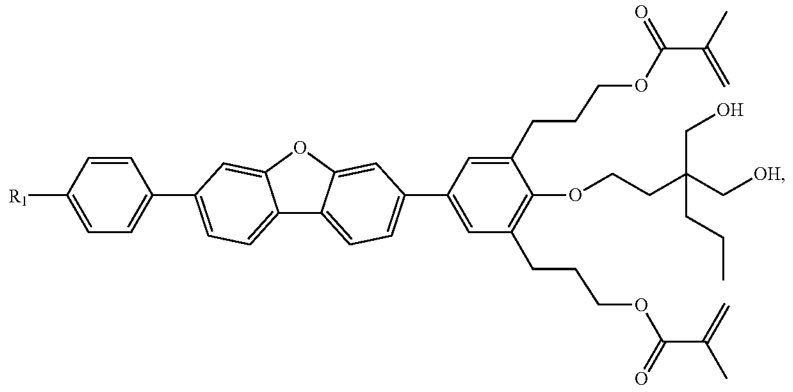

-continued
I-10-2
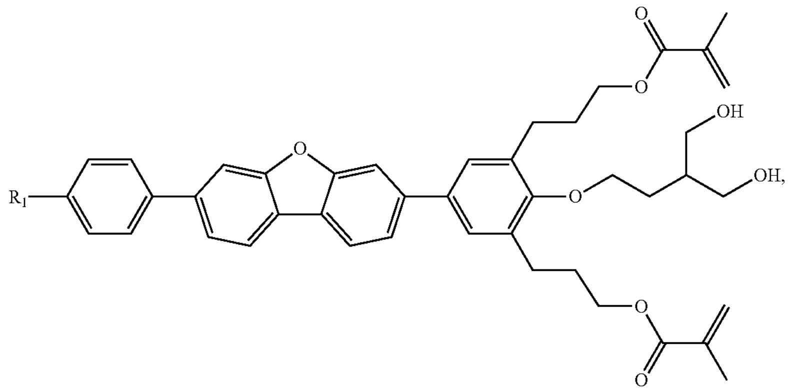
I-10-3
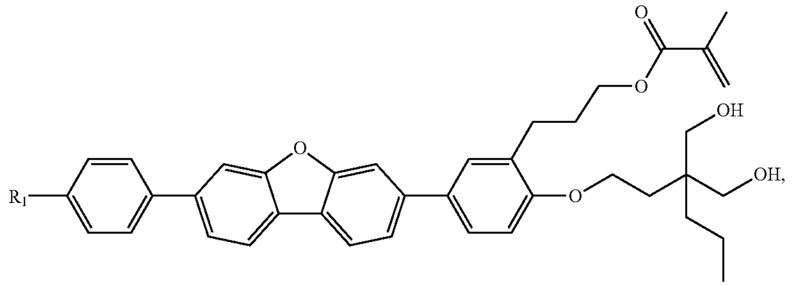
I-10-4
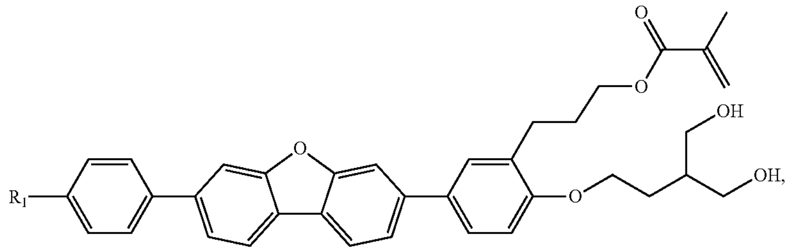
I-11-1
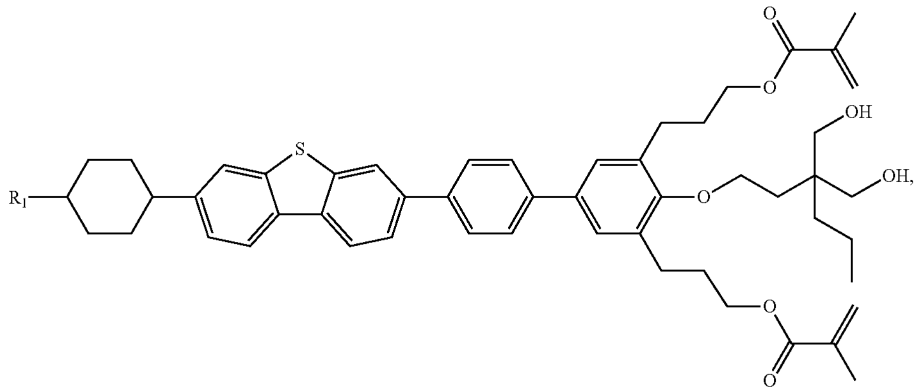

-continued
I-11-2
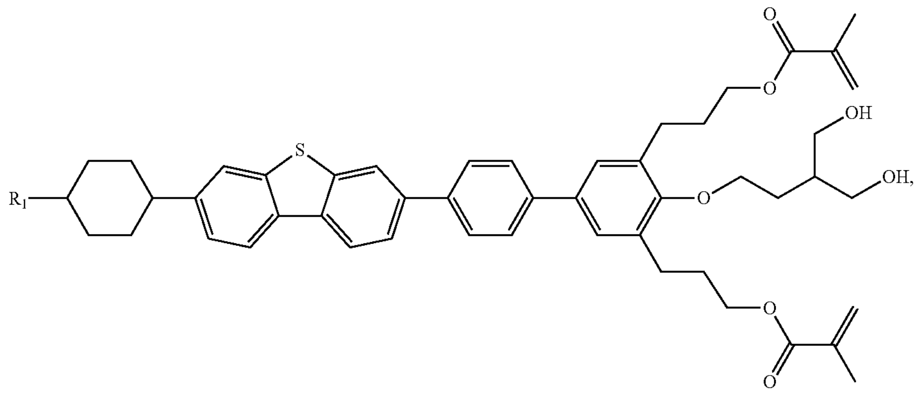
I-11-3
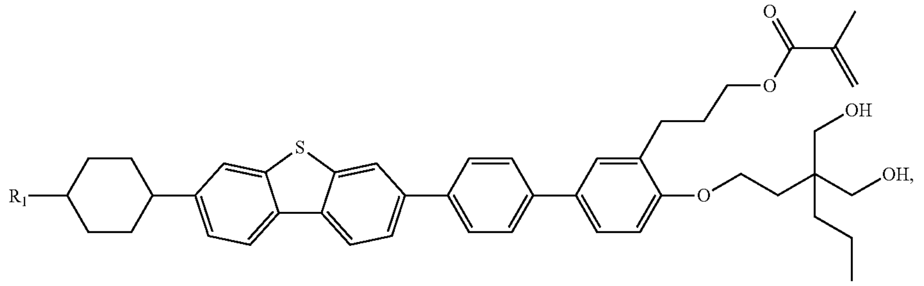
I-11-4
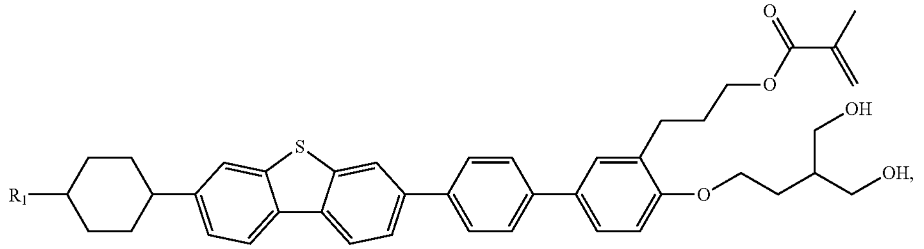
I-11-5
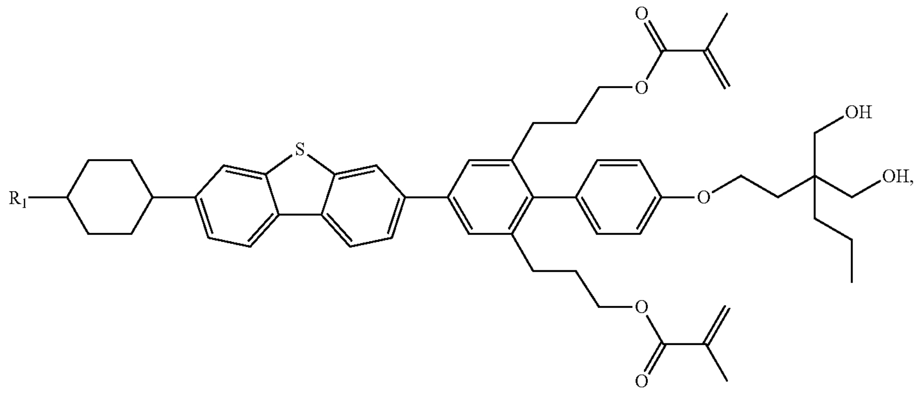

-continued
I-11-6
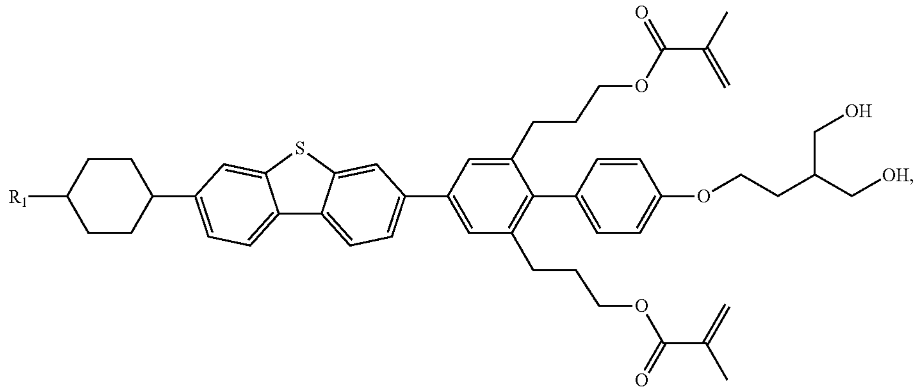
I-11-7
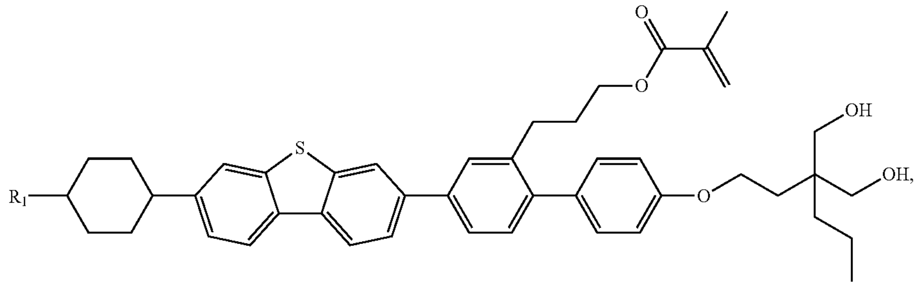
I-11-8
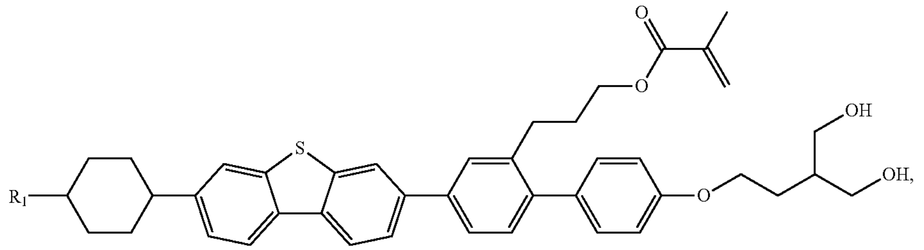
I-12-1
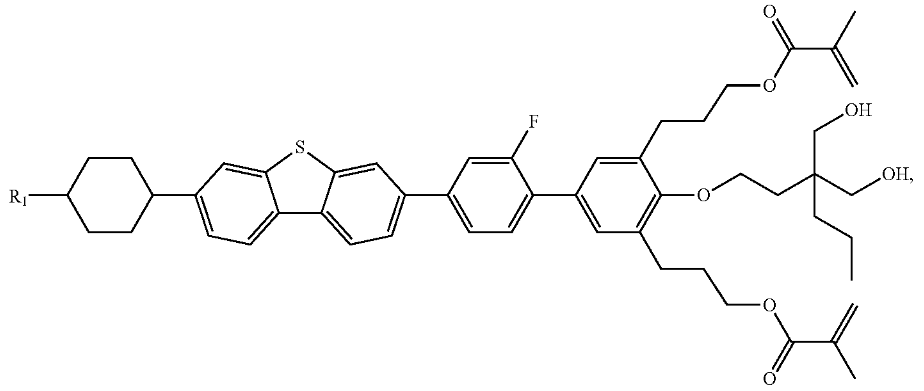

-continued
I-12-2
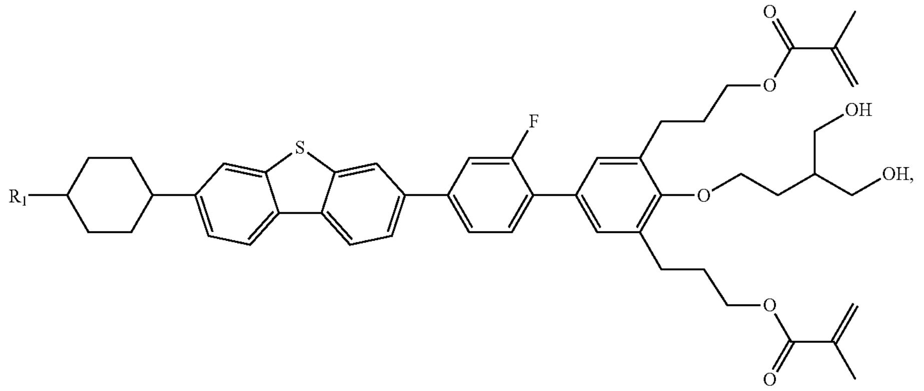
I-12-3
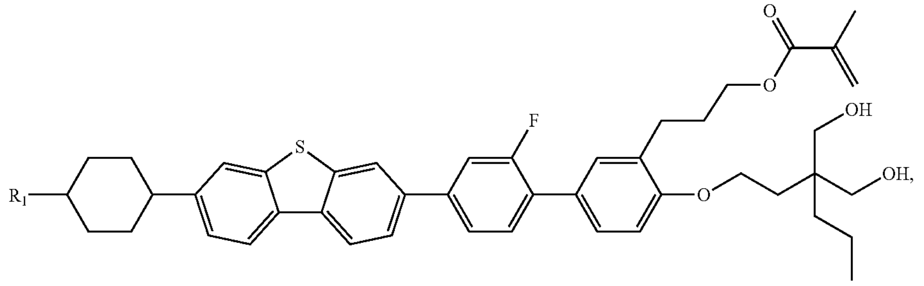
I-12-4
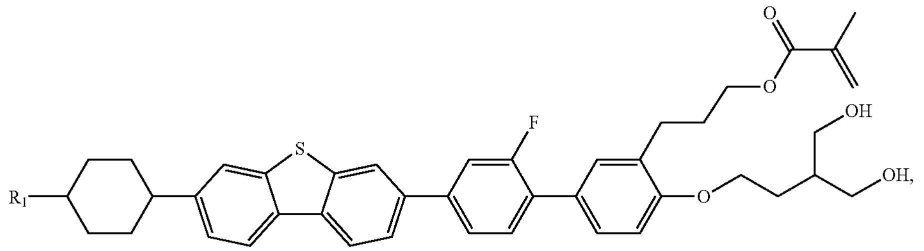
I-13-1
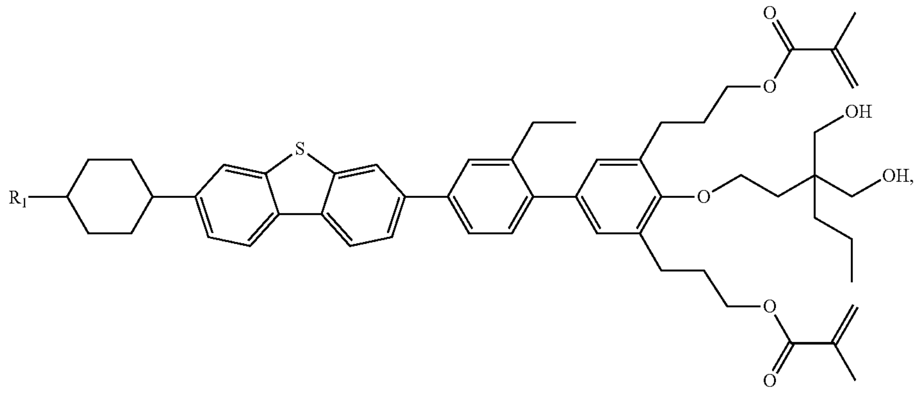

-continued
I-13-2
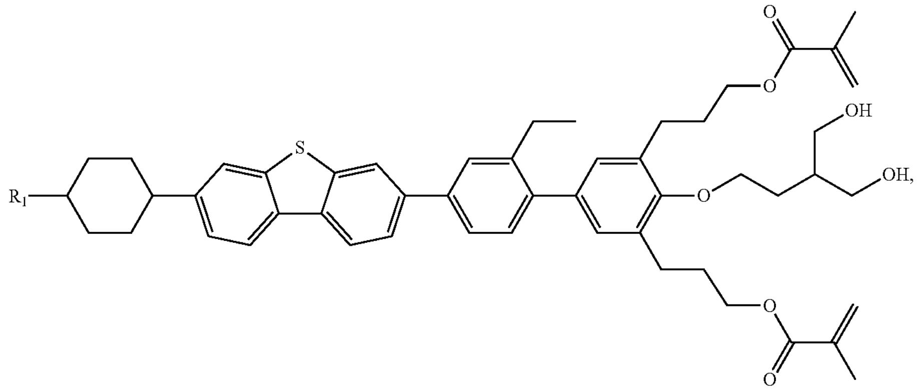
I-13-3
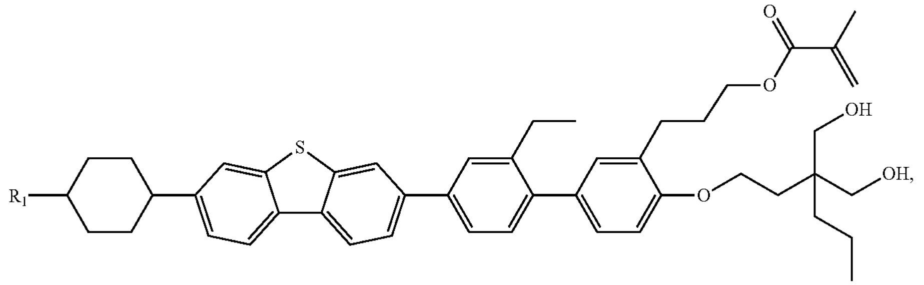
I-13-4
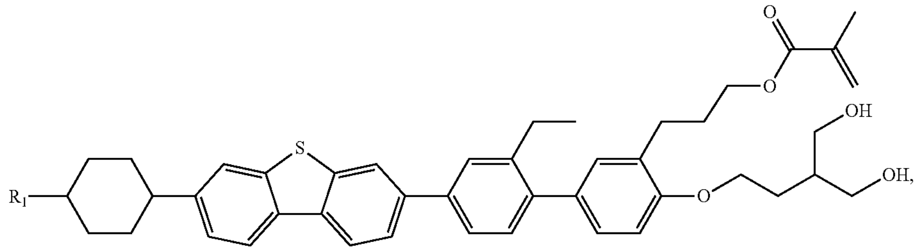
I-14-1
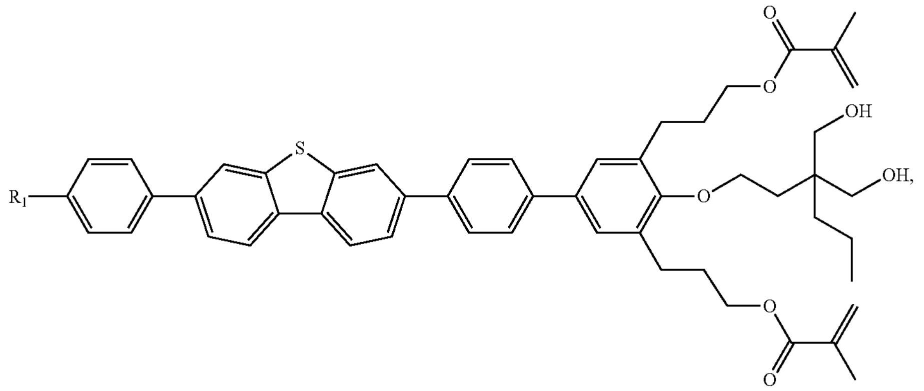

-continued
I-14-2
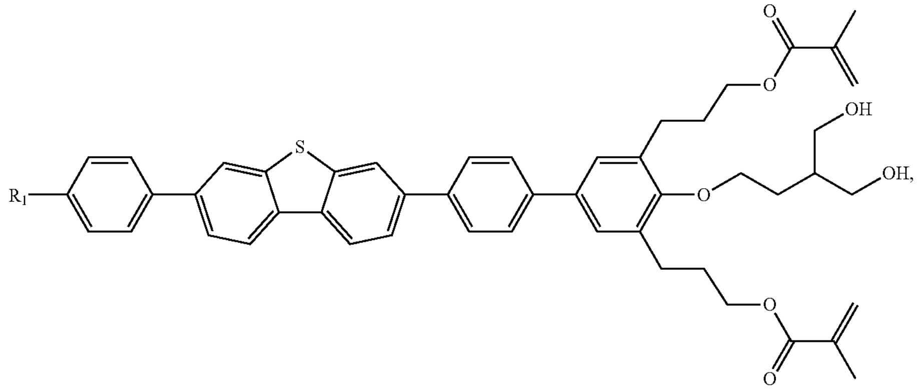
I-14-3
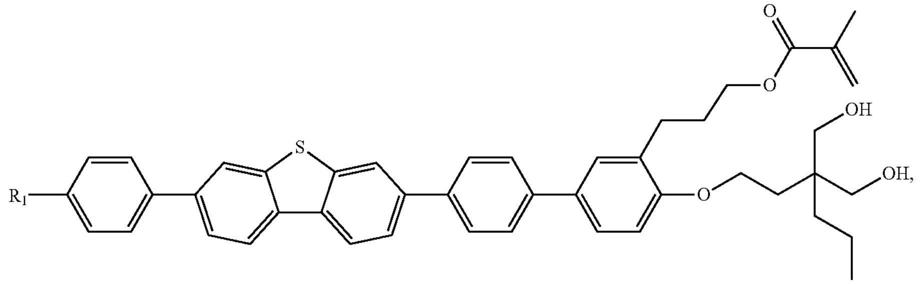
I-14-4
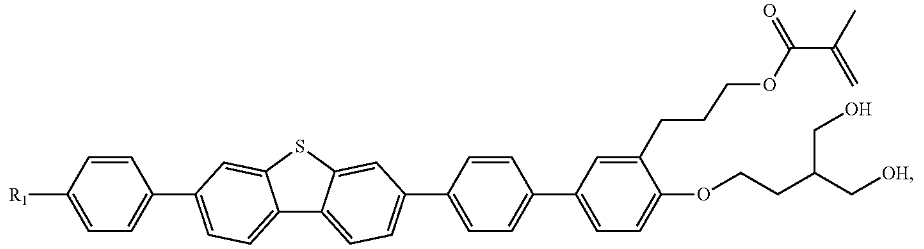
I-14-5
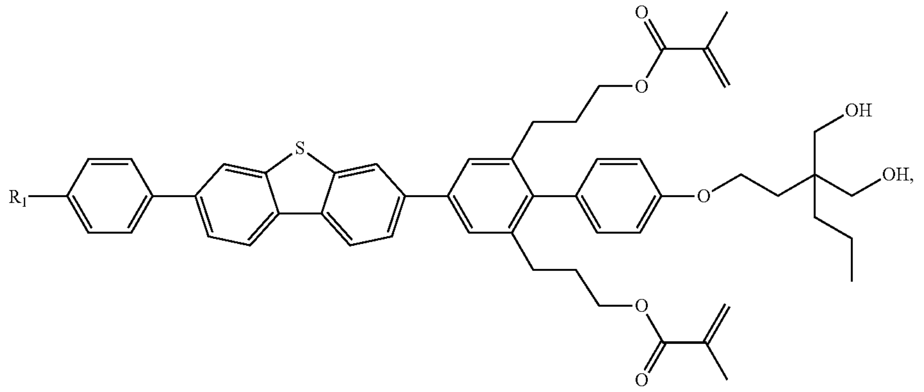

-continued
I-14-6
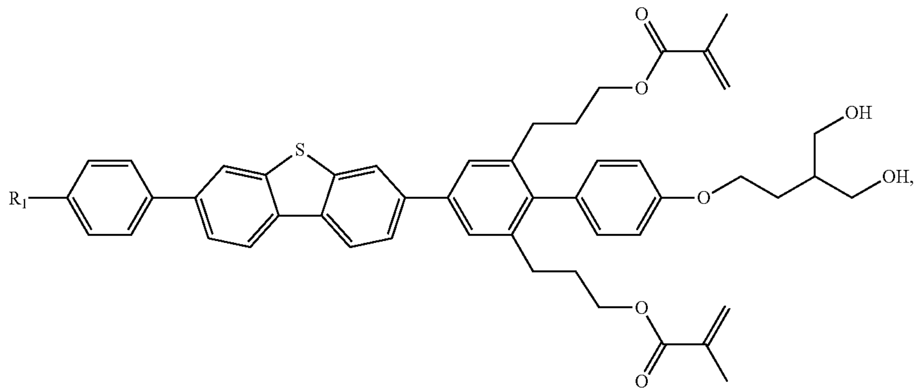
I-14-7
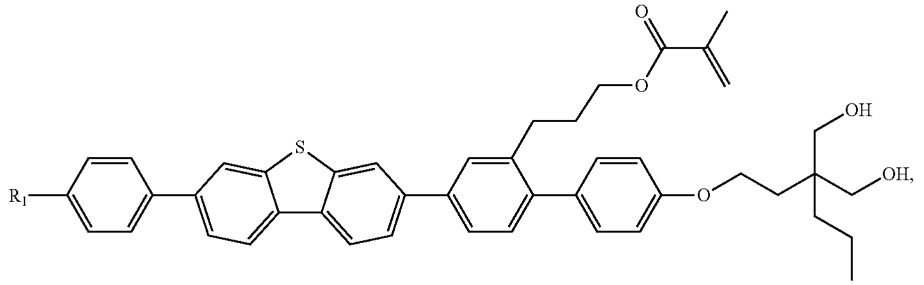
I-14-8
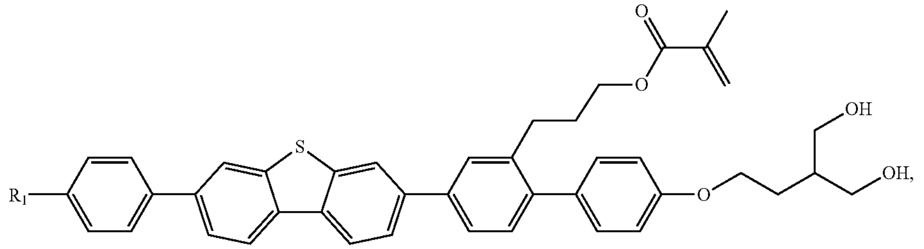
I-15-1
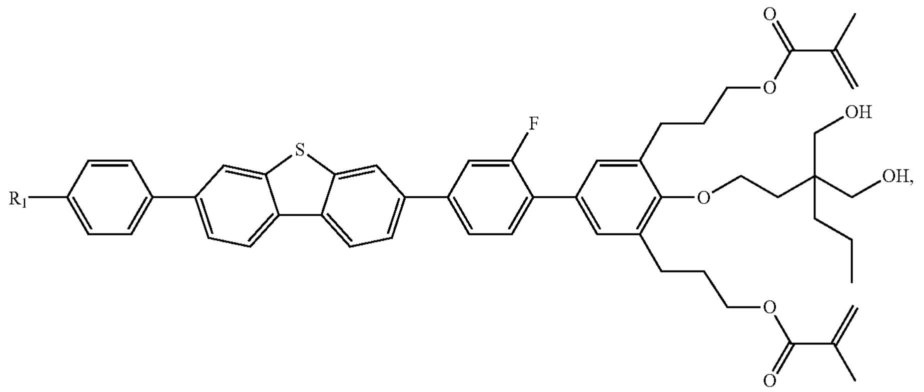

-continued
I-15-2
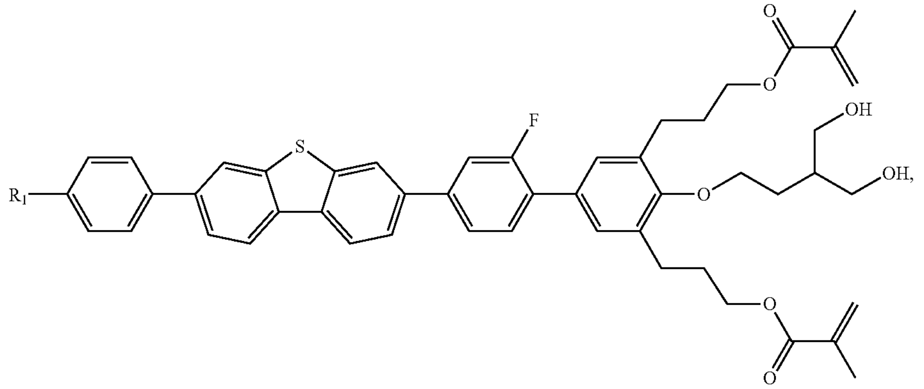
I-15-3
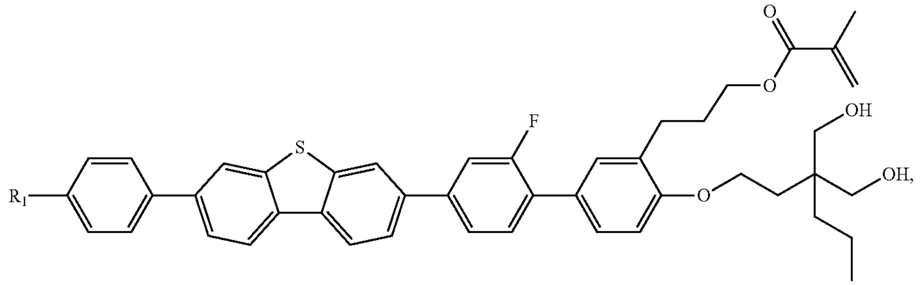
I-15-4
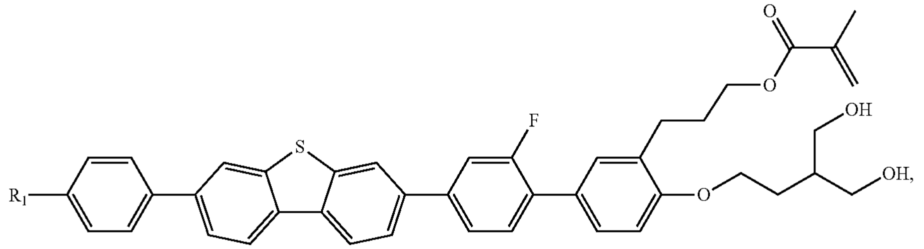
I-16-1
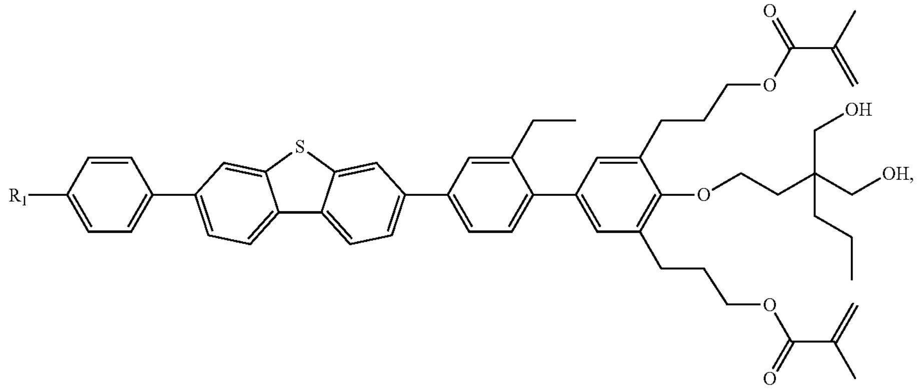

-continued
I-16-2
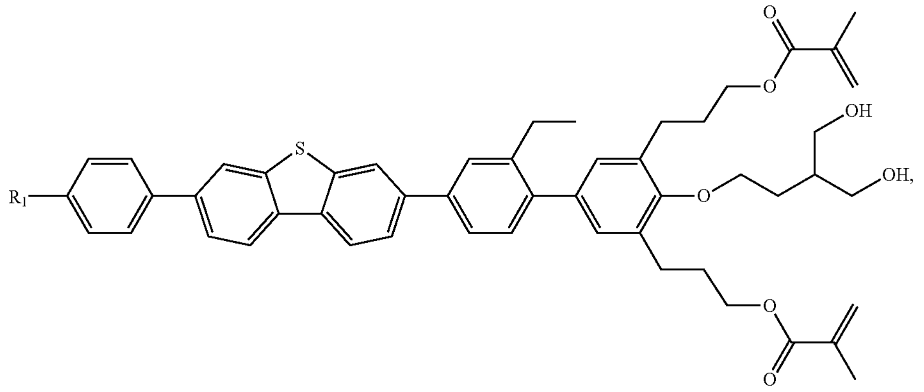
I-16-3
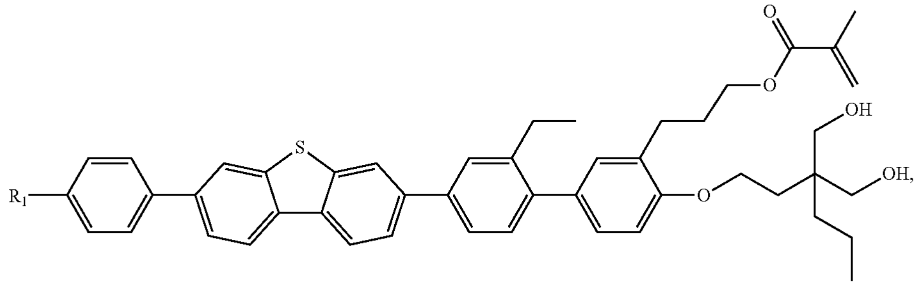
I-16-4
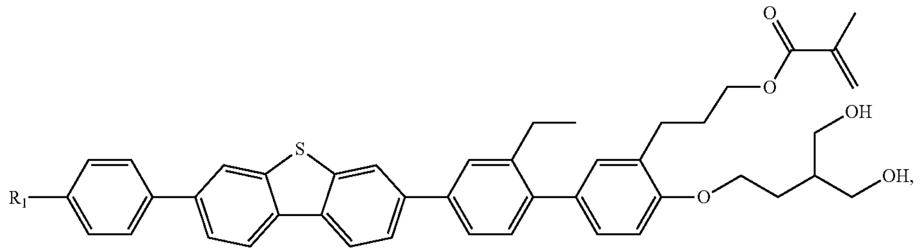
I-17-1
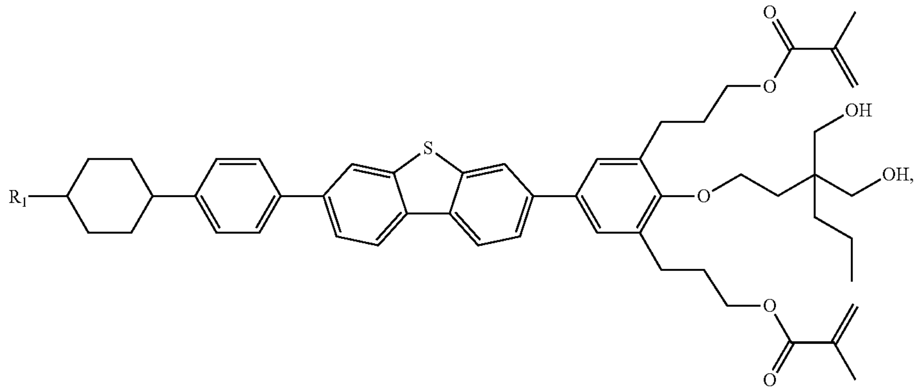

-continued
I-17-2
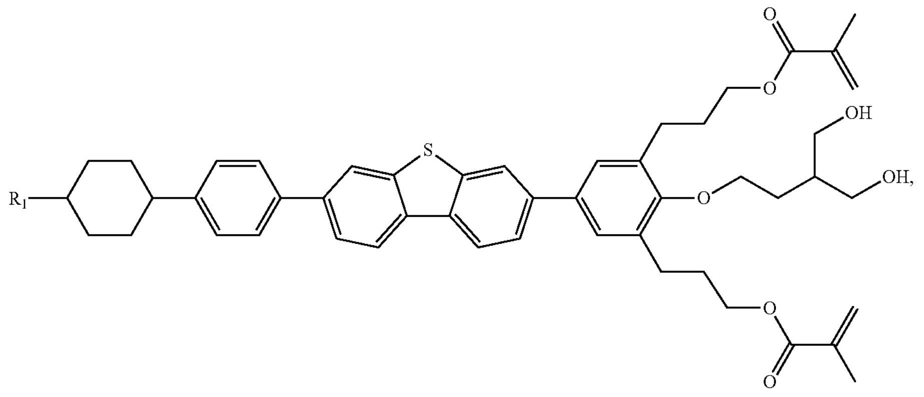
I-17-3
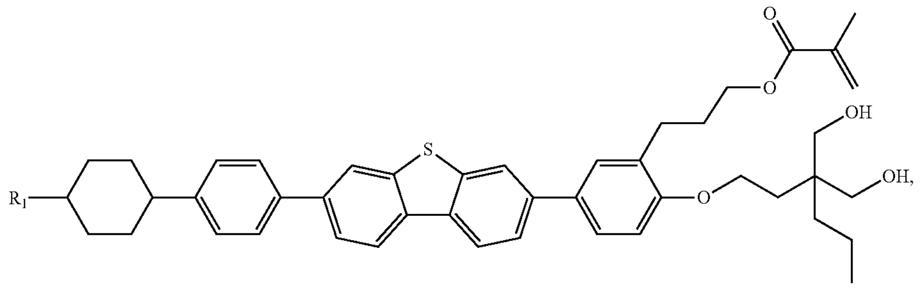
I-17-4
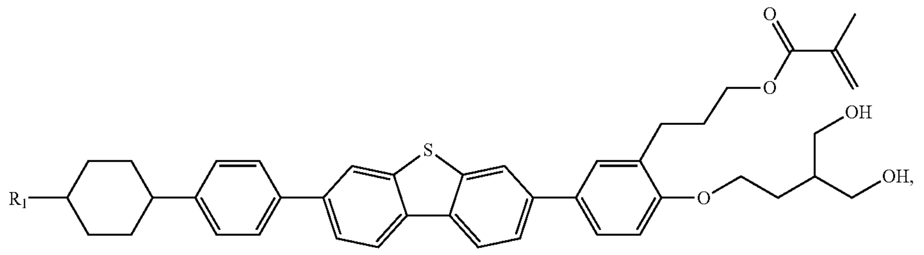
I-18-1
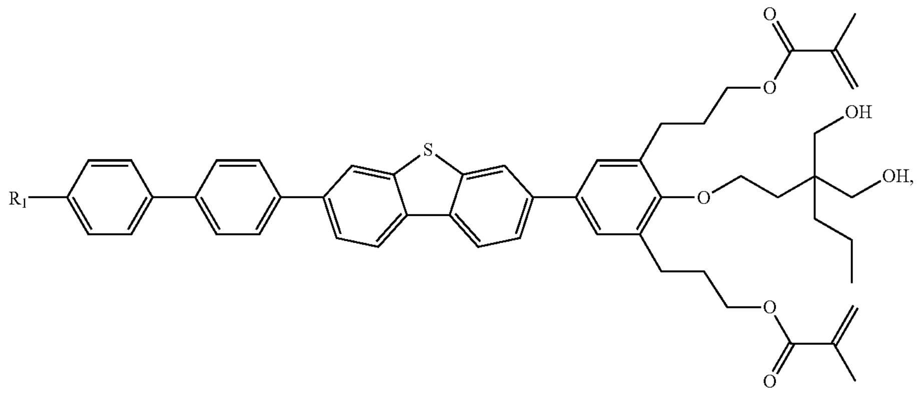

-continued
I-18-2
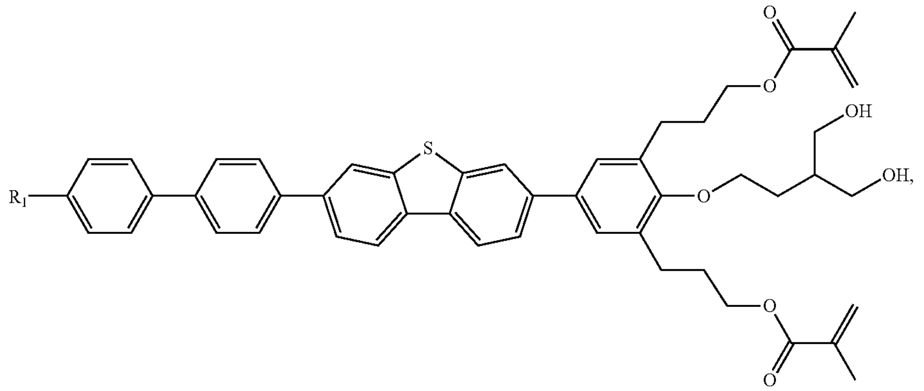
I-18-3
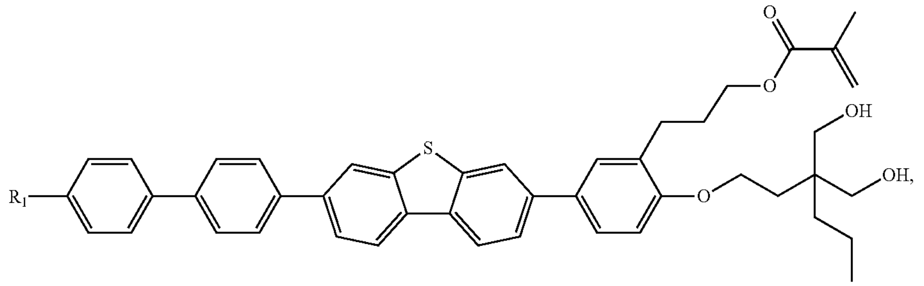
I-18-4
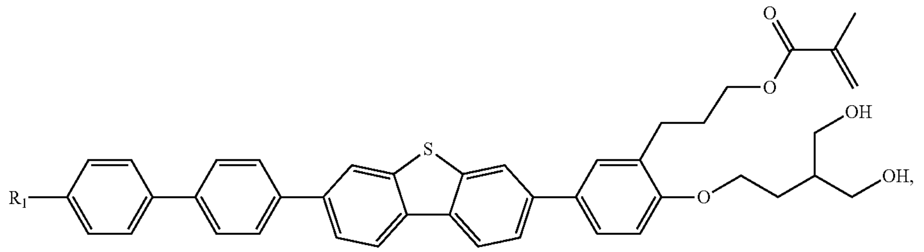
I-19-1
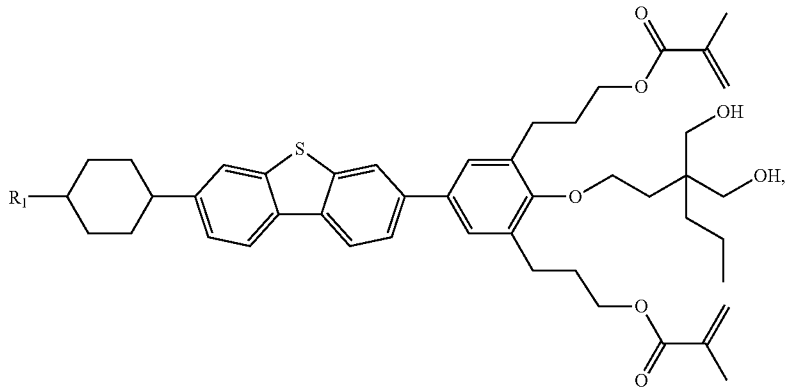

-continued
I-19-2
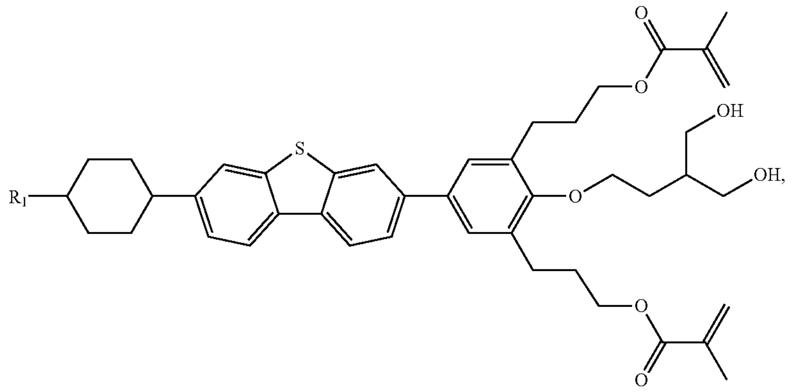
I-19-3
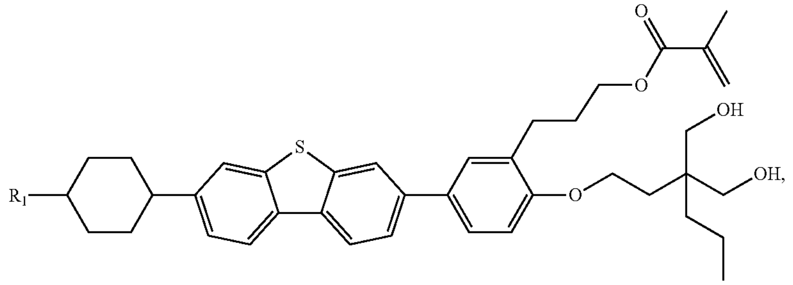
I-19-4
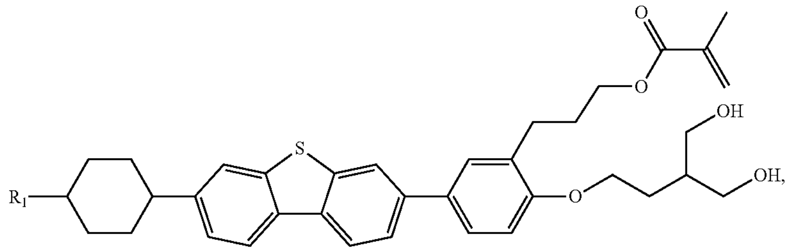
I-20-1
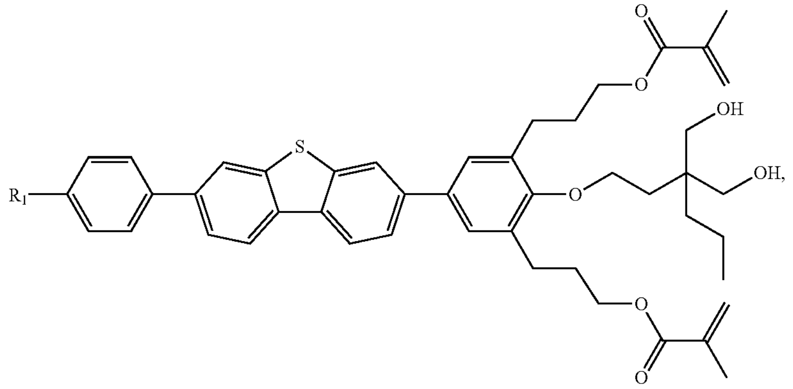

-continued
I-20-2
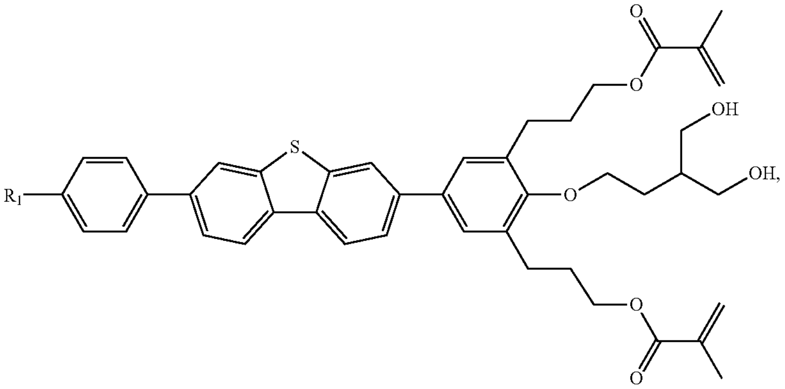
I-20-3
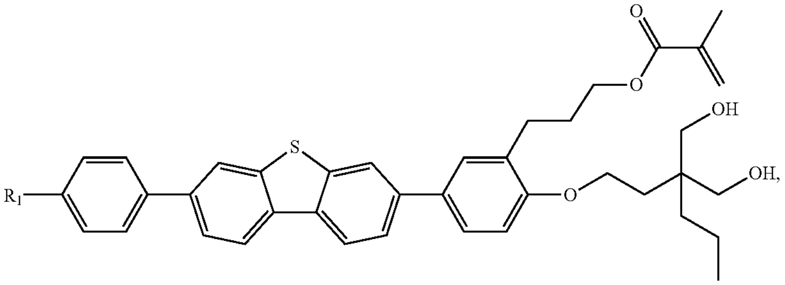
and
I-20-4
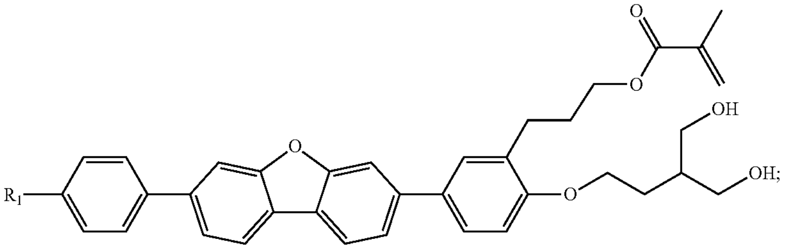
in which definitions of $R_1$ in formulae I-1-1 to I-20-4 are the same as the definition of $R_1$ in formula I.
In some embodiments, the self-alignment compound is selected from at least one of a group consisting of the following compounds:
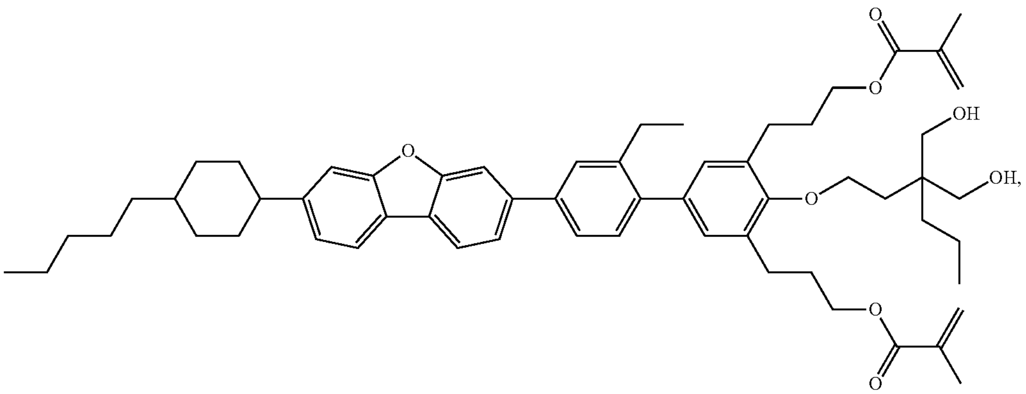

-continued

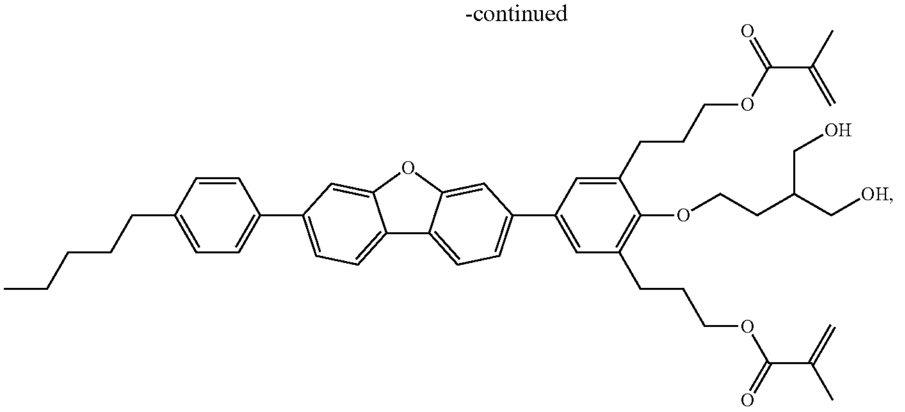

and

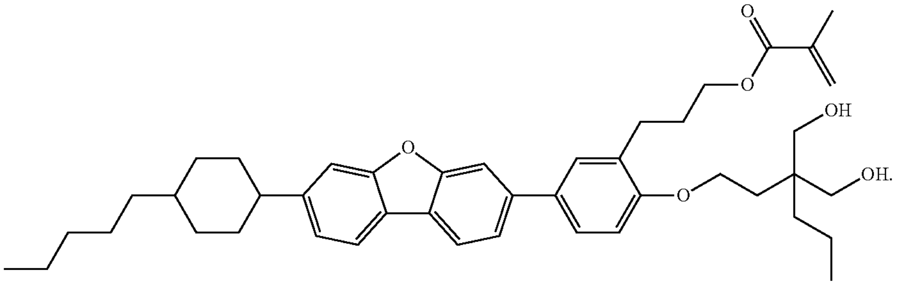

In the disclosure, the definition of Sp in formula II-1 is the same as the definition of Sp in formula I. In some embodiments, Sp in formula II-1 is independently selected from the same group or different groups as Sp in formula I. In addition, at least one Sp in formula II-1 is a polymerizable group.

In some embodiments, the first polymerizable compound is selected from at least one of a group consisting of the following compounds:

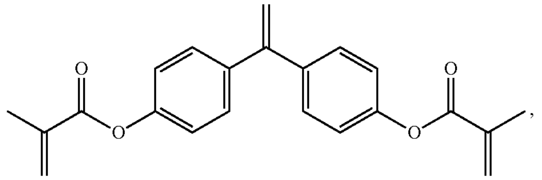

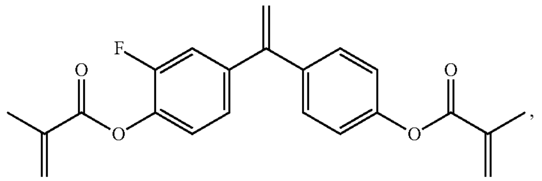

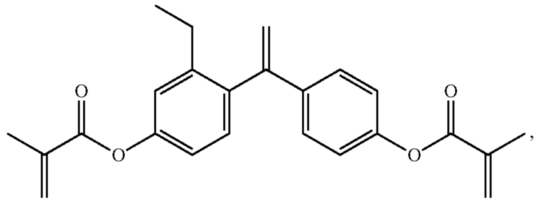

-continued

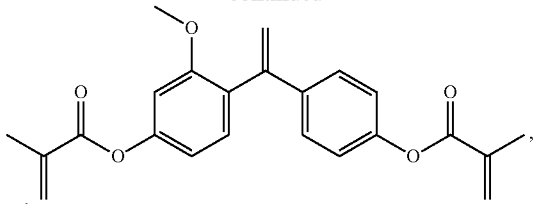

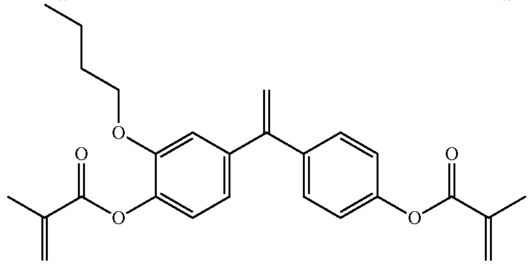

and

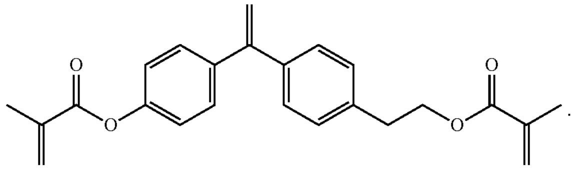

In the embodiments of the disclosure, in the first polymerizable compound represented by formula II-1, vinyl is connected between two benzene rings. Since the vinyl can disrupt the electronic cloud structure of the benzene rings that is the main chain structure of the first polymerizable compound, the reaction activity decreases and the reaction rate slows down during the polymerization reaction of the first polymerizable compound under ultraviolet light irradiation (e.g. wavelength λ of 313 nm), reducing the formation rate of the pre-tilt angle of liquid crystal molecules during the alignment process and improving the uniformity of light irradiation.

In some embodiments, the polymerizable compound further includes a second polymerizable compound represented by the following formula II-2:

(II-2)

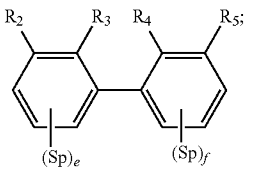

in which definitions of Sp, $R_2$, $R_3$, $R_4$, and $R_5$, e, and f in formula II-2 are the same as the definitions of Sp, $R_2$, $R_3$, $R_4$, and $R_5$, e, and f in formula II-1.

In the disclosure, the definition of Sp in formula II-2 is the same as the definition of Sp in formula I. In some embodiments, Sp in formula II-2 is independently selected from the same group or different groups as Sp in formula I.

In some embodiments, the second polymerizable compound is selected from at least one of a group consisting of the following compounds:

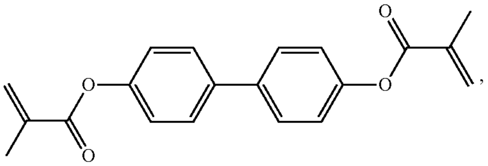

,

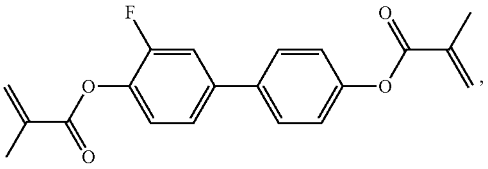

,

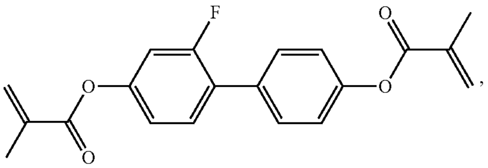

,

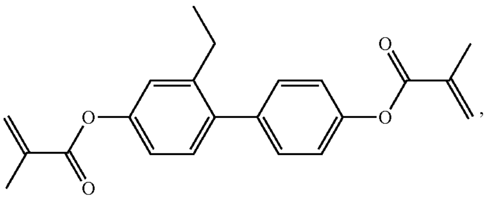

,

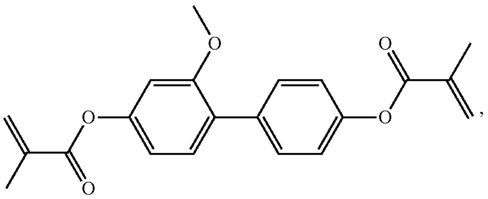

,

-continued

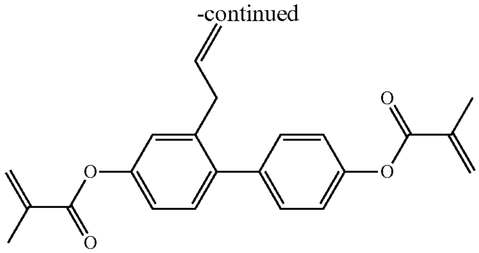

,

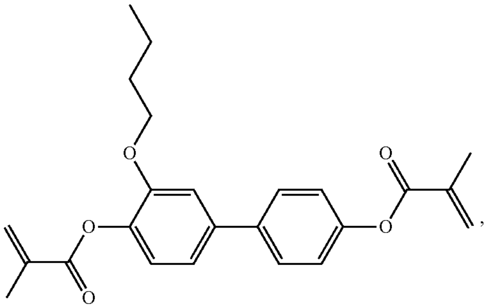

, and

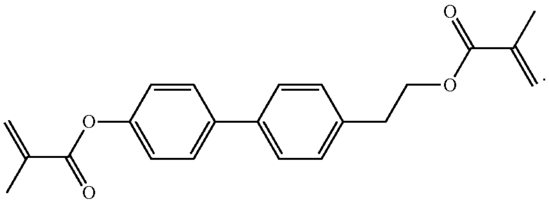 [SMILES: C=C(C)C(=O)OCCc1ccc(-c2ccc(OC(=O)C(=C)C)cc2)cc1]

.

In the embodiments of the disclosure, the second polymerizable compound represented by formula II-2 has higher polymerization activity and faster reaction rate under ultraviolet light irradiation, so that in the liquid crystal composition including both the first polymerizable compound and the second polymerizable compound, the first polymerizable compound has slower reaction rate and the second polymerizable compound has faster reaction rate, and therefore, by adjusting the ratio of the first polymerizable compound to the second polymerizable compound in the liquid crystal composition, the formation rate of the pre-tilt angle of liquid crystal molecules can be adjusted during the alignment process, and more alignment requirements can be met.

In some embodiments, the polymerizable compound further includes a third polymerizable compound represented by the following formula II-3:

II-3

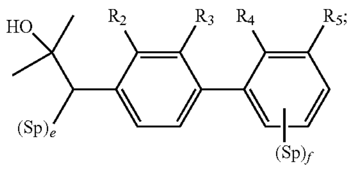

in which definitions of Sp, $R_2$, $R_3$, $R_4$, and $R_5$, e, and f in formula II-3 are the same as the definitions of Sp, $R_2$, $R_3$, $R_4$, and $R_5$, e, and f in formula II-1.

In the disclosure, the definition of Sp in formula I-3 is the same as the definition of Sp in formula I. In some embodiments, Sp in formula I-3 is independently selected from the same group or different groups as Sp in formula I.

In some embodiments, the third polymerizable compound is selected from at least one of a group consisting of the following compounds:

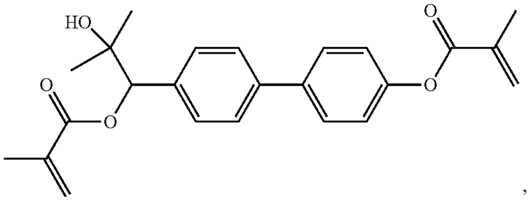

,

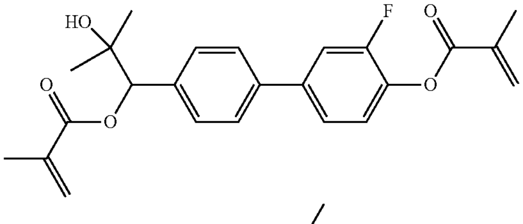

,

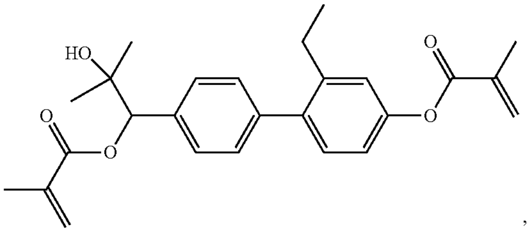

,

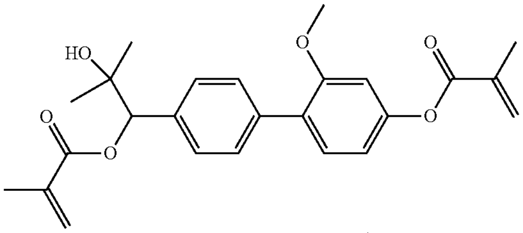

,

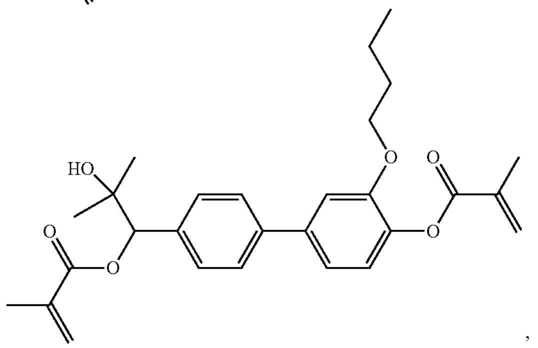

, and

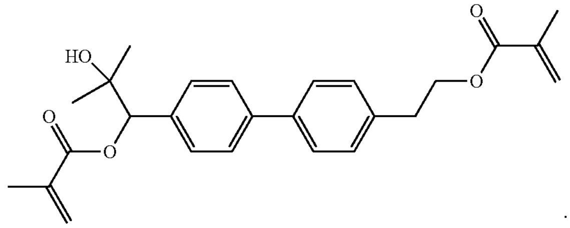

.

In the embodiments of the disclosure, the third polymerizable compound represented by formula II-3 contains —OH, which can quench free radicals generated by other components of the liquid crystal composition under ultraviolet light irradiation, thereby improving the stability of the liquid crystal composition, enhancing the voltage retention rate (VHR) of liquid crystal molecules formed using the liquid crystal composition, and improving the reliability of the liquid crystal composition.

In some embodiments, at least one Sp in the self-aligning compounds represented by formulae II-1, II-2, and II-3 is a polymerizable group, and the polymerizable group contains at least one unsaturated bond such as a carbon-carbon double bond or a carbon-carbon triple bond.

In some embodiments, the liquid crystal compound is represented by the following formula III:

III

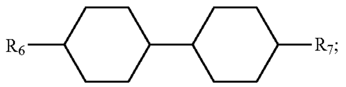

in which $R_6$ and $R_7$ are independently selected from —H, —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms;

one or more end groups in $R_6$ and $R_7$ are not replaced, or, one or more end groups in $R_6$ and $R_7$ are independently replaced by —CN or —$CF_3$;

one or more —$CH_2$— groups in $R_6$ and $R_7$ are not replaced, or, one or more —$CH_2$— groups in $R_6$ and $R_7$ are independently replaced by —O—, —S—, —CO—, —C(O)O—, —OC(O)—, —$CF_2$O—, —O$CF_2$—, —$CH_2CH_2$—, —$CH_2$O—, —O$CH_2$—, —CH═CH—, —C≡C—, and heteroatoms therein directly linked to C are not directly linked to each other; and one or more H atoms in $R_6$ and $R_7$ are unsubstituted, or, one or more H atoms in $R_6$ and $R_7$ are independently substituted by F, Cl, Br, or I.

In some embodiments, the self-alignment compound in the liquid crystal composition ranges from 0.01% to 1.50% by mass on a total mass of the liquid crystal composition, for example, 0.01%, 0.05%, 0.10%, 0.15%, 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.0%, 1.05%, 1.10%, 1.15%, 1.20%, 1.25%, 1.30%, 1.35%, 1.40%, 1.45%, or 1.50%.

In some embodiments, the polymerizable compound in the liquid crystal composition ranges from 0.01% to 1.50% by mass on the total mass of the liquid crystal composition, for example, 0.01%, 0.05%, 0.10%, 0.15%, 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.0%, 1.05%, 1.10%, 1.15%, 1.20%, 1.25%, 1.30%, 1.35%, 1.40%, 1.45%, or 1.5%.

In some embodiments, the first polymerizable compound in the liquid crystal composition ranges from 0 to 1.20% by mass on the total mass of the liquid crystal composition, for example, 0, 0.01%, 0.05%, 0.10%, 0.15%, 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.0%, 1.05%, 1.10%, 1.15%, or 1.20%; the second polymerizable compound in the liquid crystal composition ranges from 0.01% to 1.50% by mass on the total mass of the liquid crystal composition, for example, 0.01%, 0.05%, 0.10%, 0.15%, 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.0%, 1.05%, 1.10%, 1.15%, 1.20%, 1.25%, 1.30%, 1.35%, 1.40%, 1.45%, or 1.5%; and the third polymerizable compound in the liquid crystal composition ranges from 0 to 1.20% by mass on the total mass of the liquid crystal composition, for example, 0, 0.01%, 0.05%, 0.10%, 0.15%, 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1.0%, 1.05%, 1.10%, 1.15%, or 1.20%.

In some embodiments, the liquid crystal compound represented by formula III in the liquid crystal composition ranges from 5% to 70% by mass on the total mass of the liquid crystal composition, for example, 5%, 10%, 15%, 20%, 25%, 30%, 35%, 40%, 45%, 50%, 55%, 60%, 65%, or 70%.

In some embodiments, the liquid crystal composition further includes other liquid crystal materials, such as a polar functional compound. In some embodiments, the functional compound is selected from at least one of a group consisting of compounds represented by the following formulae IV, V, and VI:

IV

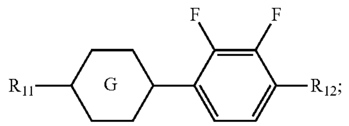

V

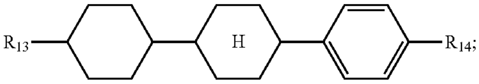 and

VI

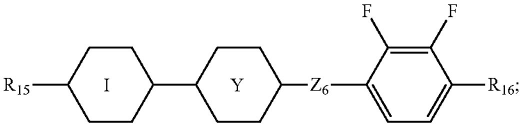

in which

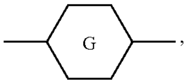, 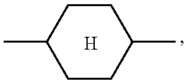, and 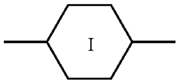

are independently selected from

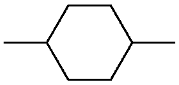 or 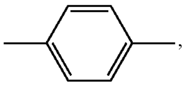,

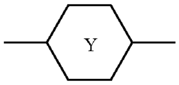

is selected from

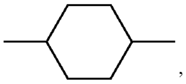, 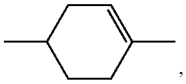, or 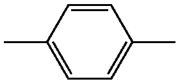, and one or more $—CH_2—$ groups not connected together in

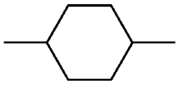

are not replaced or independently replaced by —O—.

$Z_6$ is selected from a single bond, —O—, —S—, —CO—, —C(O)O—, —OC(O)—, $—CF_2O—$, $—OCF_2—$, $—CH_2CH_2—$, $—CH_2O—$, $—OCH_2—$, —CH=CH—, an alkylidene group having 1-10 carbon atoms, an alkenylidene group having 2-10 carbon atoms, or an alkynyl group having 2-10 carbon atoms; one or more $—CH_2—$ groups not connected together in $Z_6$ are not replaced, or, one or more $—CH_2—$ groups not connected together in $Z_6$ are independently replaced by —O—, —S—, —CO—, —C(O)O—, —OC(O)—, $—CF_2O—$, $—OCF_2—$, $—CH_2CH_2—$, $—CH_2O—$, $—OCH_2—$, —CH=CH—, or —C≡C—; and one or more H atoms in $Z_6$ are unsubstituted, or, one or more H atoms in $Z_6$ are independently substituted by F, Cl, Br, or I; and $R_{11}$, $R_{12}$, $R_{13}$, $R_{14}$, $R_{15}$, and $R_{16}$ are independently selected from —H, —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms; one or more end groups in $R_{11}$, $R_{12}$, $R_{13}$, $R_{14}$, $R_{15}$, and $R_{16}$ are not replaced, or, one or more end groups in $R_{11}$, $R_{12}$, $R_{13}$, $R_{14}$, $R_{15}$, and $R_{16}$ are independently replaced by —CN or $—CF_3$; one or more $—CH_2—$ groups in $R_{11}$, $R_{12}$, $R_{13}$, $R_{14}$, $R_{15}$, and $R_{16}$ are not replaced, or, one or more $—CH_2—$ groups in $R_{11}$, $R_{12}$, $R_{13}$, $R_{14}$, $R_{15}$, and $R_{16}$ are independently replaced by —O—, —S—, —CO—, —C(O)O—, —OC(O)—, $—CF_2O—$, $—OCF_2—$, $—CH_2CH_2—$, $—CH_2O—$, $—OCH_2—$, —CH=CH—, or —C≡C—, and heteroatoms therein directly linked to C are not directly linked to each other; and one or more H atoms in Ru, $R_{12}$, $R_{13}$, $R_{14}$, $R_{15}$, and $R_{16}$ are unsubstituted, or, one or more H atoms in $R_{11}$, $R_{12}$, $R_{13}$, $R_{14}$, $R_{15}$, and $R_{16}$ are independently substituted by F, Cl, Br, or I.

In some embodiments, the compound represented by formula IV in the liquid crystal composition ranges from 1% to 30% by mass on the total mass of the liquid crystal composition, for example, 1%, 5%, 10%, 15%, 20%, 25%, or 30%; the compound represented by formula V in the liquid crystal composition ranges from 1% to 30% by mass on the total mass of the liquid crystal composition, for example, 1%, 5%, 10%, 15%, 20%, 25%, or 30%; and the compound represented by formula VI in the liquid crystal composition ranges from 1% to 40% by mass on the total mass of the liquid crystal composition, for example, 1%, 5%, 10%, 15%, 20%, 25%, 30%, or 40%.

In some embodiments, the liquid crystal materials of the liquid crystal composition include at least one compound represented by formulae III, at least one compound represented by formulae IV, at least one compound represented by formula V, and at least one compound represented by formula VI. On a total mass of the liquid crystal composition, the compound represented by formula III in the liquid crystal composition ranges from 5% to 70% by mas, the compound represented by formula IV in the liquid crystal composition ranges from 1% to 30% by mass, the compound represented by formula V in the liquid crystal composition ranges from 1% to 30% by mass, and the compound represented by formula VI in the liquid crystal composition ranges from 1% to 40% by mass.

In some embodiments, the liquid crystal compound of the liquid crystal composition has negative dielectric anisotropy and can be applied to liquid crystal displays with a vertical alignment (VA) mode, a polymer sustained alignment (PSA), a polymer stabilized vertical alignment (PS-VA), a patterned vertical alignment (PVA), a multi-domain vertical alignment (MVA) mode, or the like.

The disclosure further provide synthesis processes of the self-alignment compounds (

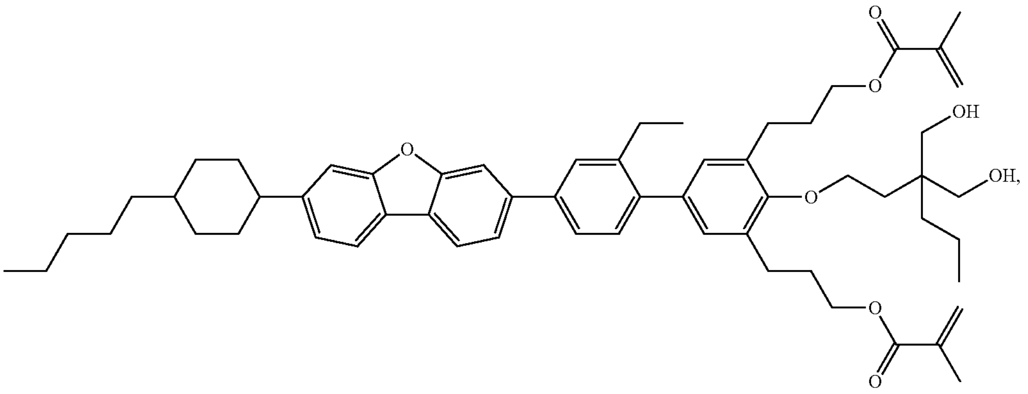

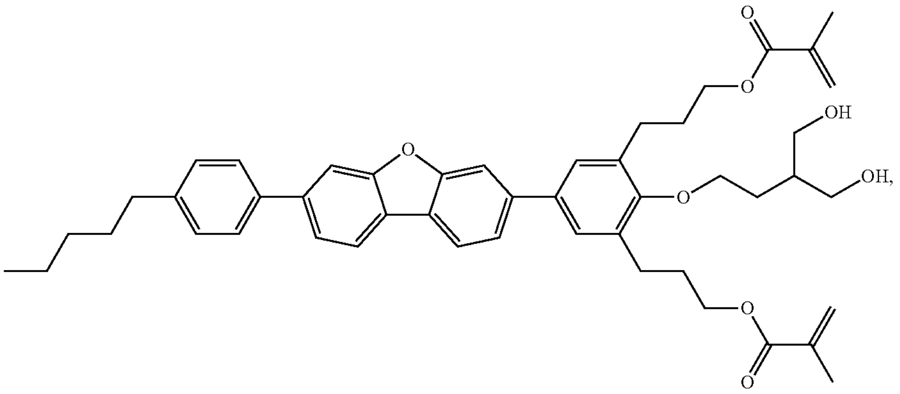

and

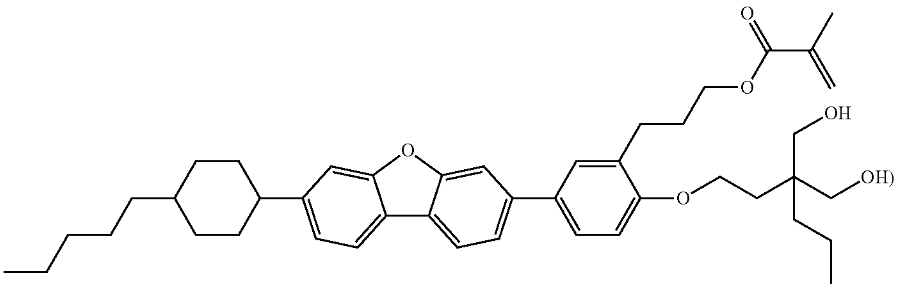

in the following.

The synthesis route of
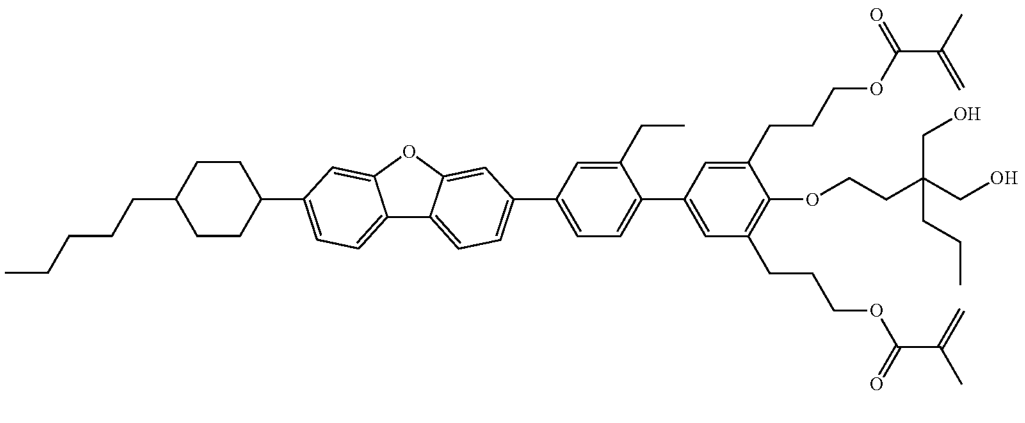 [SMILES: C=C(C)C(=O)OCCCc1cc(-c2ccc(-c3ccc4c(c3)oc3cc(C5CCC(CCCCC)CC5)ccc34)cc2CC)cc(CCCOC(=O)C(=C)C)c1OCCC(CO)(CO)CCC]
(hereafter referred to as "self-alignment compound 1") is as follows:
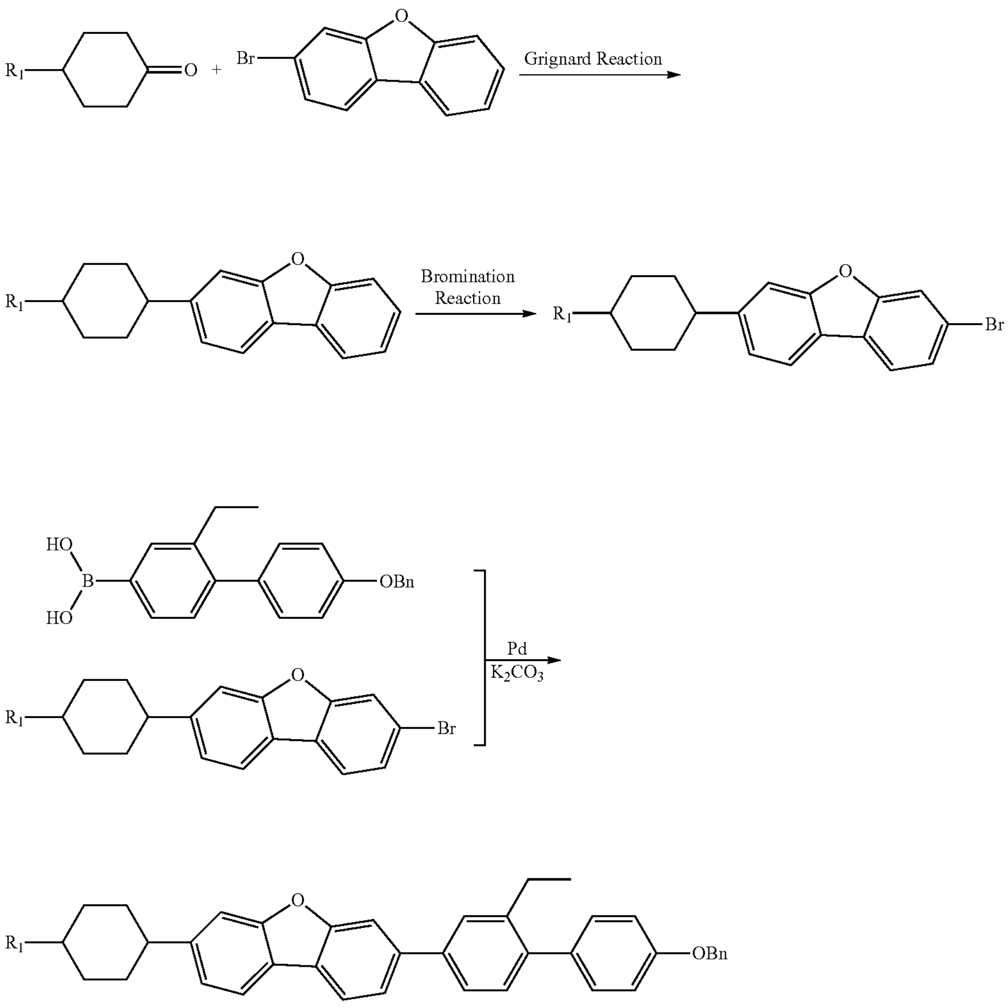

-continued
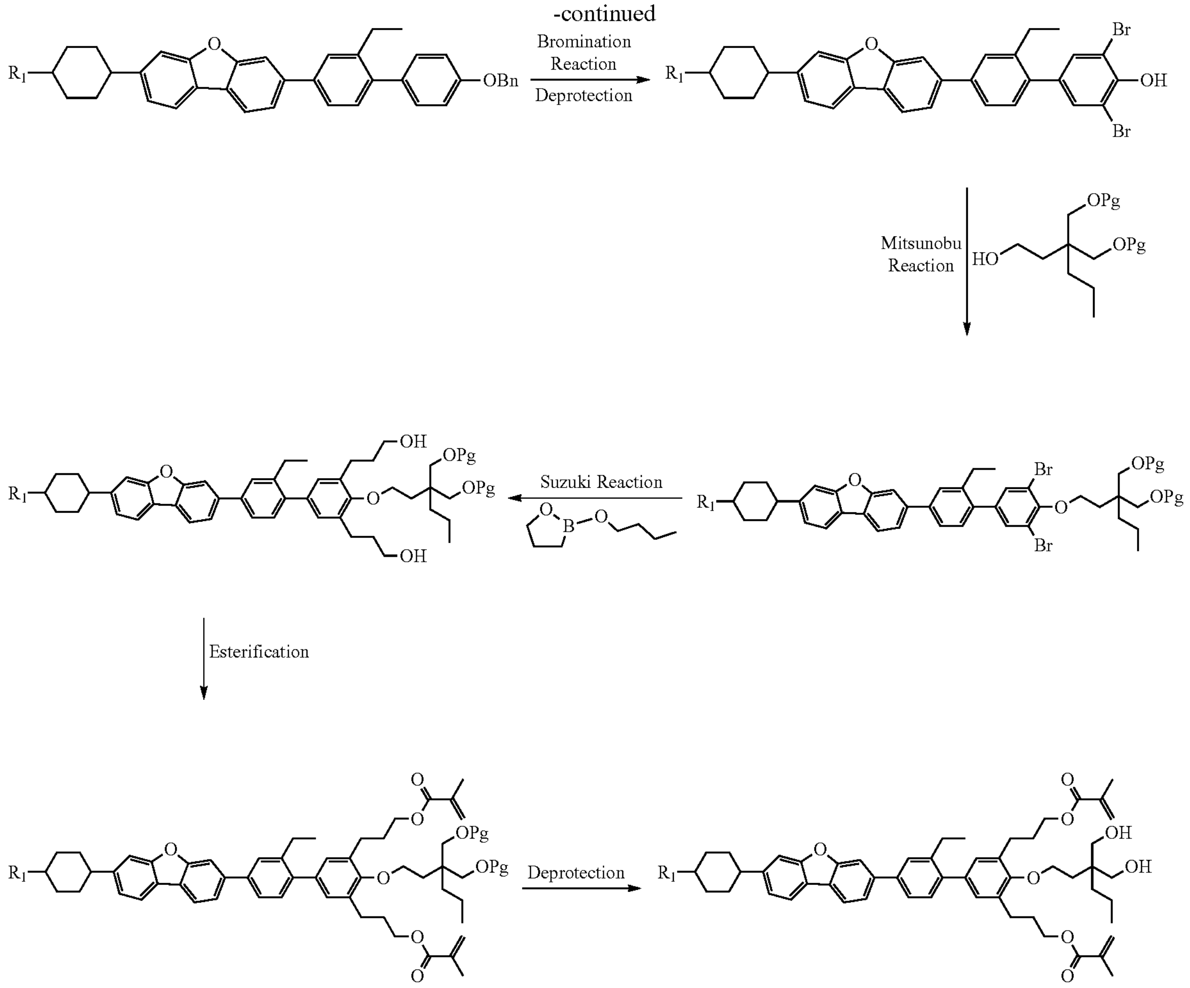
In the synthesis route of the self-alignment compound 1, $R_1$ represents pentyl ($C_5H_{11}$). The high-resolution mass spectrometry result of the self-alignment compound 1 was as follows: $[M+H]^+$ of 913.6.
The synthesis route of
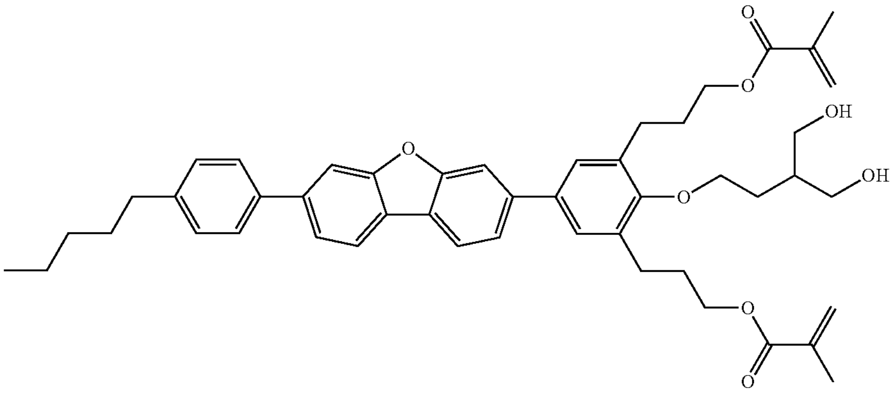 [SMILES: C=C(C)C(=O)OCCCc1cc(-c2ccc3c(c2)oc2cc(-c4ccc(CCCCC)cc4)ccc23)cc(CCCOC(=O)C(=C)C)c1OCCC(CO)CO]
(hereafter referred to as "self-alignment compound 2") is as follows:

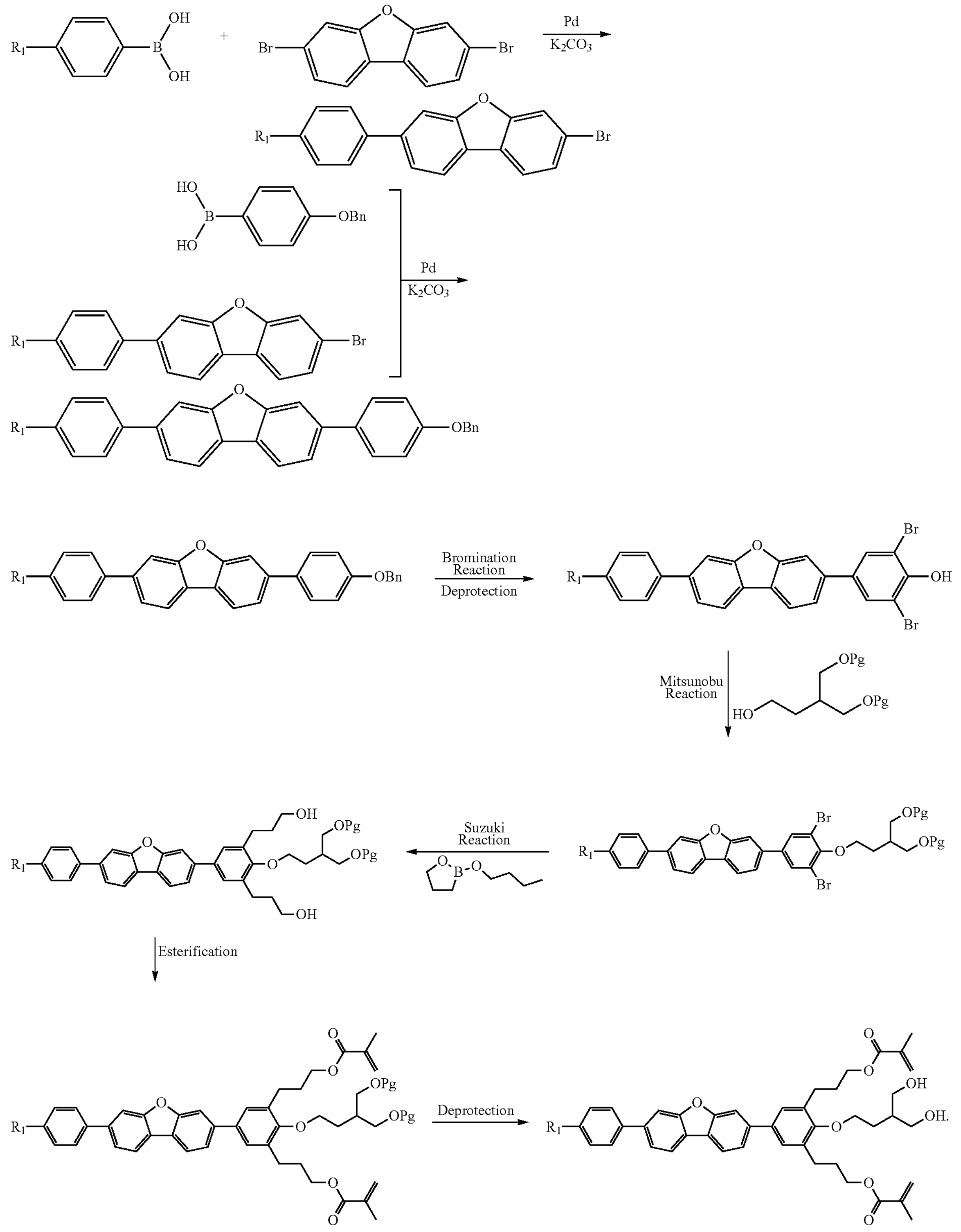
In the synthesis route of the self-alignment compound 2, $R_1$ represents pentyl ($C_5H_{11}$). The high-resolution mass spectrometry result of the self-alignment compound 2 was as follows: $[M+H]^+$ of 761.4.

The synthesis route of
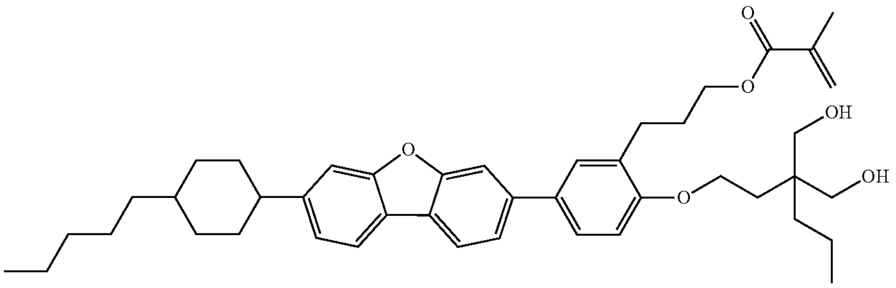 [SMILES: C=C(C)C(=O)OCCCc1cc(-c2ccc3c(c2)oc2cc(C4CCC(CCCCC)CC4)ccc23)ccc1OCCC(CO)(CO)CCC]
(hereafter referred to as "self-alignment compound 3") is as follows:
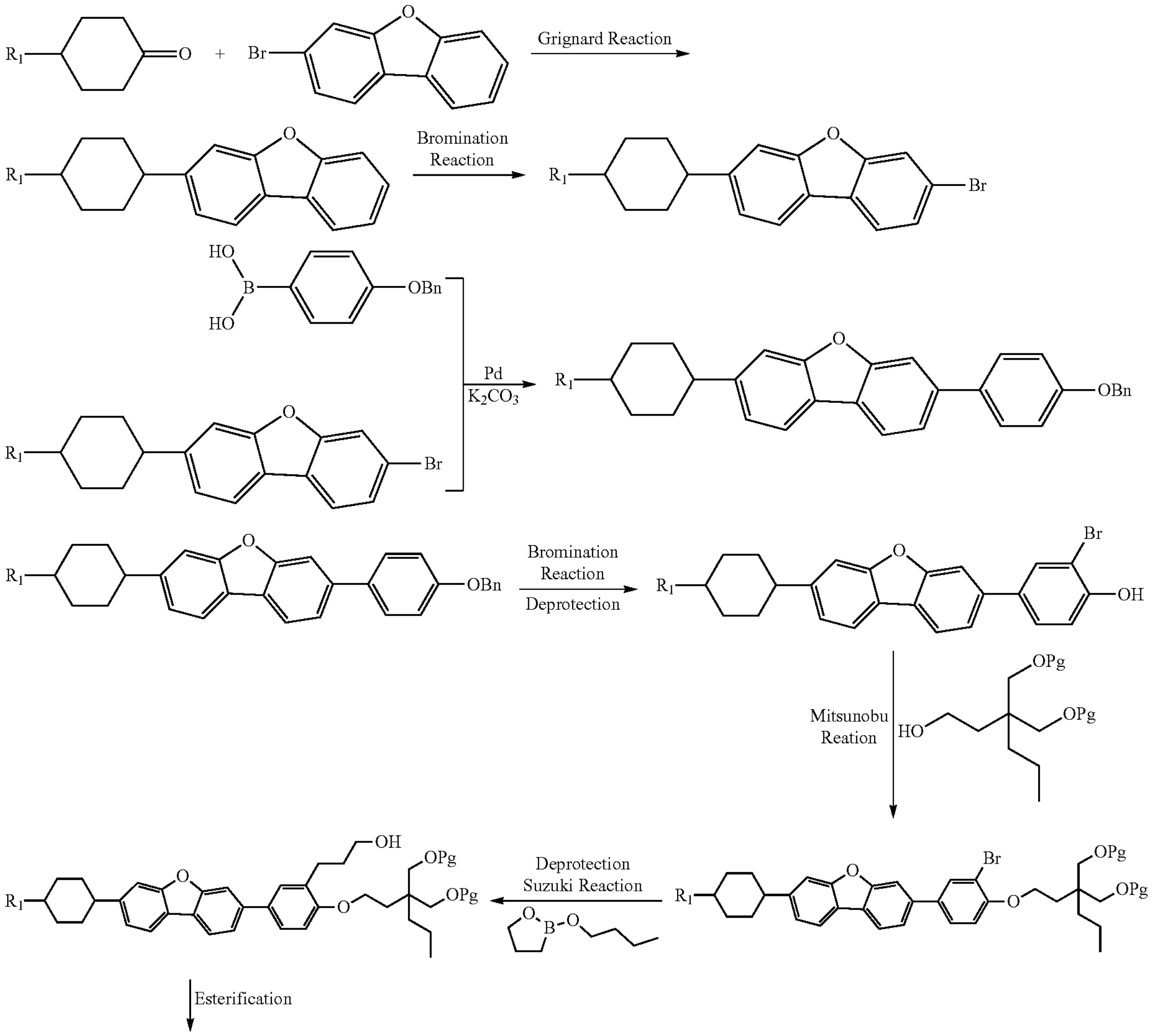

-continued

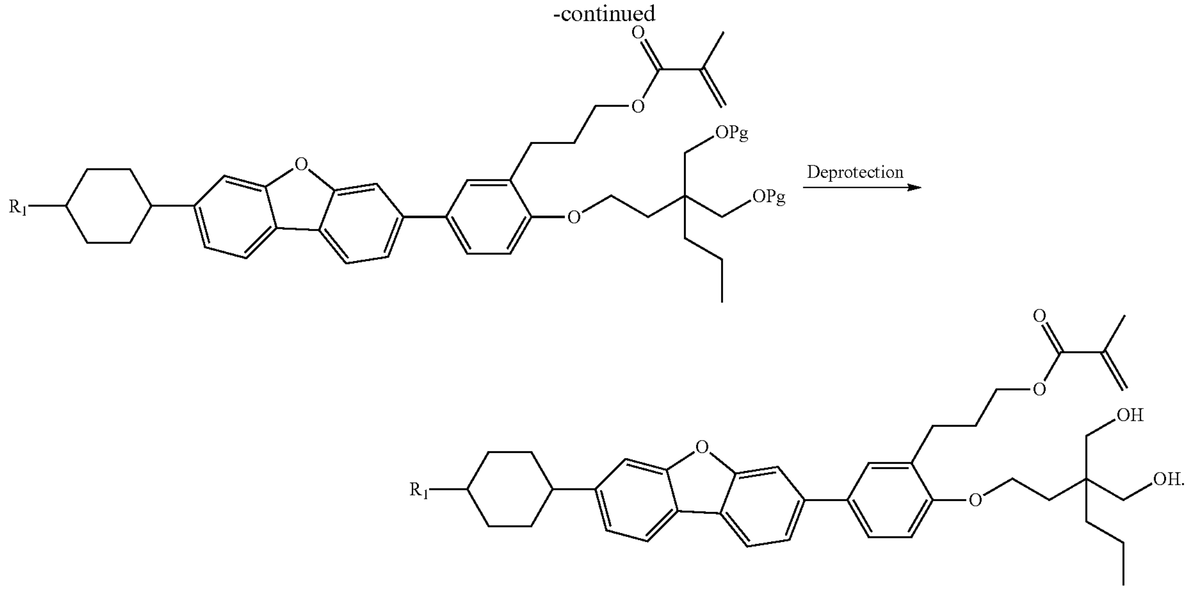

In the synthesis route of the self-alignment compound 3, $R_1$ represents pentyl ($C_5H_{11}$). The high-resolution mass spectrometry result of the self-alignment compound 3 was as follows: $[M+H]^+$ of 683.4.

In the embodiments of the disclosure, by providing the liquid crystal composition including the self-alignment compound represented by formula I and the first polymerizable compound represented by formula II-1, when the liquid crystal composition is placed between two substrates, the self-alignment compound and the first polymerizable compound undergo polymerization reaction under ultraviolet light irradiation, so as to form a polymer layer on surfaces of the substrates. Moreover, the rigid chain functional groups in the self-alignment compound may function as stereo barriers perpendicular to the substrates, so as to guide the liquid crystal molecules to arrange in a direction perpendicular to the substrates, achieving self-aligning function of the liquid crystal molecules, omitting the preparation of PI alignment layers, reducing the manufacturing processes of the display panel, and reducing the manufacturing cost of the display panel. In addition, the first polymerizable compound represented by formula II-1 can effectively reduce the formation rate of the pre-tilt angle of liquid crystal molecules during the alignment process, thereby improving the uniformity of light irradiation. In some embodiments, the liquid crystal composition further includes the third polymerizable compound represented by formula II-3, the third polymerizable compound can effectively enhance the stability of the liquid crystal composition, thereby improving the VHR of liquid crystal molecules and enhancing the reliability of the liquid crystal composition.

As illustrated in FIG. 1, some embodiments of the disclosure further provide a display panel, which includes a first substrate 11, a second substrate 12, a liquid crystal layer 13, and an alignment layer 14.

The first substrate 11 and the second substrate 12 are arranged opposite to each other, the liquid crystal layer 13 is disposed between the first substrate 11 and the second substrate 12, and the alignment layer 14 is disposed at least on a side of the first substrate 11 close to the liquid crystal layer 13.

In some embodiments, the alignment layer 14 is formed by the polymerization of the self-alignment compound and the polymerizable compound in the liquid crystal composition as described in any one of the above-mentioned embodiments.

In some embodiments, the alignment layer 14 includes a first alignment layer 141 and a second alignment layer 142, the first alignment layer 141 is disposed on a side of the first substrate 11 close to the liquid crystal layer 13, and the second alignment layer 142 is disposed on a side of the second substrate 12 close to the liquid crystal layer 13.

In some embodiments, the liquid crystal layer 13 is prepared from the liquid crystal compound in the liquid crystal composition as described in any one of the above-mentioned embodiments, and the alignment layer 14 is prepared by the polymerization of the self-alignment compound and polymerizable compound in the liquid crystal composition as described in any one of the above-mentioned embodiments.

In some embodiments, the display panel includes one of the VA mode, the PSA mode, the PS-VA mode, the PVA mode, and the MVA mode.

In some embodiments, the first substrate 11 is a color film substrate, and the second substrate 12 is an array substrate.

The display panel includes an electrode group disposed in one or both of the first substrate 11 and the second substrate 12, a plurality of active elements (such as thin film transistors) disposed in the second substrate 12, and a color film layer disposed in the first substrate 11 or the second substrate 12.

In some embodiments, the electrode group includes a plurality of pixel electrodes disposed in the second substrate 12 and a plurality of common electrodes disposed on at least one of the first substrate 11 and the second substrate 12.

In some embodiments, the color film layer includes a plurality of red (R) filters, a plurality of green (G) filters, and a plurality of blue (B) filters arranged in an array. The R filters contain diketopyrrolopyrrole or other organic dye compounds. Water-soluble dyes contained in the R filters are less than or equal to 1.5% by mass, and 90% of the water-soluble dyes by mass on a total mass of the R filters have a particle size of 0 nm to 100 nm.

For example, the particle size of the water-soluble dyes in the R filters is 10 nm, 20 nm, 30 nm, 40 nm, 50 nm, 60 nm, 70 nm, 80 nm, 90 nm, 100 nm, or the like.

It can be understood that the smaller the particle size of the water-soluble dyes in the R filters, the more favorable it is for the water-soluble dyes to be evenly distributed, thereby improving the penetration rate, reliability, and color gamut of the display device including the display panel.

In the display panel using the liquid crystal composition provided by the embodiments of the disclosure, since the liquid crystal composition includes the self-alignment compound represented by formula I and the first polymerizable compound represented by formula II-1, when the liquid crystal composition is placed between two substrates, the self-alignment compound and the first polymerizable compound undergo polymerization reaction under ultraviolet light irradiation, so as to form a polymer layer on surfaces of the substrates. Moreover, the rigid chain functional groups in the self-alignment compound may function as stereo barriers perpendicular to the substrates, so as to guide the liquid crystal molecules to arrange in a direction perpendicular to the substrates, achieving self-aligning function of the liquid crystal molecules, omitting the preparation of PI alignment layers, reducing the manufacturing processes of the display panel, and reducing the manufacturing cost of the display panel. In addition, the first polymerizable compound represented by formula II-1 can effectively reduce the formation rate of the pre-tilt angle of liquid crystal molecules during the alignment process, thereby improving the uniformity of light irradiation. In some embodiments, the liquid crystal composition further includes the third polymerizable compound represented by formula II-3, the third polymerizable compound can effectively enhance the stability of the liquid crystal composition, thereby improving the VHR of liquid crystal molecules and enhancing the reliability of the liquid crystal composition.

The following Examples 1-3 and Comparative Examples 1-2 of the disclosure provide different exemplary combinations of the above-mentioned compounds in liquid crystal composition, obtaining the parameters of the liquid crystal compositions.

The method for preparing the liquid crystal compositions provided in Examples 1-3 and Comparative Examples 1-2 includes the following steps:

weighing and mixing liquid crystal materials in the required mass percentage to obtain a first mixture, in which the liquid crystal materials include the liquid crystal compound and the functional compound; for example, weighing and mixing different components of the liquid crystal materials sequentially in an order of melting points from low to high;

stirring and heating the first mixture at a temperature ranging from 60° C. to 100° C., so as to thoroughly dissolve and mix different components of the liquid crystal materials;

adding the self-alignment additive and the polymerizable compound to the first mixture in a certain mass percentage to obtain a second mixture, and mixing the second mixture evenly; and cooling the second mixture to room temperature and encapsulating the second mixture to obtain the liquid crystal composition.

In the following property parameters of Examples 1-3 and Comparative Examples 1-2, Tni (unit: ° C.) indicates a clearing point of the liquid crystal composition, Δn indicates an optical anisotropy of the liquid crystal composition at temperature of 25° C., $n_e$ indicates refractive index of extraordinary ray, γ1 (unit: mPa s) indicates rotational viscosity of the liquid crystal composition at temperature of 25° C., Δε indicates a dielectric anisotropy of the liquid crystal composition at temperature of 25° C., ε⊥ indicates a dielectric constant of the liquid crystal composition in a direction perpendicular to a long axis of the liquid crystals, $K_{11}$ indicates a splaying elastic coefficient of the liquid crystal composition, and $K_{33}$ indicates a bending elastic coefficient of the liquid crystal composition.

Exemplary combinations of the above-mentioned compounds in the liquid crystal compositions provided in Examples 1-3 and Comparative Examples 1-2 are shown in the following Tables 1-5.

Compounds 1-15 used in the liquid crystal composition provided in Example 1 are shown in Table 1 as to their formulae, structures, and amounts by mass. In Table 1, the Compounds 1-11 are liquid crystal materials, and the Compounds 1-11 are 100% by mass on a total mass of the liquid crystal materials of the liquid crystal composition; the Compound 12 is the second polymerizable compound; the Compound 13 is the first polymerizable compound; the Compound 14 is the third polymerizable compound; and the Compound 15 is the self-alignment compound. On a total mass of the liquid crystal composition, the Compounds 1-11 are 99.1% by mass, the Compound 12 is 0.16% by mass, the Compound 13 is 0.02% by mass, the Compound 14 is 0.12% by mass, and the Compound 15 is 0.60% by mass.

TABLE 1

Compounds of the liquid crystal composition in Example 1

| Compound | Formula | Structure | Amount by mass (%) |
|---|---|---|---|
| Compound 1 | III | 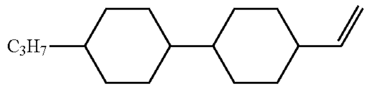 | 18 |
| Compound 2 | III | 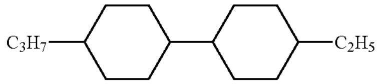 | 6 |
| Compound 3 | | 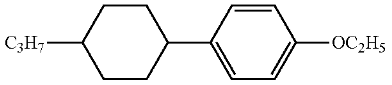 | 10 |

TABLE 1-continued
Compounds of the liquid crystal composition in Example 1
| Compound | Formula | Structure | Amount by mass (%) |
|---|---|---|---|
| Compound 4 | V | 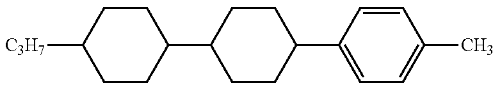 | 8 |
| Compound 5 | V | 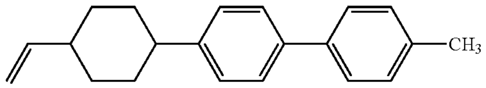 | 6 |
| Compound 6 | IV | 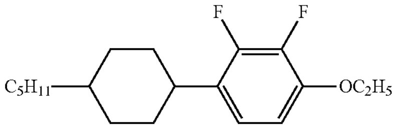 | 12 |
| Compound 7 | IV | 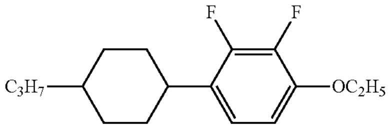 | 10 |
| Compound 8 | VI | 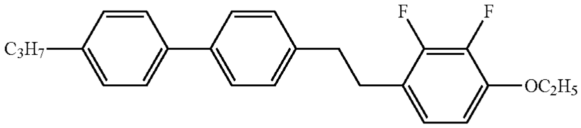 | 5 |
| Compound 9 | VI | 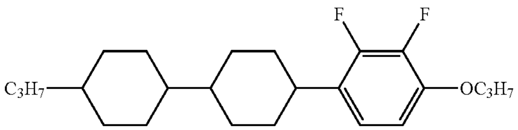 | 10 |
| Compound 10 | VI | 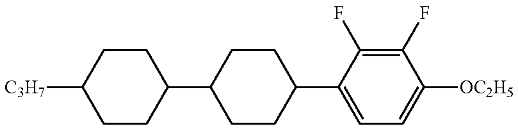 | 8 |
| Compound 11 | VI | 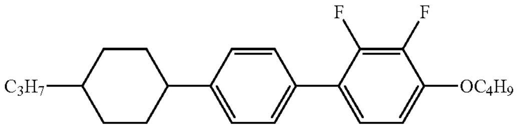 | 7 |
| Compound 12 | II-2 | 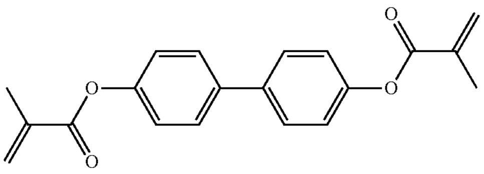 [SMILES: C=C(C)C(=O)Oc1ccc(-c2ccc(OC(=O)C(=C)C)cc2)cc1] | 0.16 |
| Compound 13 | II-1 | 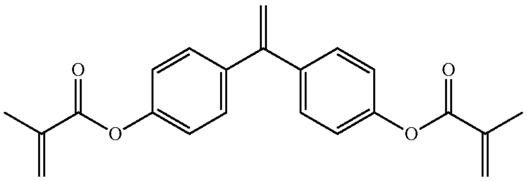 [SMILES: C=C(C)C(=O)Oc1ccc(C(=C)c2ccc(OC(=O)C(=C)C)cc2)cc1] | 0.02 |

TABLE 1-continued

| Compounds of the liquid crystal composition in Example 1 | | | |
|---|---|---|---|
| Compound | Formula | Structure | Amount by mass (%) |
| Compound 14 | II-3 | 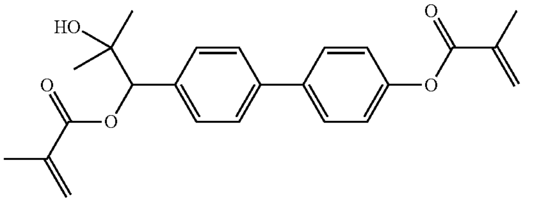 [SMILES: C=C(C)C(=O)Oc1ccc(-c2ccc(C(OC(=O)C(=C)C)C(C)(C)O)cc2)cc1] | 0.12 |
| Compound 15 | I | 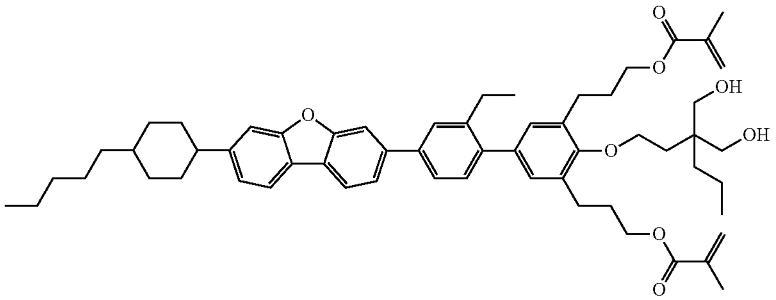 [SMILES: C=C(C)C(=O)OCCCc1cc(-c2ccc(-c3ccc4c(c3)oc3cc(C5CCC(CCCCC)CC5)ccc34)cc2CC)cc(CCCOC(=O)C(=C)C)c1OCCC(CO)(CO)CCC] | 0.60 |

The liquid crystal composition provided in Example 1 has the following property parameters: Tni of 82° C., γ1 of 89 mPa·s, Δn of 0.118, $n_c$ of 1.603, Δε of −3.2, 81 of 6.4. $K_{11}$ of 14.4, and $K_{33}$ of 15.6. There is no crystal precipitation when the liquid crystal composition is stayed at −20° C. for 480 hours.

Compounds 1-16 used in the liquid crystal composition provided in Example 2 are shown in Table 2 as to their formulae, structures, and amounts by mass. In Table 2, the Compounds 1-12 are liquid crystal materials, and the Compounds 1-12 are 100% by mass on a total mass of the liquid crystal materials of the liquid crystal composition; the Compound 13 is the second polymerizable compound; the Compound 14 is the first polymerizable compound; the Compound 15 is the third polymerizable compound; and the Compound 16 is the self-alignment compound. On a total mass of the liquid crystal composition, the Compounds 1-12 are 99.1% by mass, the Compound 13 is 0.16% by mass, the Compound 14 is 0.02% by mass, the Compound 15 is 0.12% by mass, and the Compound 16 is 0.60% by mass.

TABLE 2

| Compounds of the liquid crystal composition in Example 2 | | | |
|---|---|---|---|
| Compound | Formula | Structure | Amount by mass (%) |
| Compound 1 | III | 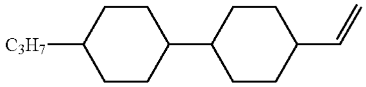 | 18 |
| Compound 2 | III | 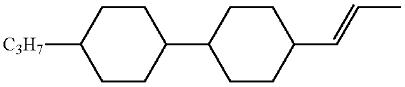 | 6 |
| Compound 3 | | 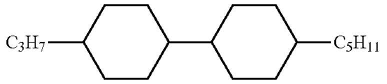 | 5 |
| Compound 4 | V | 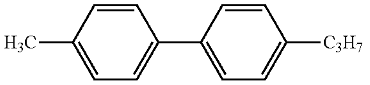 | 8 |
| Compound 5 | V | 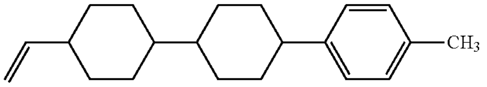 | 9 |

TABLE 2-continued
| Compounds of the liquid crystal composition in Example 2 | | | |
|---|---|---|---|
| Compound | Formula | Structure | Amount by mass (%) |
| Compound 6 | IV | 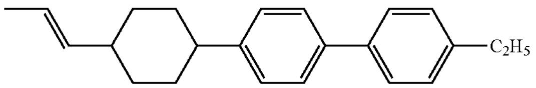 [SMILES: C/C=C/C1CCC(c2ccc(-c3ccc(CC)cc3)cc2)CC1] | 5 |
| Compound 7 | IV | 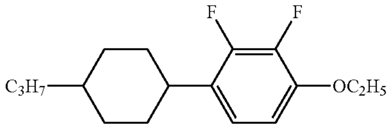 | 8 |
| Compound 8 | VI | 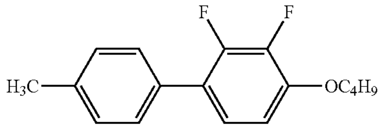 | 5 |
| Compound 9 | VI | 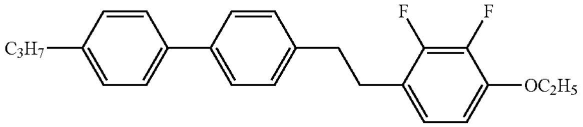 | 8 |
| Compoun 10 | VI | 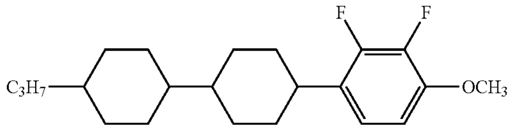 | 10 |
| Compound 11 | VI | 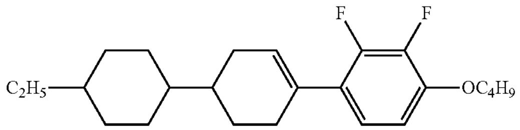 | 13 |
| Compound 12 | VI | 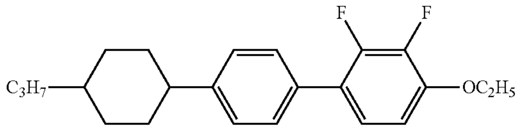 | 5 |
| Compound 13 | II-2 | 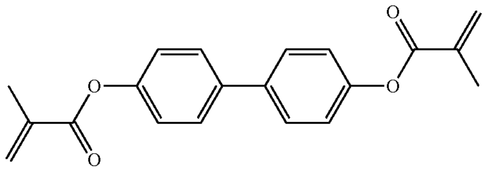 [SMILES: C=C(C)C(=O)Oc1ccc(-c2ccc(OC(=O)C(=C)C)cc2)cc1] | 0.16 |
| Compound 14 | II-1 | 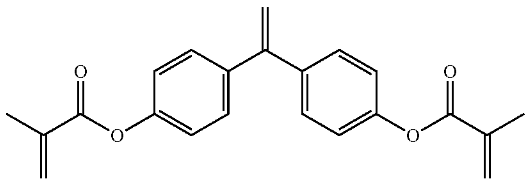 [SMILES: C=C(C)C(=O)Oc1ccc(C(=C)c2ccc(OC(=O)C(=C)C)cc2)cc1] | 0.02 |
| Compound 15 | II-3 | 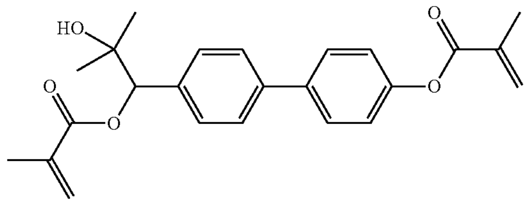 [SMILES: C=C(C)C(=O)Oc1ccc(-c2ccc(C(OC(=O)C(=C)C)C(C)(C)O)cc2)cc1] | 0.12 |

TABLE 2-continued

| Compounds of the liquid crystal composition in Example 2 | | | |
|---|---|---|---|
| Compound | Formula | Structure | Amount by mass (%) |
| Compound 16 | I | 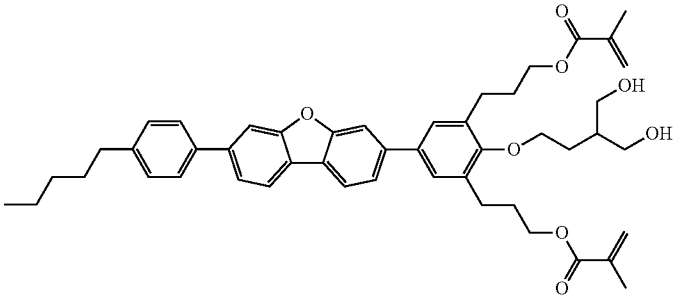 [SMILES: C=C(C)C(=O)OCCCc1cc(-c2ccc3c(c2)oc2cc(-c4ccc(CCCCC)cc4)ccc23)cc(CCCOC(=O)C(=C)C)c1OCCC(CO)CO] | 0.60 |

The liquid crystal composition provided in Example 2 has the following property parameters: Tni of 83° C., γ1 of 91 mPa·s, Δn of 0.128, $n_e$ of 1.609, Δε of −3.1, ε⊥ of 6.2, $K_{11}$ of 14.5, and $K_{33}$ of 15.8. There is no crystal precipitation when the liquid crystal composition is stayed at −20° C. for 480 hours.

Compounds 1-17 used in the liquid crystal composition provided in Example 3 are shown in Table 3 as to their formulae, structures, and amounts by mass. In Table 3, Compounds 1-12 are liquid crystal materials, and the Compounds 1-12 are 100% by mass on a total mass of the liquid crystal materials of the liquid crystal composition; the Compound 13 is the second polymerizable compound; the Compound 14 is the first polymerizable compound; the Compound 15 is the third polymerizable compound; and the Compounds 16-17 are self-alignment compounds. On a total mass of the liquid crystal composition, the Compounds 1-12 are 98.9% by mass, the Compound 13 is 0.16% by mass, the Compound 14 is 0.02% by mass, the Compound 15 is 0.12% by mass, the Compound 16 is 0.40% by mass, and the Compound 17 is 0.40% by mass.

TABLE 3

| Compounds of the liquid crystal composition in Example 3 | | | |
|---|---|---|---|
| Compound | Formula | Structure | Amount by mass (%) |
| Compound 1 | III | 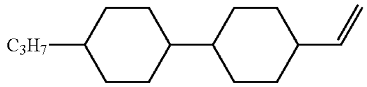 | 20 |
| Compound 2 | III | 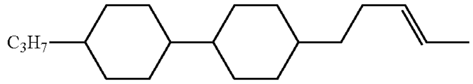 | 9 |
| Compound 3 | | 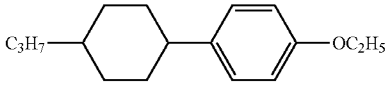 | 8 |
| Compound 4 | V | 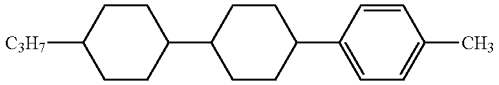 | 6 |
| Compound 5 | V | 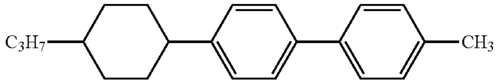 | 3 |
| Compound 6 | V | 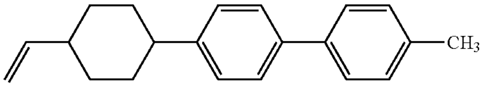 | 5 |
| Compound 7 | IV | 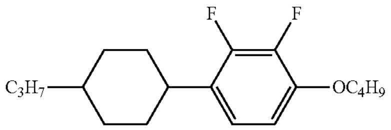 | 7 |

TABLE 3-continued
Compounds of the liquid crystal composition in Example 3
| Compound | Formula | Structure | Amount by mass (%) |
|---|---|---|---|
| Compound 8 | IV | 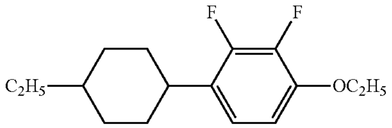 | 10 |
| Compound 9 | VI | 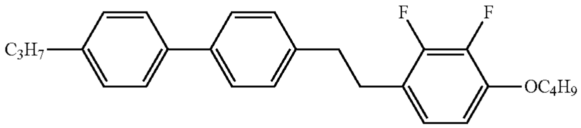 | 6 |
| Compound 10 | VI | 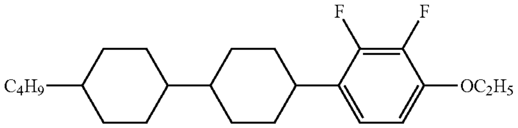 | 8 |
| Compound 11 | VI | 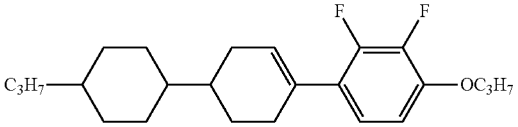 | 10 |
| Compound 12 | VI | 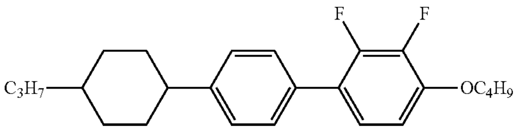 | 8 |
| Compound 13 | II-2 | 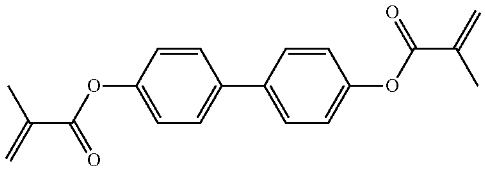 [SMILES: C=C(C)C(=O)Oc1ccc(-c2ccc(OC(=O)C(=C)C)cc2)cc1] | 0.16 |
| Compound 14 | II-1 | 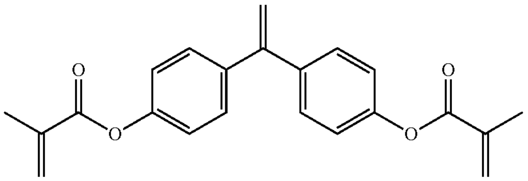 [SMILES: C=C(C)C(=O)Oc1ccc(C(=C)c2ccc(OC(=O)C(=C)C)cc2)cc1] | 0.02 |
| Compound 15 | II-3 | 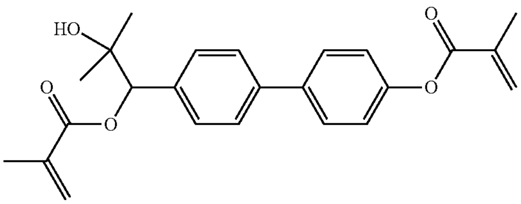 [SMILES: C=C(C)C(=O)Oc1ccc(-c2ccc(C(OC(=O)C(=C)C)C(C)(C)O)cc2)cc1] | 0.12 |

TABLE 3-continued

| Compounds of the liquid crystal composition in Example 3 | | | |
|---|---|---|---|
| Compound | Formula | Structure | Amount by mass (%) |
| Compound 16 | I | 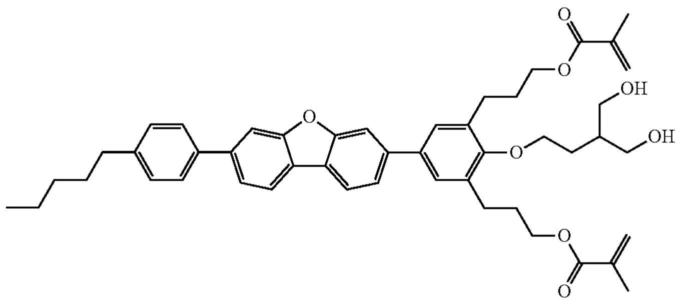 [SMILES: C=C(C)C(=O)OCCCc1cc(-c2ccc3c(c2)oc2cc(-c4ccc(CCCCC)cc4)ccc23)cc(CCCOC(=O)C(=C)C)c1OCCC(CO)CO] | 0.40 |
| Compound 17 | I | 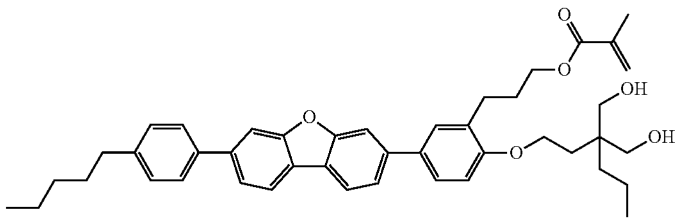 [SMILES: C=C(C)C(=O)OCCCc1cc(-c2ccc3c(c2)oc2cc(-c4ccc(CCCCC)cc4)ccc23)ccc1OCCC(CO)(CO)CCC] | 0.40 |

The liquid crystal composition provided in Example 3 has the following property parameters: Tni of 86° C., γ1 of 95 mPa·s, Δn of 0.127, $n_c$ of 1.607, Δε of −3.2, ε⊥ of 6.3, $K_{11}$ of 14.8, and $K_{33}$ of 15.9. There is no crystal precipitation when the liquid crystal composition is stayed at −20° C. for 480 hours.

Compounds 1-13 used in the liquid crystal composition provided in Comparative Example 1 are shown in Table 4 as to their formulae, structures, and amounts by mass. In Table 4, the Compounds 1-11 are liquid crystal materials, and the Compounds 1-11 are 100% by mass on a total mass of the liquid crystal materials of the liquid crystal composition; the Compound 12 is the second polymerizable compound; and the Compound 13 is the self-alignment compound. On a total mass of the liquid crystal composition, the Compounds 1-11 are 99.1% by mass, the Compound 12 is 0.30% by mass, and the Compound 13 is 0.60% by mass.

TABLE 4

| Compounds of the liquid crystal composition in Comparative Example 1 | | | |
|---|---|---|---|
| Compound | Formula | Structure | Amount by mass (%) |
| Compound 1 | III | 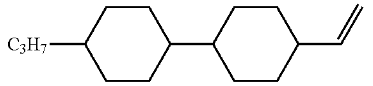 | 18 |
| Compound 2 | III | 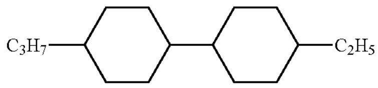 | 6 |
| Compound 3 | | 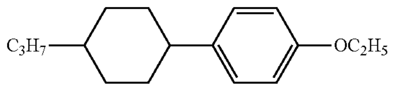 | 10 |
| Compound 4 | V | 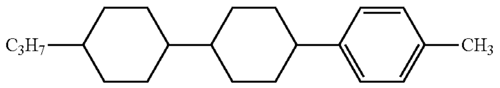 | 8 |
| Compound 5 | V | 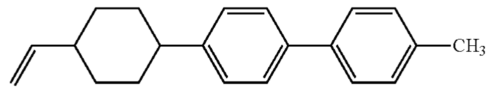 | 6 |

TABLE 4-continued
| Compounds of the liquid crystal composition in Comparative Example 1 | | | |
|---|---|---|---|
| Compound | Formula | Structure | Amount by mass (%) |
| Compound 6 | IV | 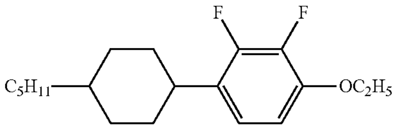 | 12 |
| Compound 7 | IV | 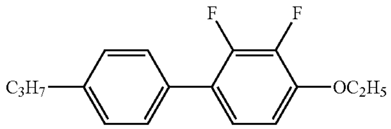 | 10 |
| Compound 8 | VI | 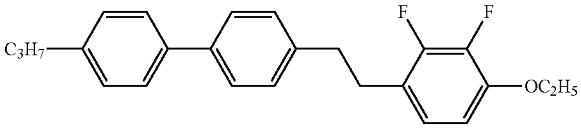 | 5 |
| Compound 9 | VI | 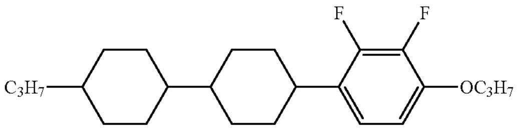 | 10 |
| Compound 10 | VI | 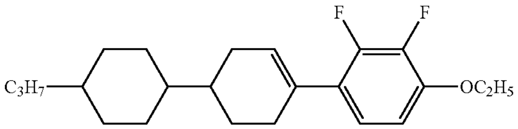 | 8 |
| Compound 11 | VI | 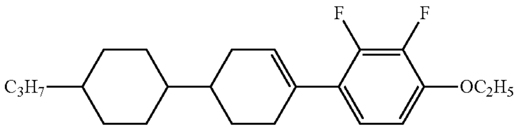 | 7 |
| Compound 12 | II-2 | 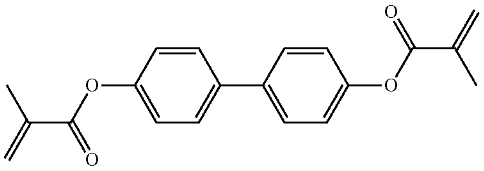 [SMILES: C=C(C)C(=O)Oc1ccc(-c2ccc(OC(=O)C(=C)C)cc2)cc1] | 0.30 |
| Compound 13 | I | 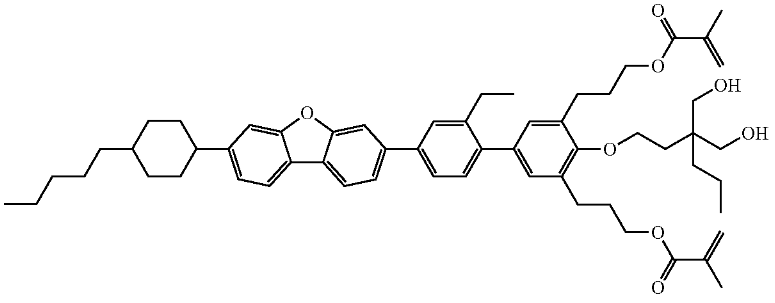 [SMILES: C=C(C)C(=O)OCCCc1cc(-c2ccc(-c3ccc4c(c3)oc3cc(C5CCC(CCCCC)CC5)ccc34)cc2CC)cc(CCCOC(=O)C(=C)C)c1OCCC(CO)(CO)CCC] | 0.60 |

The liquid crystal composition provided in Comparative Example 1 has the following property parameters: Tni of 82° C., γ1 of 89 mPa·s, Δn of 0.118, $n_e$ of 1.604, Δε of −3.2, ε⊥ of 6.3, $K_{11}$ of 14.3, and $K_{33}$ of 15.4. There is no crystal precipitation when the liquid crystal composition is stayed at −20° C. for 480 hours.

Compounds 1-12 used in the liquid crystal composition provided in Comparative Example 2 are shown in Table 5 as to their formulae, structures, and amounts by mass. In Table 5, the Compounds 1-11 are liquid crystal materials, and the Compounds 1-11 are 100% by mass on a total mass of the liquid crystal materials of the liquid crystal composition; and the Compound 12 is the second polymerizable compound. On a total mass of the liquid crystal composition, the Compounds 1-11 are 99.7% by mass, and the Compound 12 is 0.30% by mass.

TABLE 5

Compounds of the liquid crystal composition in Comparative Example 2

| Compound | Formula | Structure | Amount by mass (%) |
|---|---|---|---|
| Compound 1 | III | 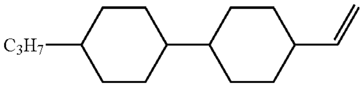 | 18 |
| Compound 2 | III | 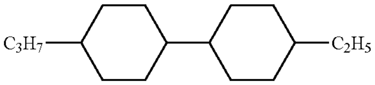 | 6 |
| Compound 3 | | 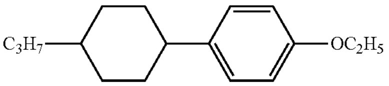 | 10 |
| Compound 4 | V | 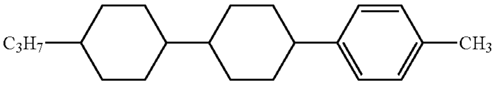 | 8 |
| Compound 5 | V | 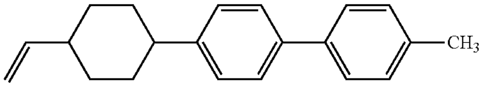 | 6 |
| Compound 6 | IV | 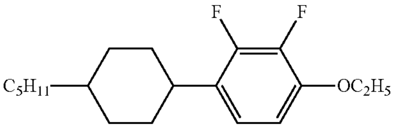 | 12 |
| Compound 7 | IV | 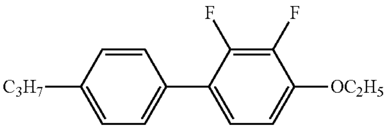 | 10 |
| Compound 8 | VI | 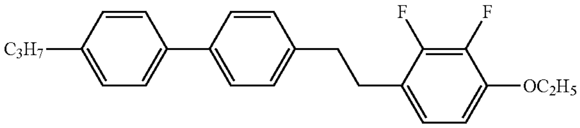 | 5 |
| Compound 9 | VI | 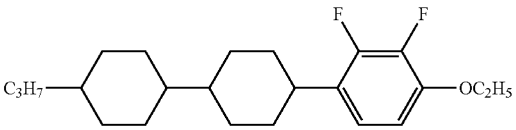 | 10 |
| Compound 10 | VI | 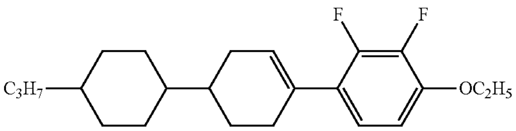 | 8 |

TABLE 5-continued

| Compounds of the liquid crystal composition in Comparative Example 2 | | | |
|---|---|---|---|
| Compound | Formula | Structure | Amount by mass (%) |
| Compound 11 | VI | 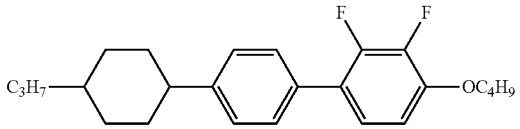 | 7 |
| Compound 12 | II-2 | 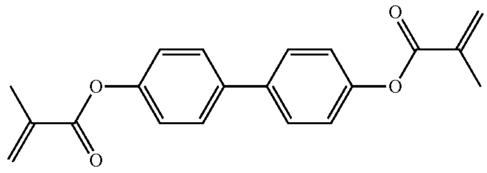 [SMILES: C=C(C)C(=O)Oc1ccc(-c2ccc(OC(=O)C(=C)C)cc2)cc1] | 0.30 |

The liquid crystal composition provided in Comparative Example 2 has the following property parameters: Tni of 82° C., γ1 of 88 mPa·s, Δn of 0.118, $n_e$ of 1.603, Δε of −3.2, ε⊥ of 6.3, $K_{11}$ of 14.3, and $K_{33}$ of 15.3. There is no crystal precipitation when the liquid crystal composition is stayed at −20° C. for 480 hours.

As can be seen from the above Tables 1 to 5, the liquid crystal composition provided in the Comparative Example 2 does not contain any self-alignment compound, and therefore, during the manufacturing process of the display panel using the liquid crystal composition, the processes for preparing the PI alignment layers need to be increased. However, the liquid crystal compositions provided in the Examples 1 to 3 and Comparative Example 1 all contain the self-alignment compound, and therefore, during the manufacturing process of display panels using the liquid crystal compositions, since the alignment layer can be formed by the polymerization of the self-alignment compound and the polymerizable compound, the processes for preparing the PI alignment layers can be omitted. Therefore, the embodiments of the disclosure can omit the processes for preparing the PI alignment layers by adding the self-alignment compound to the liquid crystal composition, thereby reducing manufacturing cost.

Furthermore, the formation rate of the pre-tilt angle and VHR of liquid crystal molecules formed during the alignment process of the liquid crystal compositions provided in the Examples 1 to 3 and Comparative Example 1 were tested, as shown in the following Table 6 and Table 7. In the disclosure, the formation rate of the pre-tilt angle is represented by the UV irradiation time required to form the pre-tilt angle of 1°, and the formation rate of the pre-tilt angle is negatively correlated with the UV irradiation time required to form the pre-tilt angle of 1°.

TABLE 6

| Example | Example 1 | Example 2 | Example 2 | Comparative Example 1 |
|---|---|---|---|---|
| UV irradiation time | 58 s | 59 s | 56 s | 42 s |

TABLE 7

| Example | Example 1 | Example 2 | Example 2 | Comparative Example 1 |
|---|---|---|---|---|
| VHR | 92% | 90% | 91% | 84% |

The liquid crystal compositions provided in the Examples 1 to 3 all contain the first polymerizable compound, and the liquid crystal composition provided in the Comparative Example 1 does not contain the first polymerizable compound. As can be seen from Table 6, the UV irradiation time required to form the pre-tilt angle of 1° in Examples 1 to 3 is greater than the UV irradiation time required to form the pre-tilt angle of 1° in Comparative Example 1, that is, the formation rate of the pre-tilt angle of Examples 1 to 3 are lower than the formation rate of the pre-tilt angle of Comparative Example 1, indicating that the embodiments of the disclosure can effectively reduce the formation rate of the pre-tilt angle of liquid crystal molecules during the alignment process by adding the first polymerizable compound to the liquid crystal composition. In addition, the liquid crystal compositions provided in the Examples 1 to 3 all contain the third polymerizable compound, and the liquid crystal composition provided in the Comparative Example 1 does not contain the third polymerizable compound. As can be seen from Table 7, the VHRs of Examples 1 to 3 are higher than the VHR of Comparative Example 1, indicating that the embodiments of the disclosure can effectively improve the VHR of liquid crystal molecules by adding the third polymerizable compound to the liquid crystal composition.

Based on the above, in the embodiments of the disclosure, by providing the liquid crystal composition including the self-alignment compound represented by formula I and the first polymerizable compound represented by formula II-1, when the liquid crystal composition is placed between two substrates, the self-alignment compound and the first polymerizable compound undergo polymerization reaction under ultraviolet light irradiation, so as to form a polymer layer on surfaces of the substrates. Moreover, the rigid chain functional groups in the self-alignment compound may function as stereo barriers perpendicular to the substrates, so as to guide the liquid crystal molecules to arrange in a direction perpendicular to the substrates, achieving self-aligning function of the liquid crystal molecules, omitting the preparation of PI alignment layers, reducing the manufacturing processes of the display panel, and reducing the manufacturing cost of the display panel. In addition, the first polymerizable compound represented by formula II-1 can effectively reduce the formation rate of the pre-tilt angle of liquid crystal molecules during the alignment process, thereby improving the uniformity of light irradiation. In some embodiments, the liquid crystal composition further includes the third polymerizable compound represented by formula II-3, the third polymerizable compound can effectively enhance the stability of the liquid crystal composition, thereby improving the VHR of liquid crystal molecules and enhancing the reliability of the liquid crystal composition.

Some embodiments of the disclosure further provide a display device including the display panel as described in any one of the above-mentioned embodiments.

In some embodiments, the display device further includes a backlight module, and the display panel is disposed on a light output side of the backlight module.

It can be understood that since the display device provided by the embodiments of the disclosure includes the same display panel as described in any one of the above-mentioned embodiments, the display device has the same beneficial effects as the display panel as described in any one of the above-mentioned embodiments, and will not be repeated herein.

In the disclosure, the terms "first" and "second" are used only for the purpose of description, and cannot be understood as indicating or implying relative importance or implying the number of features indicated. Therefore, the features limited to "first" and "second" may explicitly or implicitly include one or more features. Moreover, the term "a plurality of" refers to two or more than two, unless otherwise specified.

In the above embodiments, the description of each embodiment has its own emphasis, and for parts not described in detail in a certain embodiment, please refer to relevant description of other embodiments.

The embodiments, examples, and related technical features of the disclosure may be combined and replaced with each other without conflict.

The above are merely preferred embodiments of the disclosure, and do not limit the disclosure in any form. Any simple modifications, equivalent changes, and modifications made to the above embodiments according to the technical essence of the disclosure without departing from the contents of the technical solutions of the disclosure still fall within the scope of the technical solutions of the disclosure.

What is claimed is:

1. A liquid crystal composition comprising a liquid crystal compound, a self-alignment compound, and a polymerizable compound comprising a first polymerizable compound, wherein the self-alignment compound is represented by the following formula I, and the first polymerizable compound is represented by the following formula II-1:

I

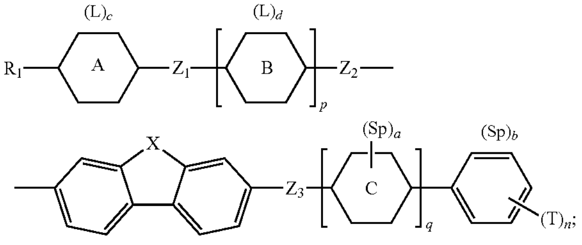

II-1

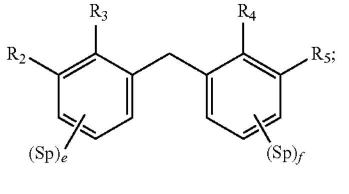

wherein $R_1$ is selected from —H, an alkyl group having 1-10 carbon atoms, an alkoxy group having 1-10 carbon atoms, an alkenyl group having 2-10 carbon atoms, an alkenyloxy group having 2-10 carbon atoms, a cycloalkyl group having 3-10 carbon atoms, or an aromatic group having 6-10 ring atoms; provided that when $R_1$ has one or more $—CH_2—$ groups not connected together, the one or more $—CH_2—$ groups not connected together in $R_1$ are unsubstituted, or, the one or more $—CH_2—$ groups not connected together in $R_1$ are independently substituted by —O—, —S—, —CO—, —C(O)O—, —OC(O)—, —OC(O)O—, $—CH_2CH_2—$, $—(CH_2)_3—$, $—CH_2O—$, $—OCH_2—$, —CH═CH—, or —C≡C—; and provided that when the $R_1$ has one or more H atoms, the one or more H atoms in $R_1$ are not replaced, or, the one or more H atoms in $R_1$ are independently replaced by F, Cl, Br, or I;

$Z_1$, $Z_2$, and $Z_3$ are independently selected from a single bond, —O—, —S—, —CO—, —C(O)O—, —OC(O)—, $—CF_2O—$, $—OCF_2—$, $—CH_2CH_2—$, $—CH_2O—$, $—OCH_2—$, —CH═CH—, an alkylidene group having 1-10 carbon atoms, an alkenylidene group having 2-10 carbon atoms, or an alkynyl group having 2-10 carbon atoms; provided that when $Z_1$, $Z_2$, and $Z_3$ have one or more $—CH_2—$ groups not connected together, the one or more $—CH_2—$ groups not connected together in $Z_1$, $Z_2$, and $Z_3$ are unsubstituted or, the one or more $—CH_2—$ groups not connected together in $Z_1$, $Z_2$, and $Z_3$ are independently substituted by —O—, —S—, —CO—, —C(O)O—, —OC(O)—, $—CF_2O—$, $—OCF_2—$, $—CH_2CH_2—$, $—CH_2O—$, $—OCH_2—$, —CH═CH—, or —C≡C—; and provided that when $Z_1$, $Z_2$, and $Z_3$ have one or more H atoms, the one or more H atoms in $Z_1$, $Z_2$, and $Z_3$ are not replaced, or, the one or more H atoms in $Z_1$, $Z_2$, and $Z_3$ are independently replaced by F, Cl, Br, or I;

X is selected from a single bond, —O—, —S—, —CO—, $—CH_2—$, or $—CF_2—$;

L is independently selected from —H, —F, —Cl, $—CF_3$, —Sp, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, an alkynyloxy having 2-10 carbon atoms, a cycloalkyl group having 3-10 carbon atoms, or an aromatic group having 6-10 ring atoms; provided that when L has one or more $—CH_2—$ groups not connected together, the one or more $—CH_2—$ groups not connected together in L are unsubstituted, or the one or more $—CH_2—$ groups not connected together in L are independently substituted by —O—, —S—, —CO—, —C(O)O—, —OC(O)—, —OC(O)O, $—CH_2CH_2—$, $—(CH_2)_3—$, $—CH_2O—$, $—OCH_2—$, —CH═CH—, or —C≡C—; and provided that when L has one or more H atoms, the one or more H atoms in L are not replaced, or, the one or more H atoms in L are independently replaced by F, Cl, Br, or I;

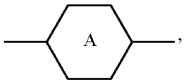, 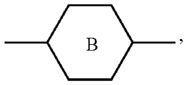, and

-continued

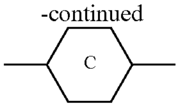

are independently selected from

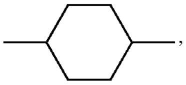, 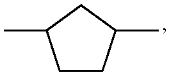, or

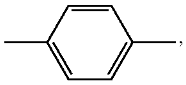, wherein one or more —$CH_2$— groups not connected together in

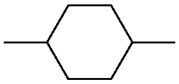 and 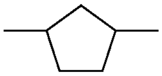

are unsubstituted or independently substituted by —O—;

Sp is independently selected from an ether group, an alkyl group, an alkoxy group, an alkenyl group, an alkenyloxy group, or a polymerizable group, and at least one Sp is a polymerizable group;

T is a group containing a hydroxyl group;

one or more H atoms in benzene rings of the formula I are not replaced, or, one or more H atoms in benzene rings of the formula I are independently replaced by —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms;

$R_2$, $R_3$, $R_4$, and $R_5$ are independently selected from —H, —F, —$CF_3$, an alkyl group having 1-5 carbon atoms, an alkoxy group having 1-5 carbon atoms, an alkenyl group having 2-5 carbon atoms, or an alkenyloxy group having 2-5 carbon atoms; and provided that when $R_2$, $R_3$, $R_4$, and $R_5$ have one or more H atoms, the one or more H atoms in $R_2$, $R_3$, $R_4$, and $R_5$ are not replaced, or, the one or more H atoms in $R_2$, $R_3$, $R_4$, and $R_5$ are independently replaced by F, Cl, Br, or I;

n is selected from 1, 2, or 3;

a, b, c, and d are independently selected from 0, 1, 2, or 3, and a sum of a and b is greater than or equal to 1;

p and q are independently selected from 0, 1, or 2; and e and fare independently selected from 0, 1, or 2, and a sum of e and f is greater than or equal to 1.

2. The liquid crystal composition of claim 1, wherein T is represented by the following formula (1):

(1)

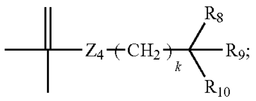

wherein $R_8$, $R_9$, and $R_{10}$ are independently selected from —H, —OH, —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms; provided that, when $R_8$, $R_9$, and $R_{10}$ have one or more end groups, the one or more end groups in $R_8$, $R_9$, and $R_{10}$ are independently replaced by —OH, —CN, or —$CF_3$, and at least of the end groups in $R_8$, $R_9$, and $R_{10}$ is —OH; when $R_8$, $R_9$, and $R_{10}$ have one or more —$CH_2$— groups, the one or more —$CH_2$— groups in $R_8$, $R_9$, and $R_{10}$ are unsubstituted, or, the one or more —$CH_2$— groups in $R_8$, $R_9$, and $R_{10}$ are independently substituted by —O—, —S—, —CO—, —C(O)O—, —OC(O)—, —$CF_2$O—, —$OCF_2$, —$CH_2CH_2$—, —$CH_2$O—, —$OCH_2$—, —CH═CH—, or —C≡C—, and heteroatoms therein directly linked to C are not directly linked to each other; and when $R_8$, $R_9$, and $R_{10}$ have one or more H atoms, the one or more H atoms in $R_8$, $R_9$, and $R_{10}$ are not replaced, or, the one or more H atoms in $R_8$, $R_9$, and $R_{10}$ are independently replaced by F, Cl, Br, or I;

$Z_4$ is selected from a single bond, —O—, —S—, —CO—, —C(O)O—, —OC(O)—, —$CF_2$O—, —$OCF_2$—, —$CH_2CH_2$—, —$CH_2$O—, —$OCH_2$—, —CH═CH—, an alkylidene group having 1-10 carbon atoms, an alkenylidene group having 2-10 carbon atoms, or an alkynyl group having 2-10 carbon atoms; provided that when $Z_4$ has one or more —$CH_2$— groups not connected together, the one or more —$CH_2$— groups not connected together in $Z_4$ are not unsubstituted, or, the one or more —$CH_2$— groups not connected together in $Z_4$ are independently substituted by —O—, —S—, —CO—, —C(O)O—, —OC(O)—, —$CF_2$O—, —$OCF_2$—, —$CH_2CH_2$—, —$CH_2$O—, —$OCH_2$, —CH═CH—, or —C≡C—; and when $Z_4$ has one or more H atoms, the one or more H atoms in $Z_4$ are not replaced, or, the one or more H atoms in $Z_4$ are independently replaced by F, Cl, Br, or I; and k is any integer from 0 to 10.

3. The liquid crystal composition of claim 1, wherein Sp is independently represented by the following formula (2) or formula (3):

(2)

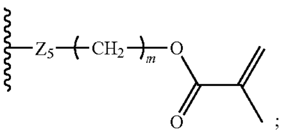

(3)

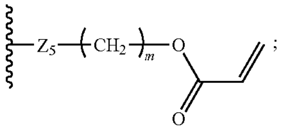

wherein $Z_5$ is independently selected from a single bond, —O—, —S—, —CO—, —C(O)O—, —OC(O)—, —$CF_2$O—, —$OCF_2$—, —$CH_2CH_2$—, —$CH_2$O—, —$OCH_2$—, —CH═CH—, an alkylidene group having 1-10 carbon atoms, an alkenylidene group having 2-10 carbon atoms, or an alkynyl group having 2-10 carbon atoms; provided that, when $Z_5$ has one or more —$CH_2$— groups not connected together, the one or more —$CH_2$— groups not connected together in $Z_5$ are unsubstituted, or, the one or more —$CH_2$— groups not connected together in $Z_5$ are independently substituted by —O—, —S—, —CO—, —C(O)O—, —OC(O)—, —$CF_2O$—, —$OCF_2$—, —$CH_2CH_2$—, —$CH_2O$—, —$OCH_2$—, —CH═CH—, or —C≡C—; and when $Z_5$ has one or more H atoms, the one or more H atoms in $Z_5$ are not replaced, or, the one or more H atoms in $Z_5$ are independently replaced by F, Cl, Br, or I; and m is any integer from 0 to 10.

4. The liquid crystal composition of claim 1, wherein the self-alignment compound is selected from at least one of a group consisting of compounds represented by the following formulae I-1 to I-20:

I-1

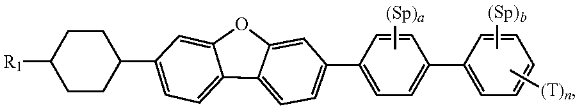

I-2

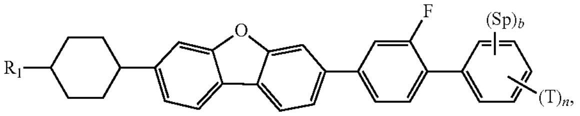

I-3

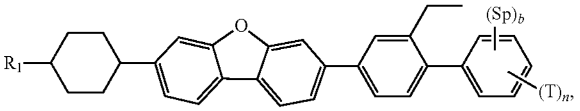

I-4

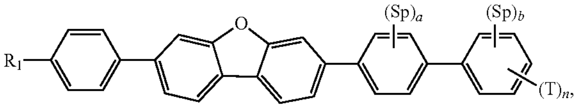

I-5

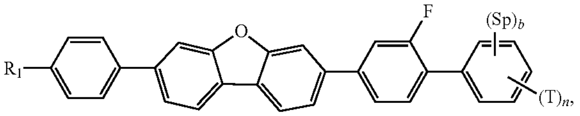

I-6

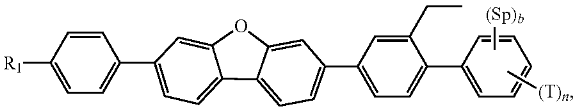

I-7

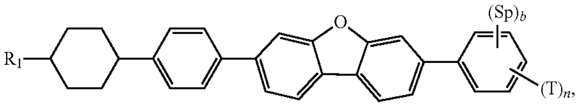

I-8

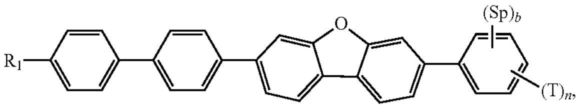

-continued

I-9

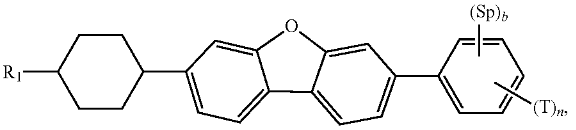

I-10

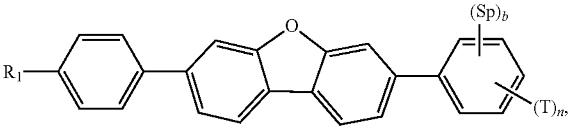

I-11

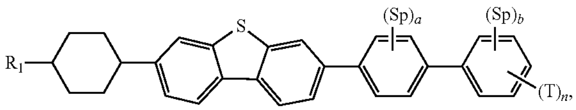

I-12

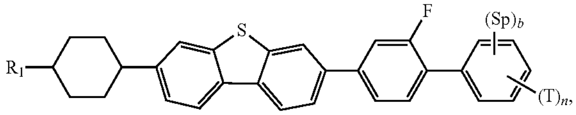

I-13

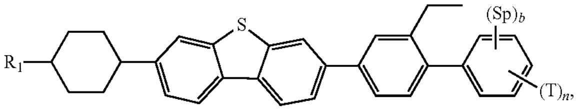

I-14

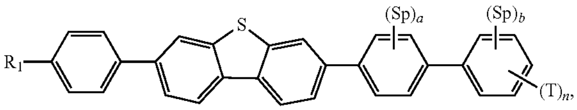

I-15

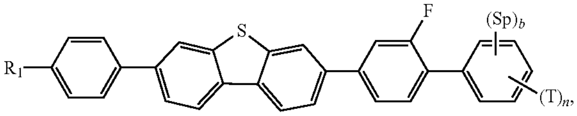

I-16

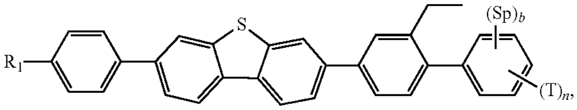

I-17

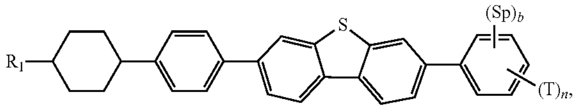

I-18

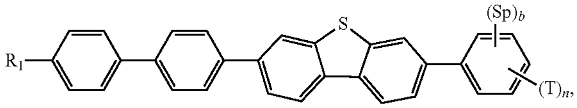

I-19

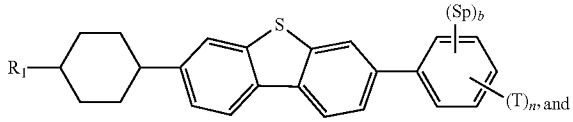

and

-continued

I-20

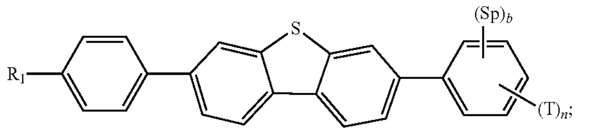

wherein Sp is independently selected from an ether group, an alkyl group, an alkoxy group, an alkenyl group, an alkenyloxy group, or a polymerizable group, and at least one Sp in each of formulae I-1 to I-20 is a polymerizable group;

T is a group containing a hydroxyl group;

a and b are independently selected from 0, 1, or 2, and the sum of a and b is greater than or equal to 1;

n is independently selected from 1 or 2; and definitions of $R_1$ in formulae I-1 to I-20 are the same as the definition of $R_1$ in formula 1.

5. The liquid crystal composition of claim 4, wherein the self-alignment compound is selected from at least one of a group consisting of compounds represented by the following formulae I-1-1 to I-20-4:

I-1-1

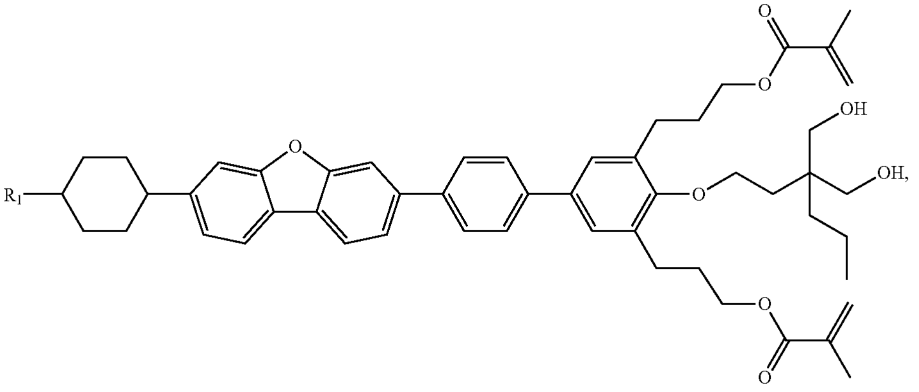

I-1-2

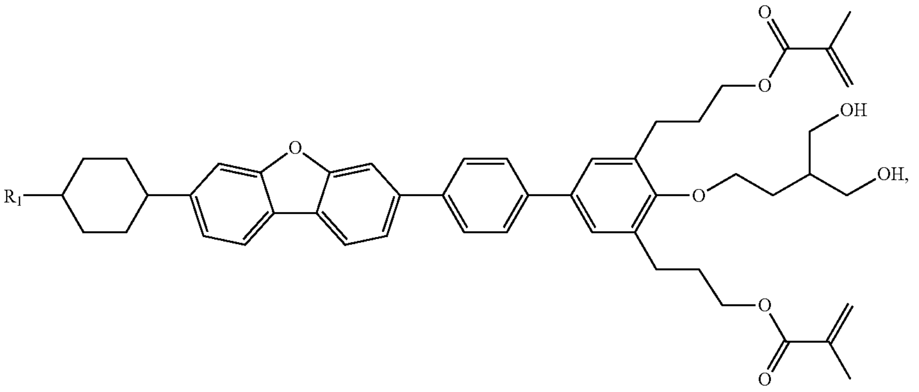

I-1-3

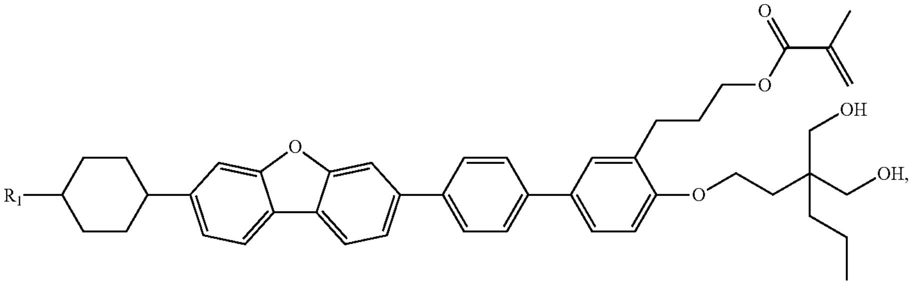

-continued
I-1-4
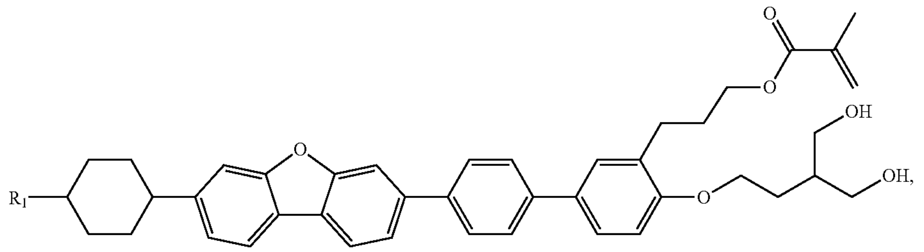
I-1-5
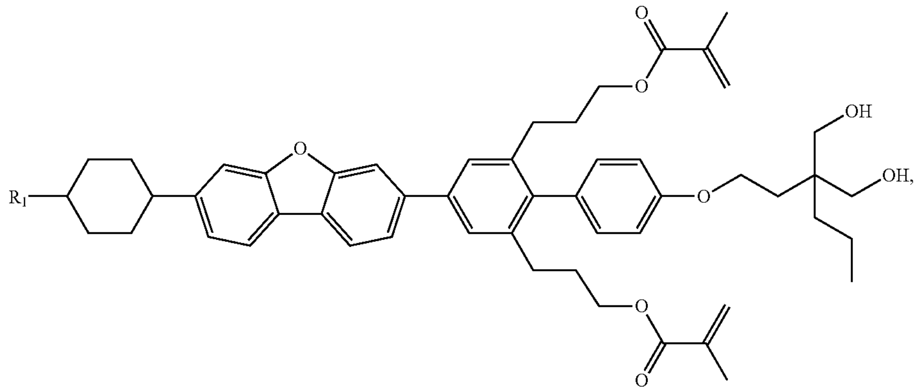
I-1-6
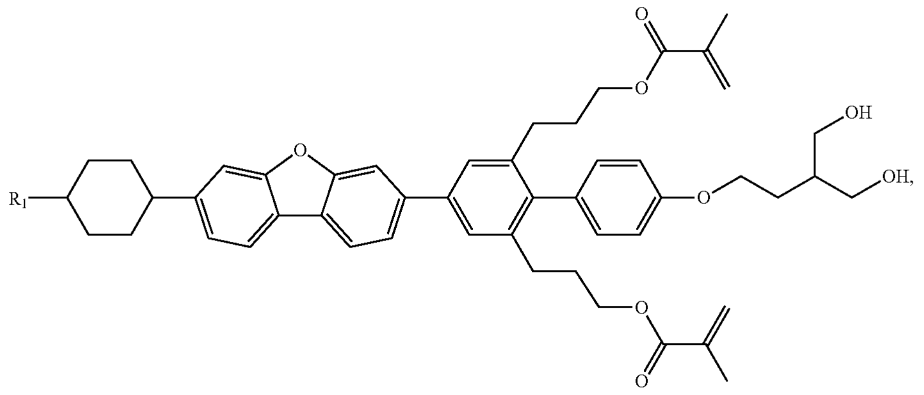
I-1-7
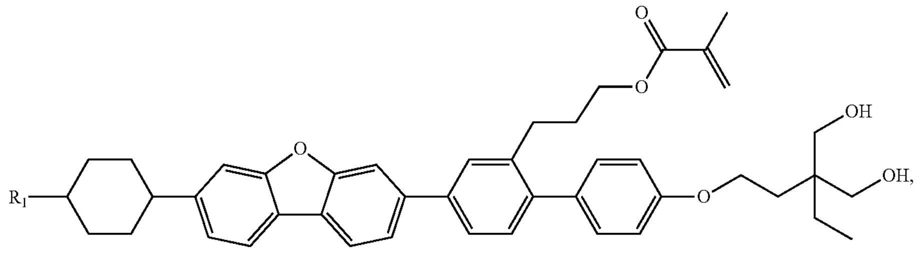
I-1-8
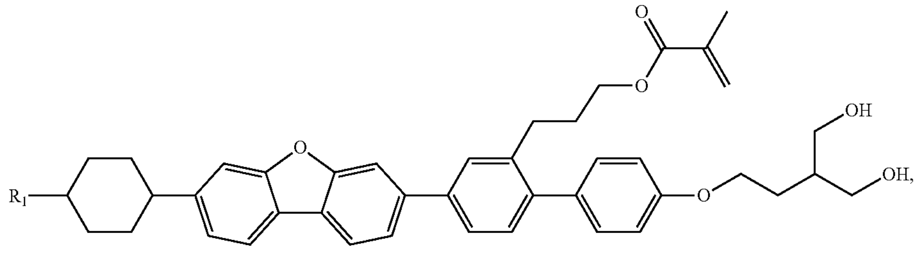

-continued
I-2-1
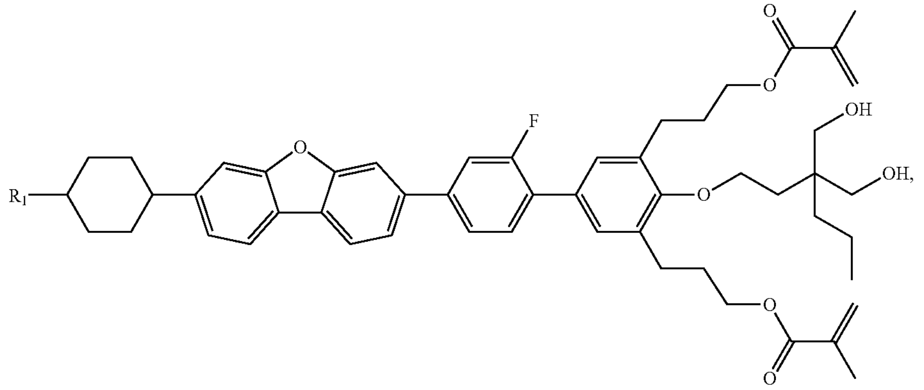
I-2-2
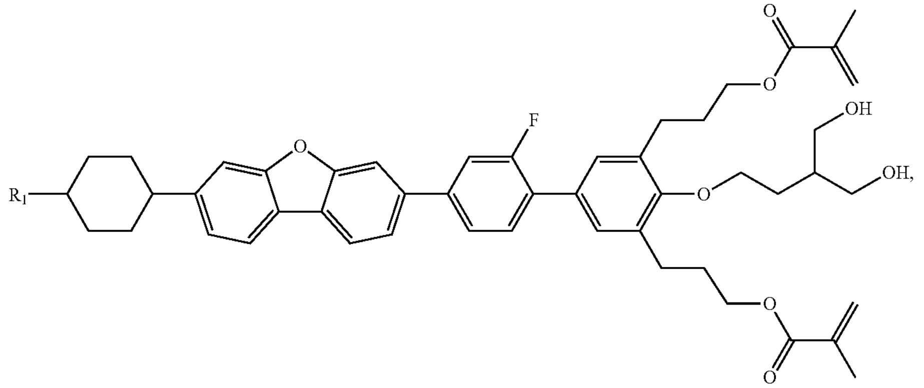
I-2-3
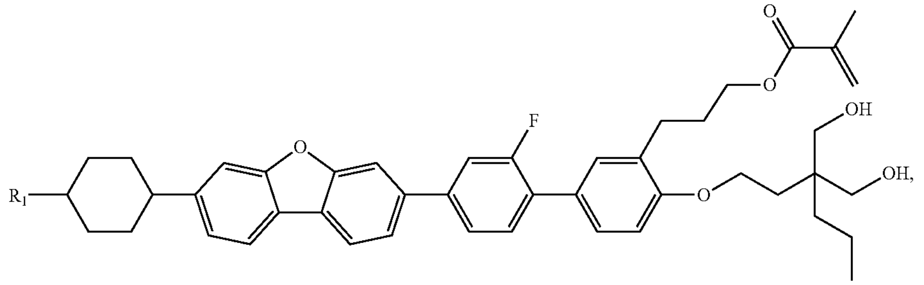
I-2-4
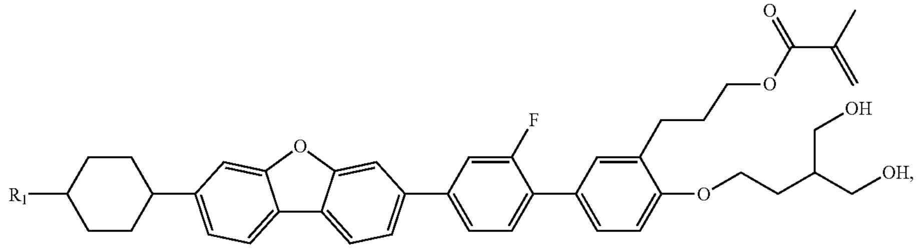

-continued
I-3-1
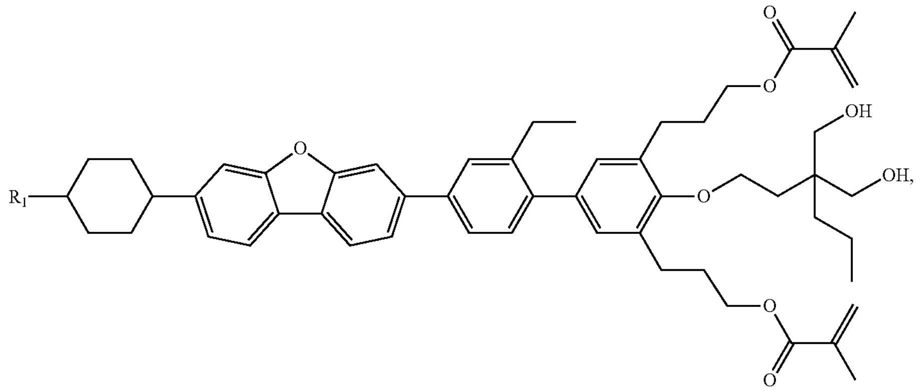
I-3-2
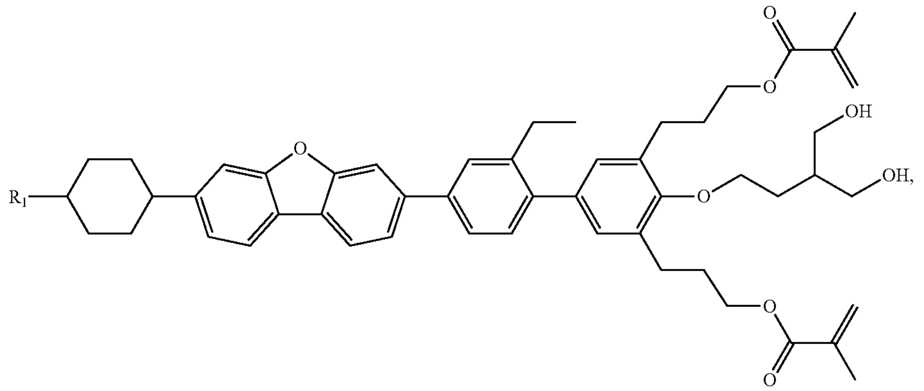
I-3-3
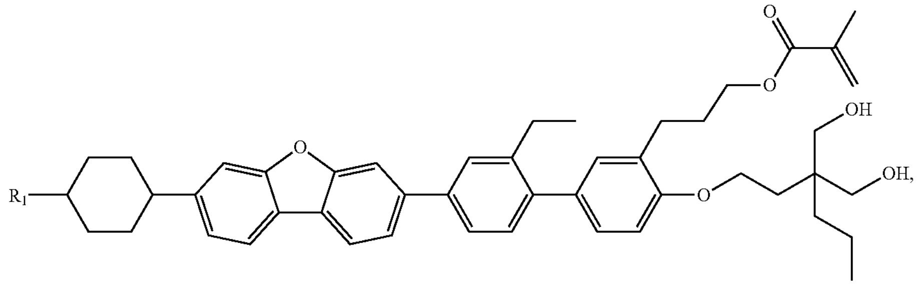
I-3-4
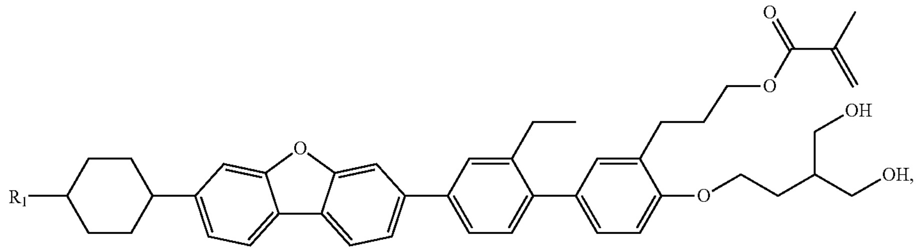

-continued
I-4-1
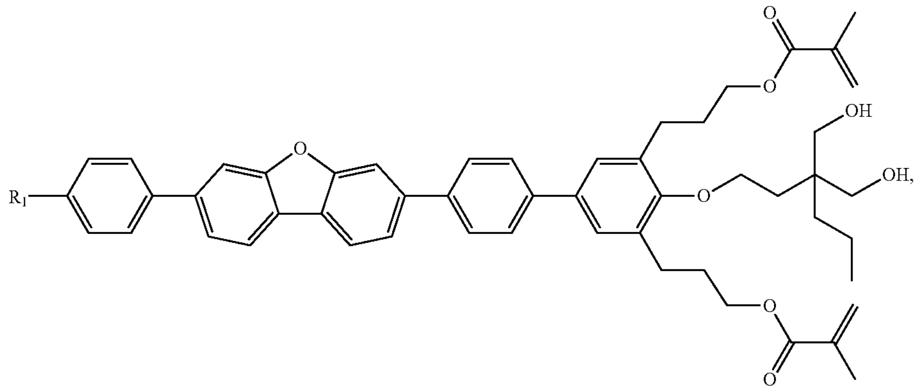
I-4-2
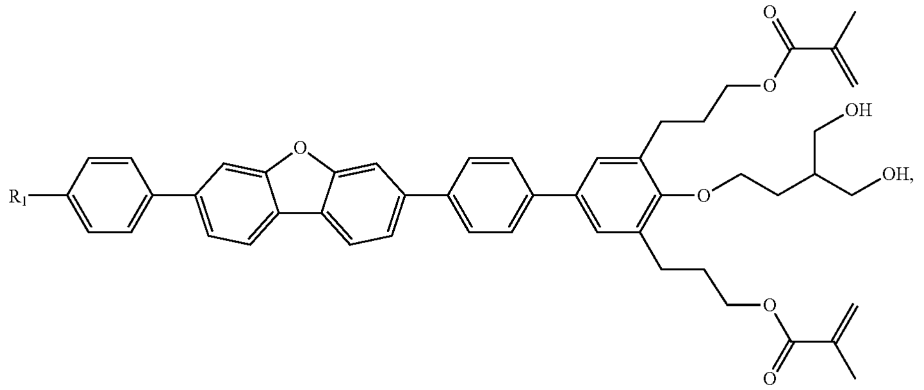
I-4-3
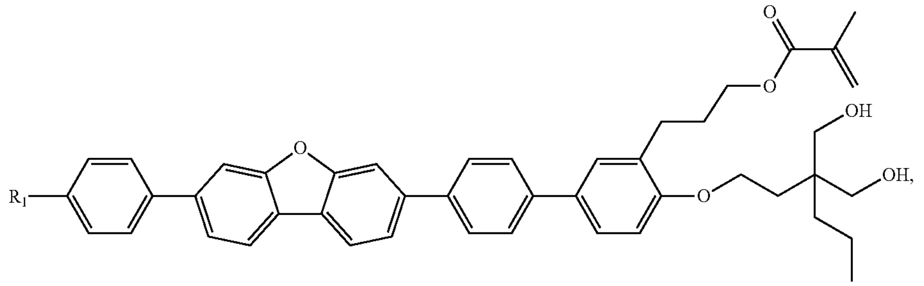
I-4-4
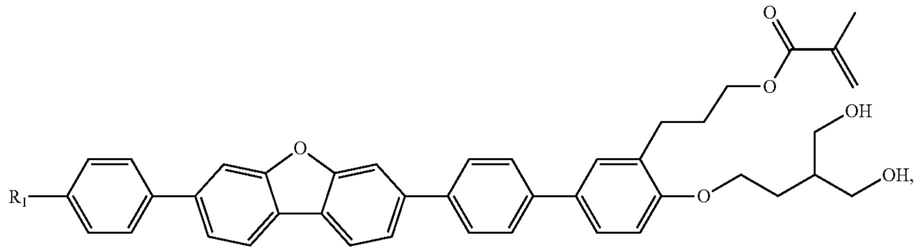

-continued
I-4-5
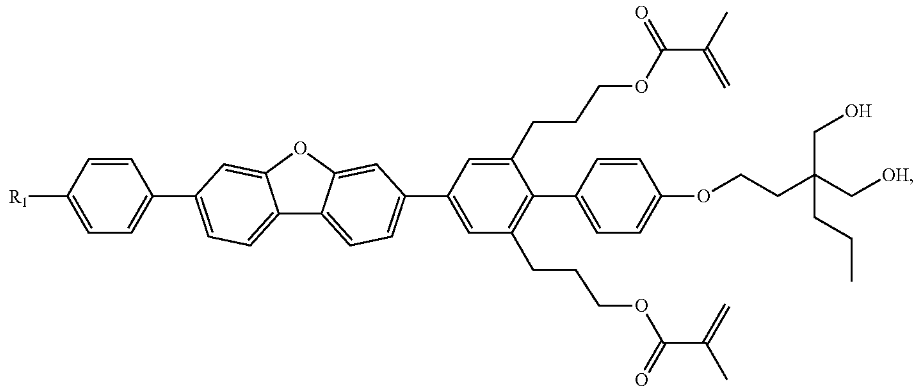
I4-6
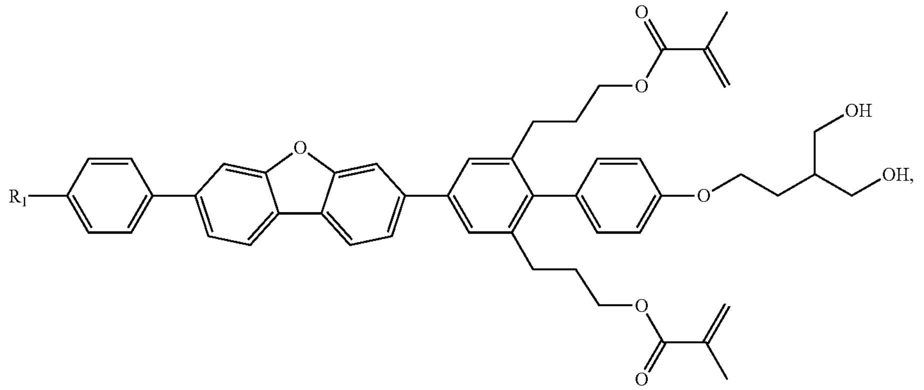
I-4-7
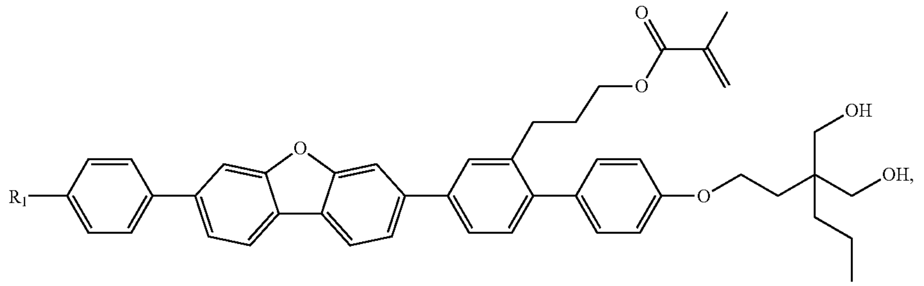
I-4-8
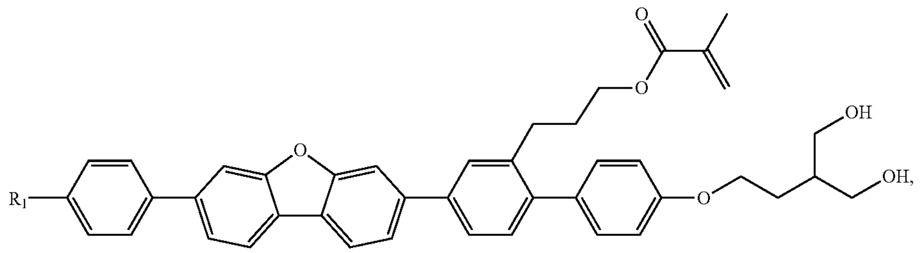

-continued
I-5-1
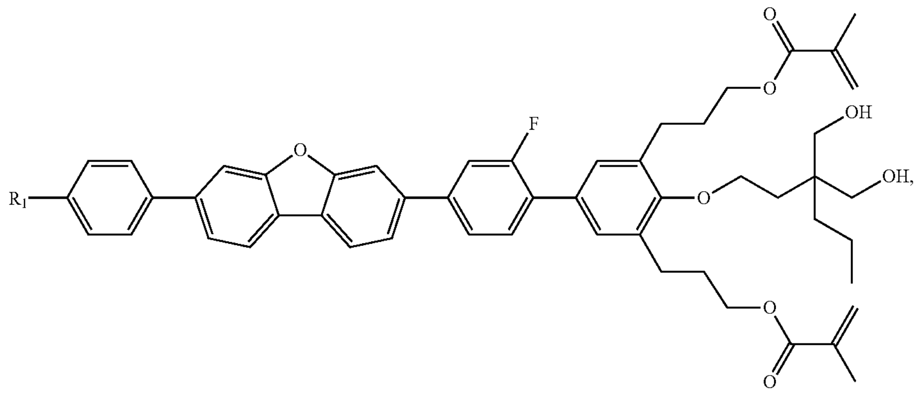
I-5-2
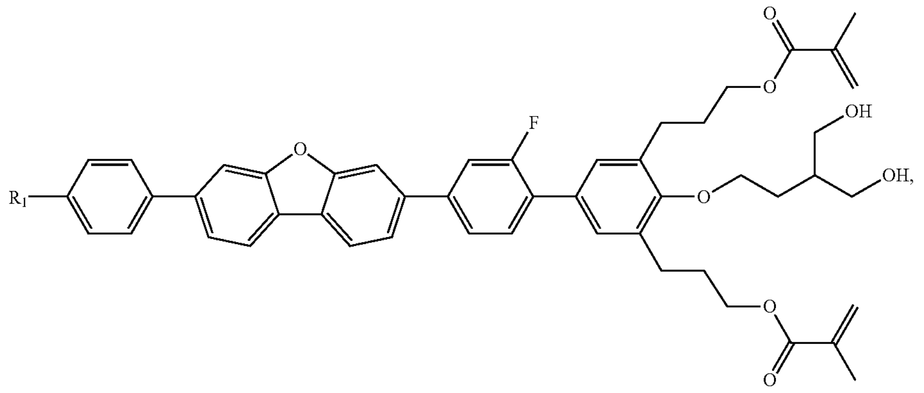
I-5-3
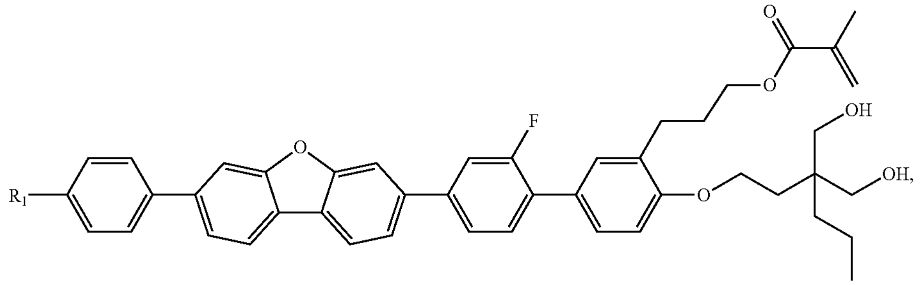
I-5-4
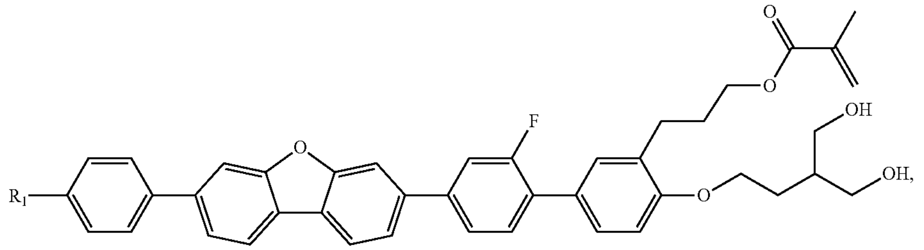

-continued
I-6-1
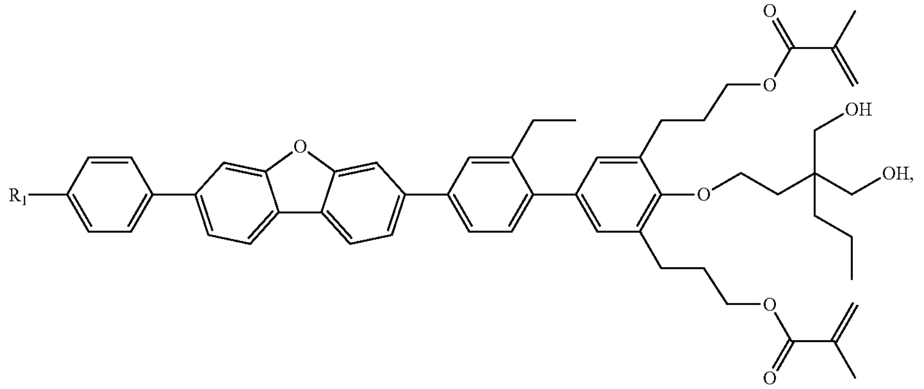
I-6-2
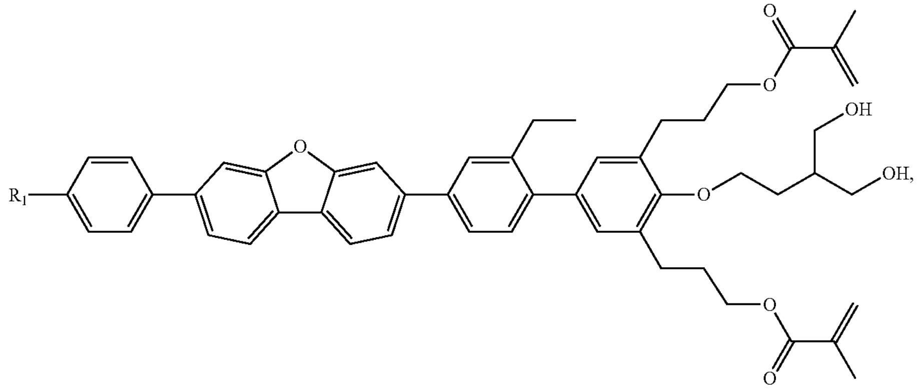
I-6-3
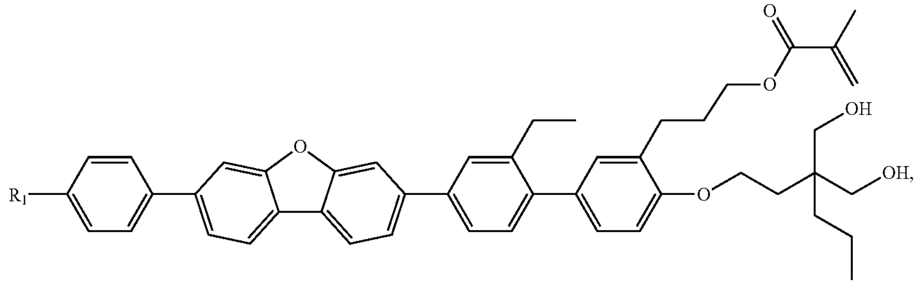
I-6-4
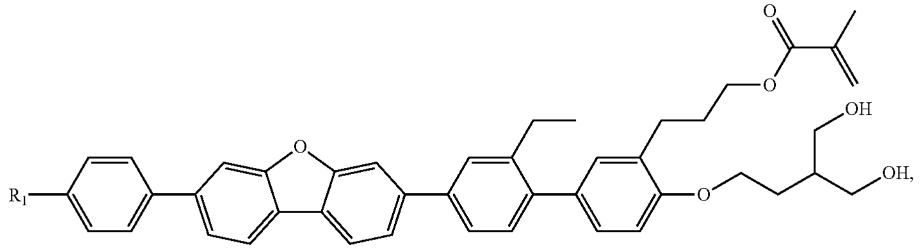

-continued
I-7-1
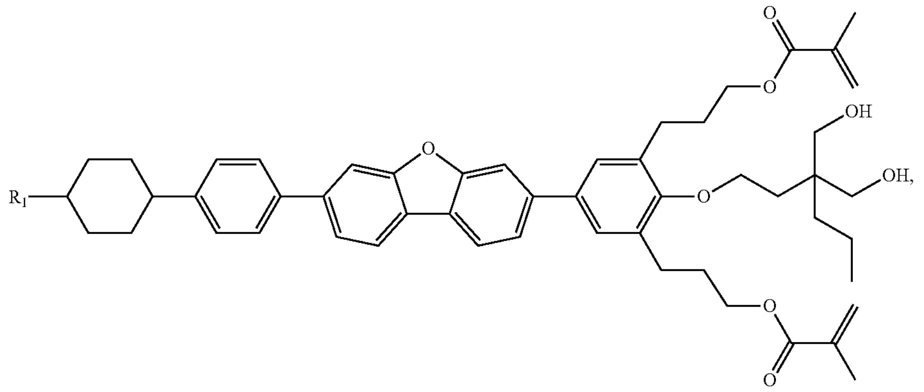
I-7-2
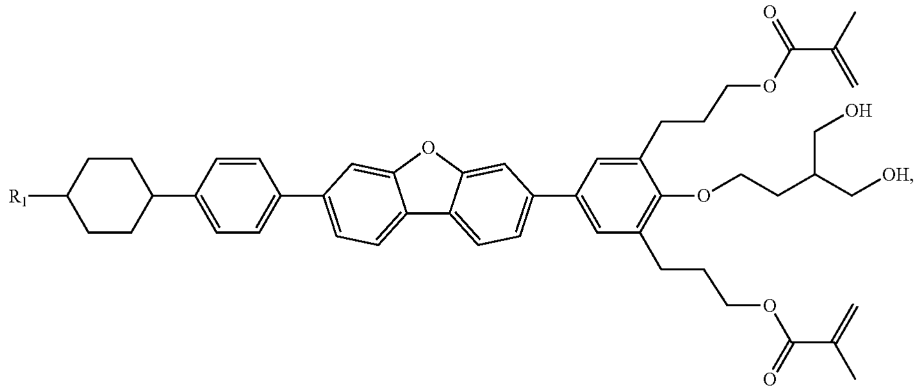
I-7-3
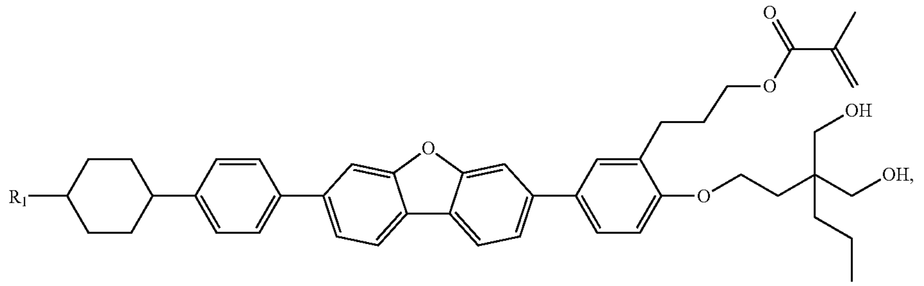
I-7-4
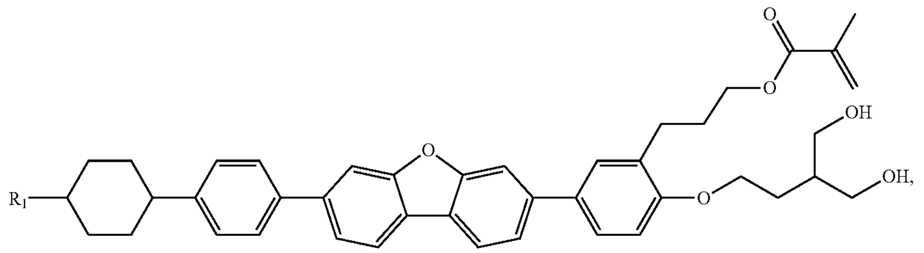

-continued
I-8-1
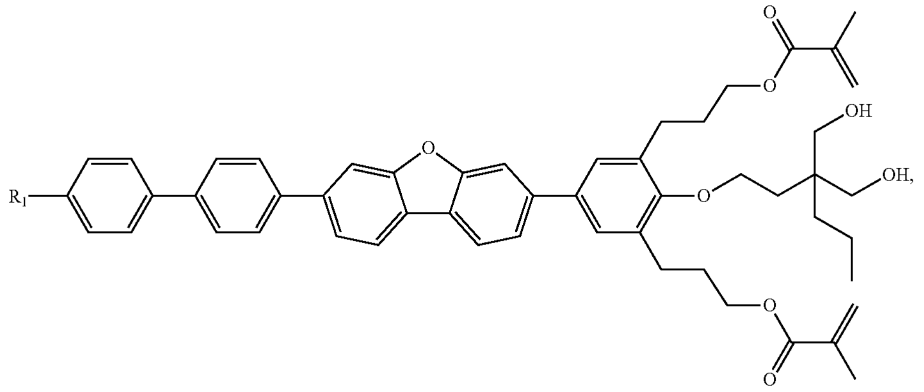
I-8-2
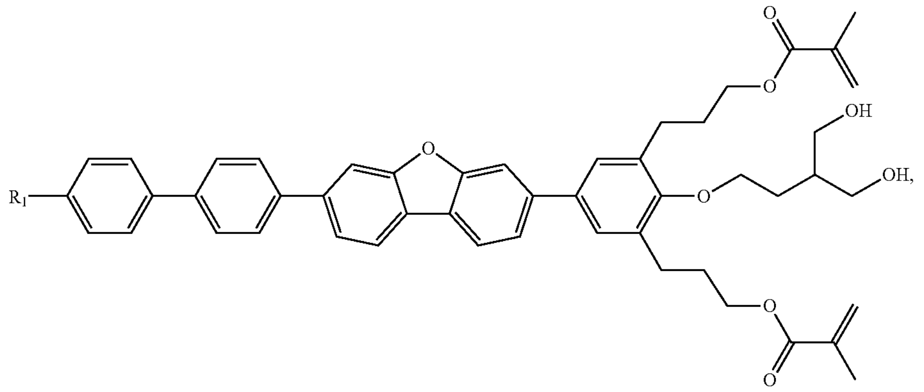
I-8-3
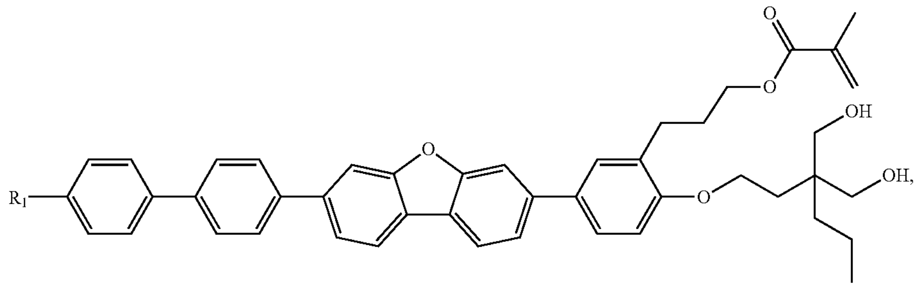
I-8-4
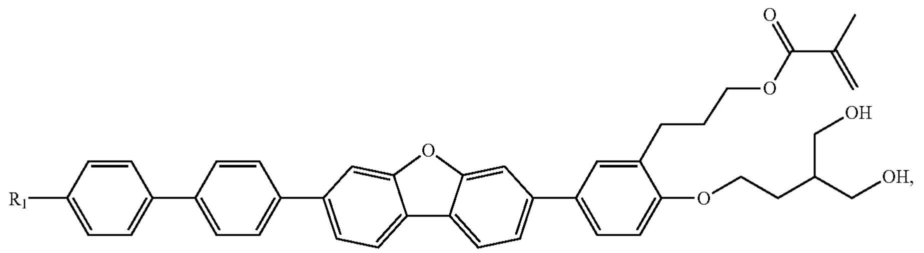

-continued
I-9-1
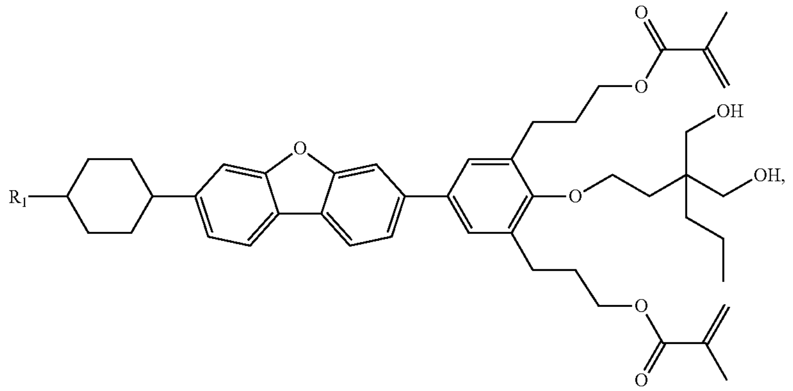
I-9-2
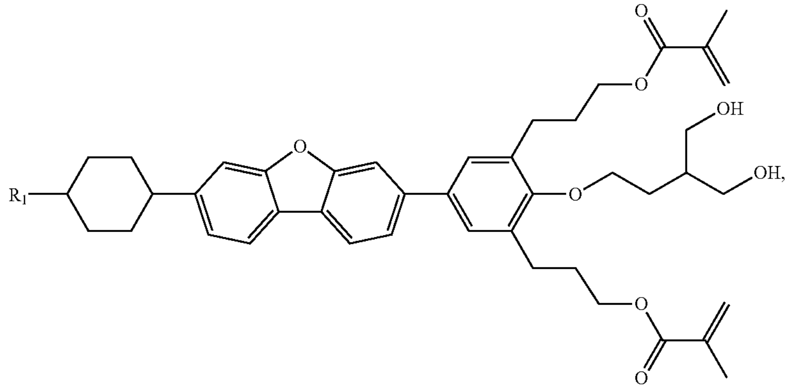
I-9-3
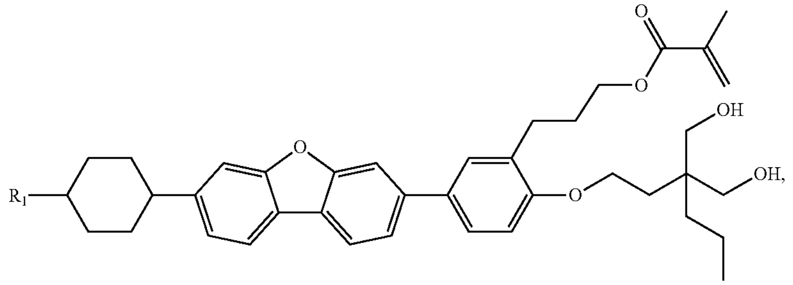
I-9-4
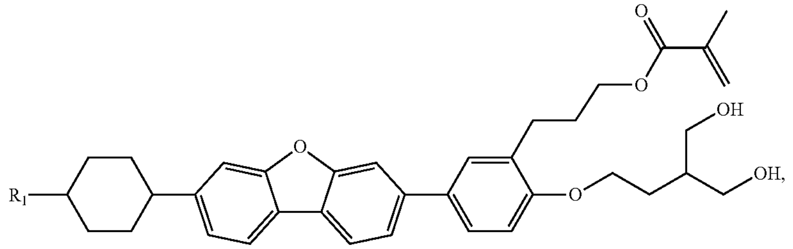

-continued
I-10-1
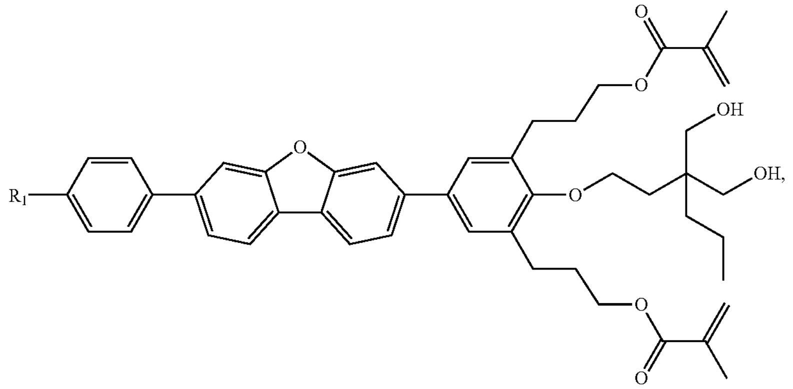
I-10-2
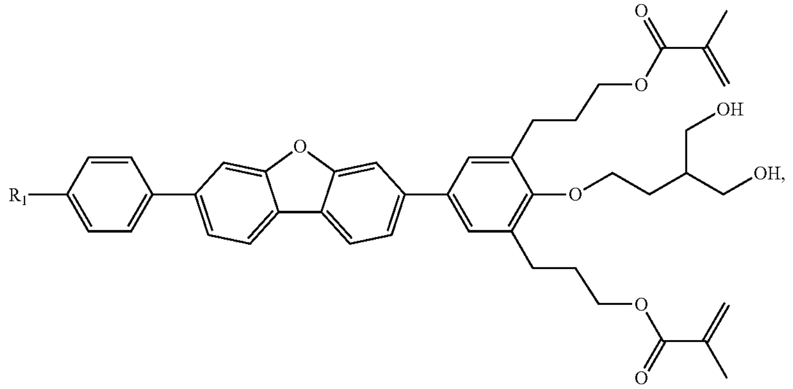
I-10-3
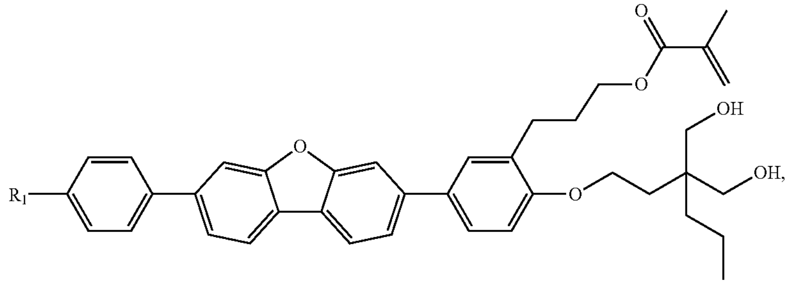
I-10-4
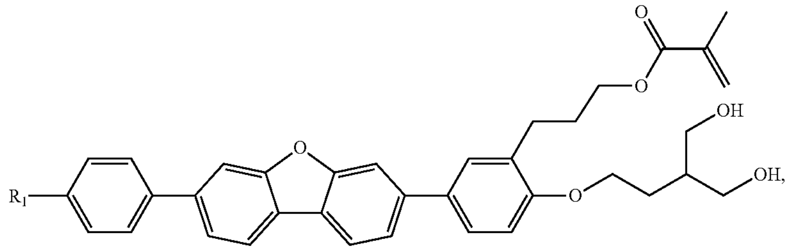

-continued
I-11-1
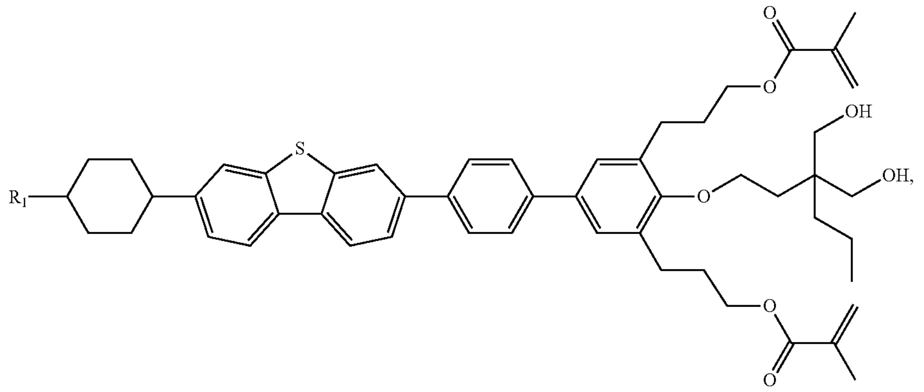
I-11-2
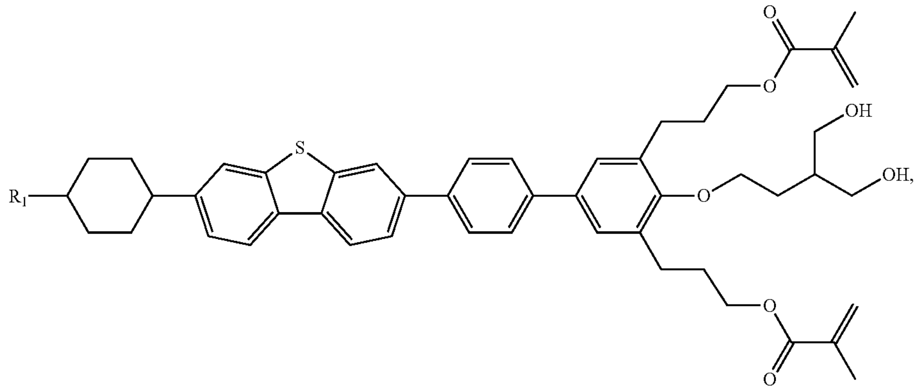
I-11-3
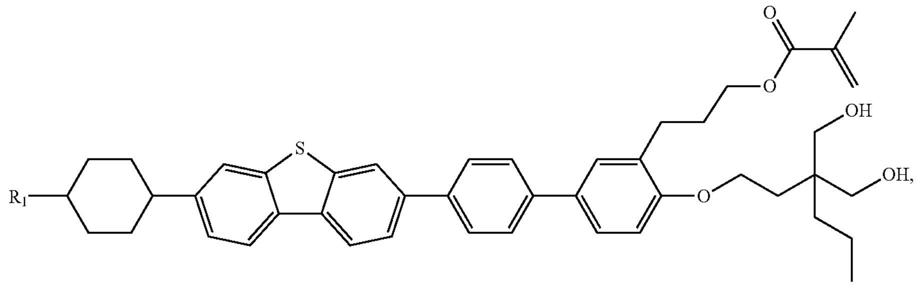
I-11-4
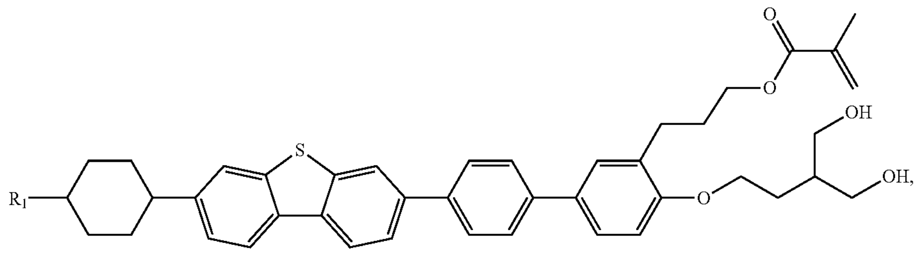

-continued
I-11-5
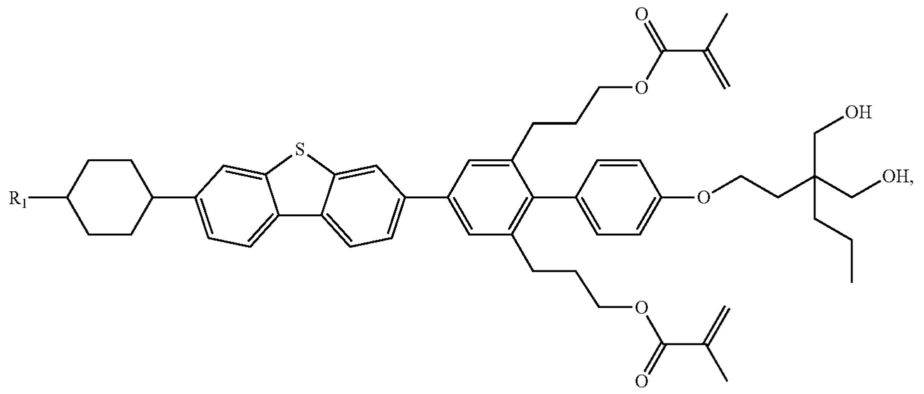
I-11-6
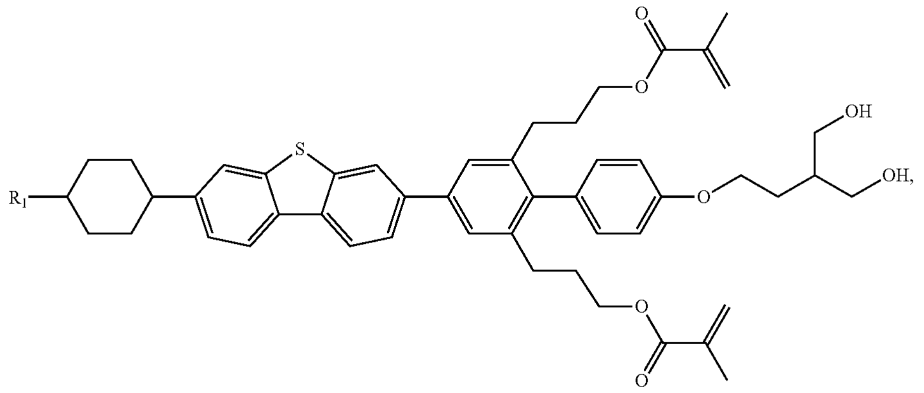
I-11-7
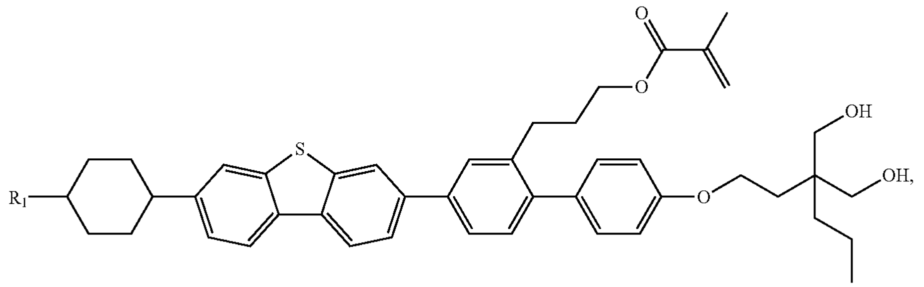
I-11-8
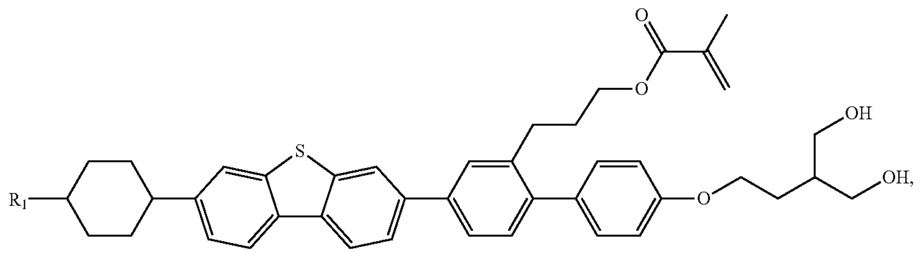

-continued
I-12-1
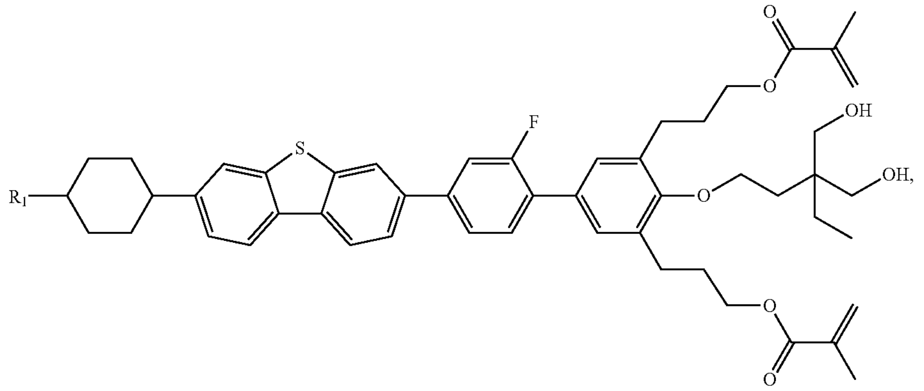
I-12-2
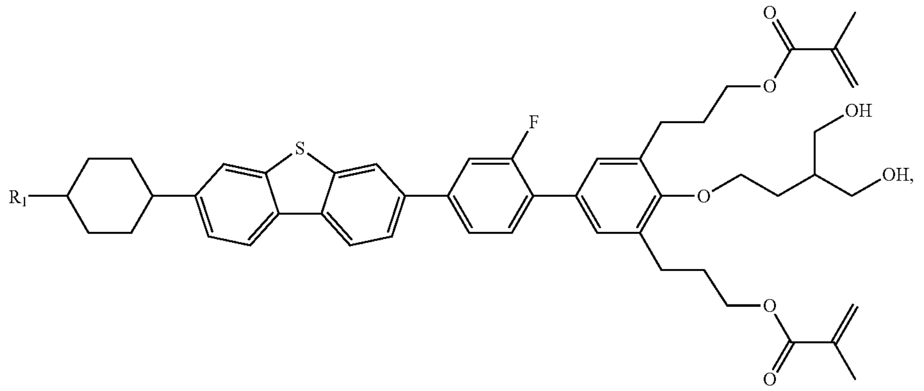
I-12-3
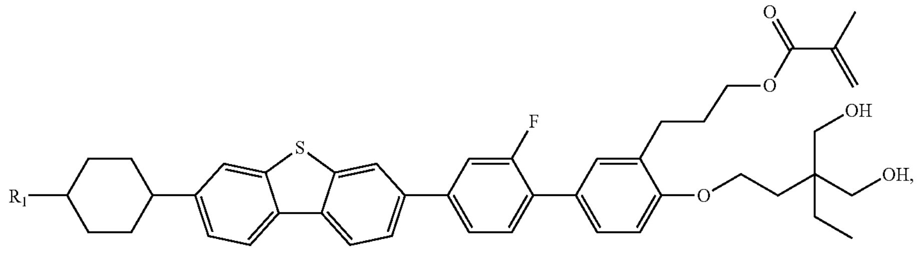
I-12-4
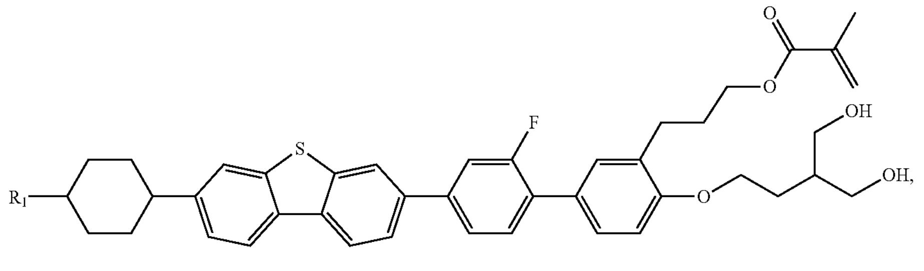

-continued
I-13-1
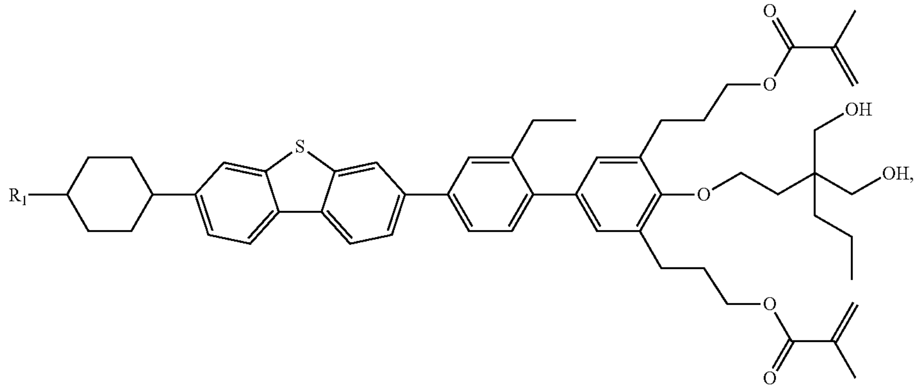
I-13-2
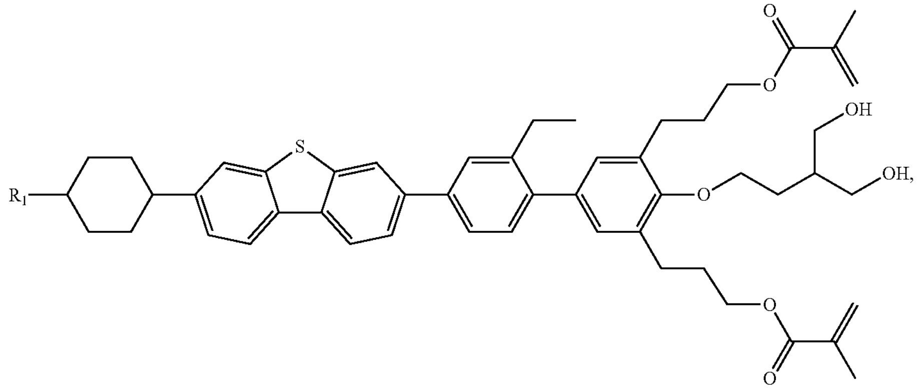
I-13-3
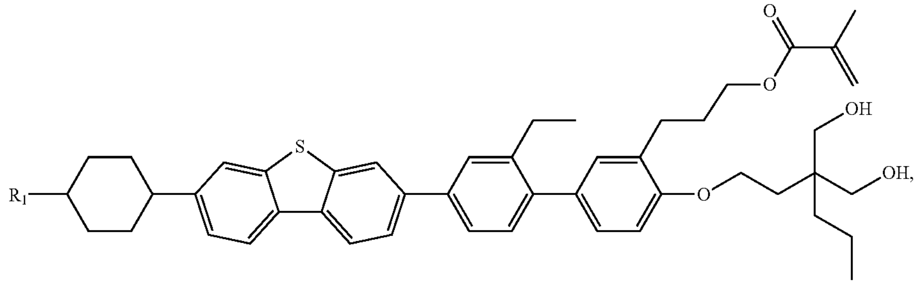
I-13-4
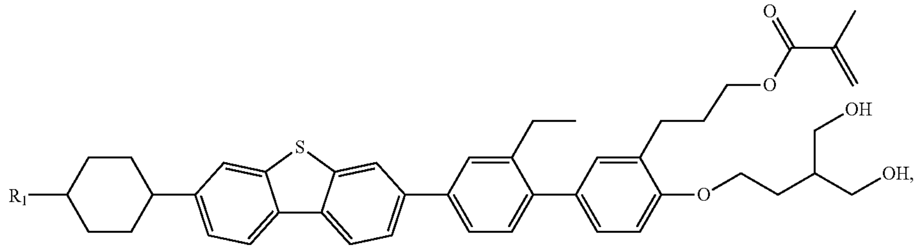

-continued
I-14-1
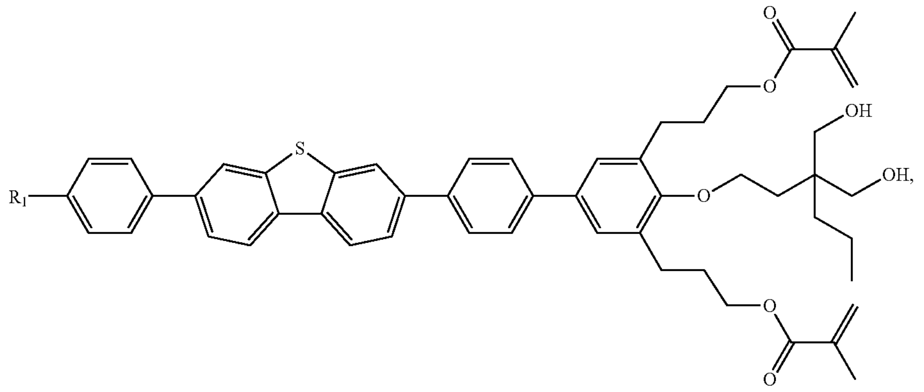
I-14-2
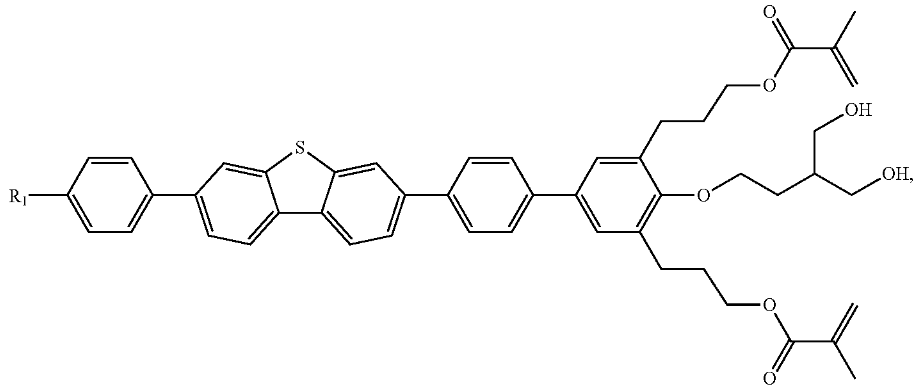
I-14-3
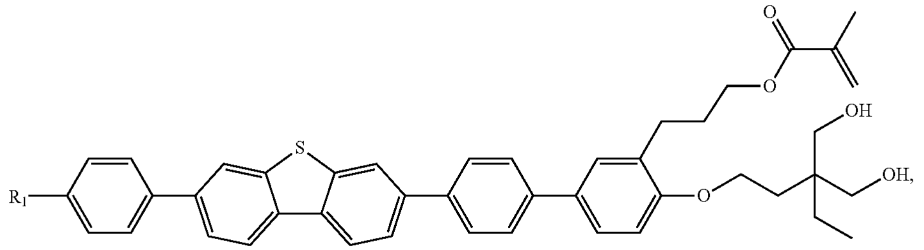
I-14-4
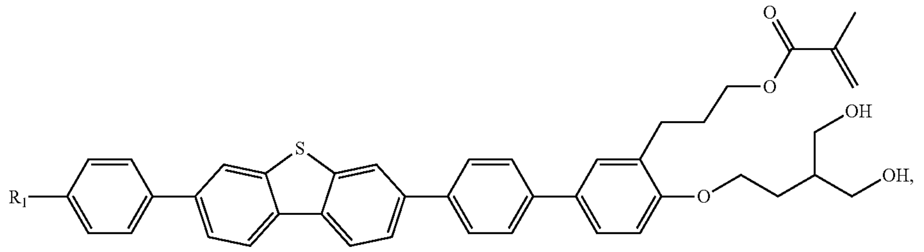

-continued
I-14-5
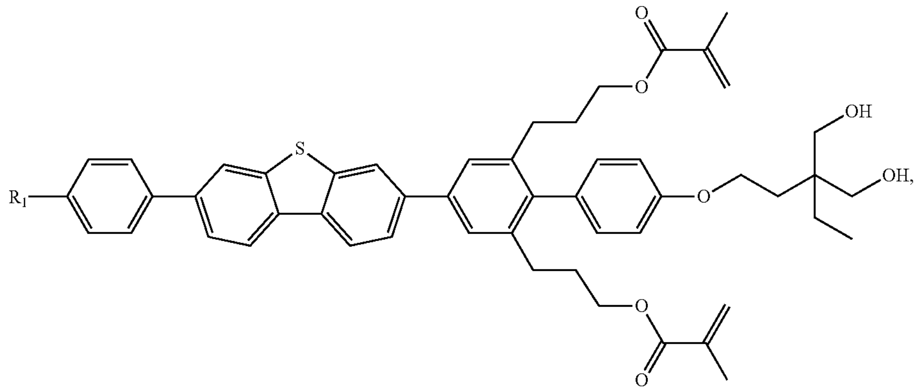
I-14-6
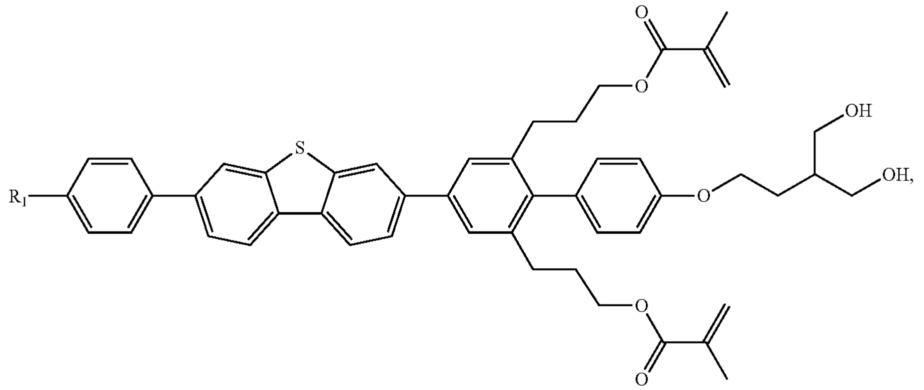
I-14-7
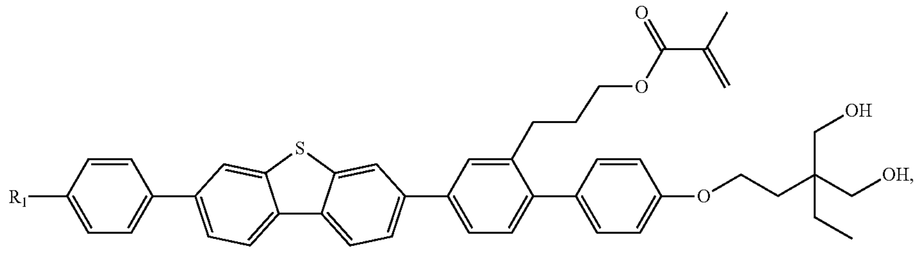
I-14-8
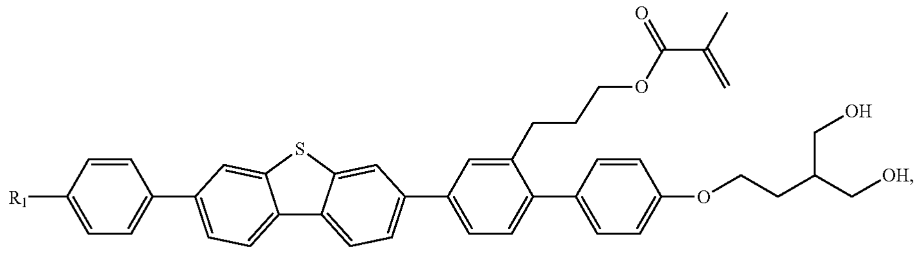

-continued
I-15-1
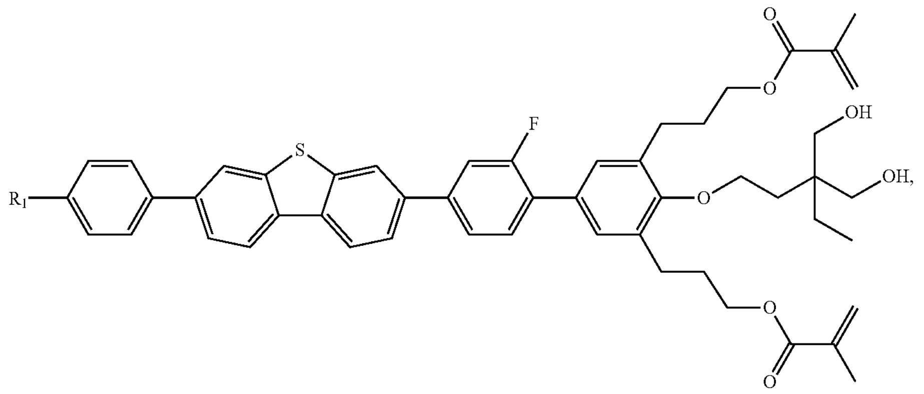
I-15-2
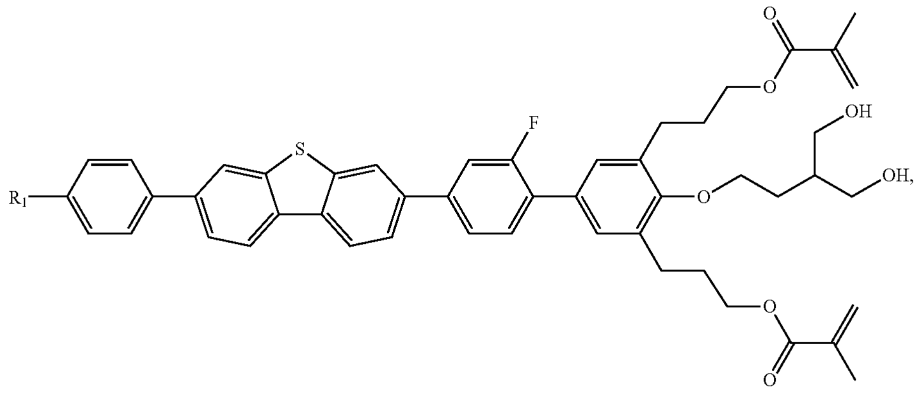
I-15-3
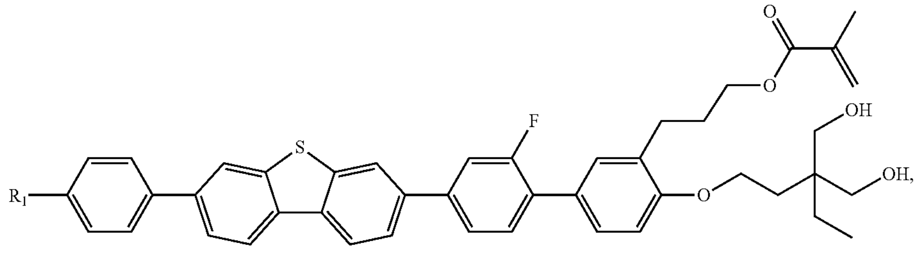
I-15-4
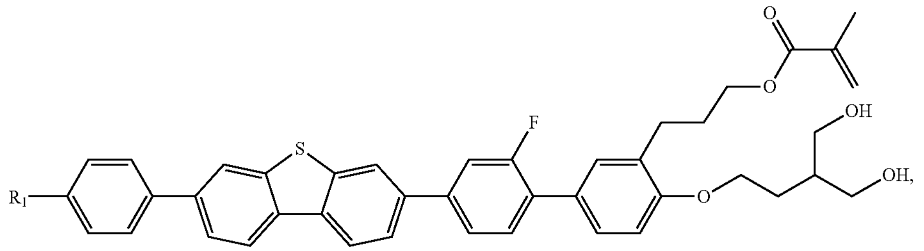

-continued
I-16-1
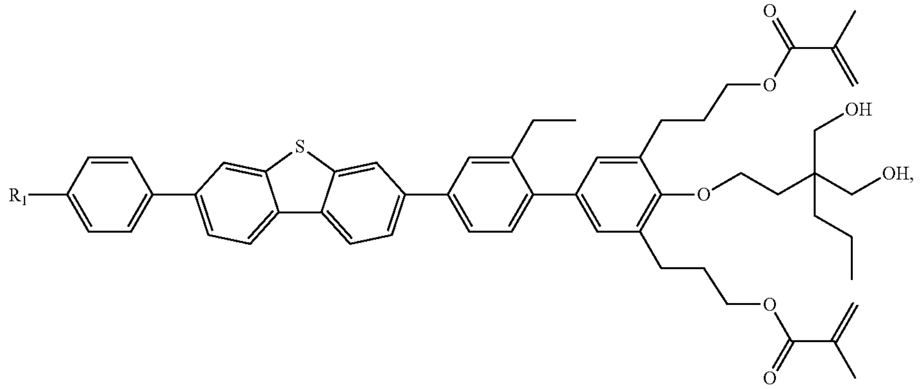
I-16-2
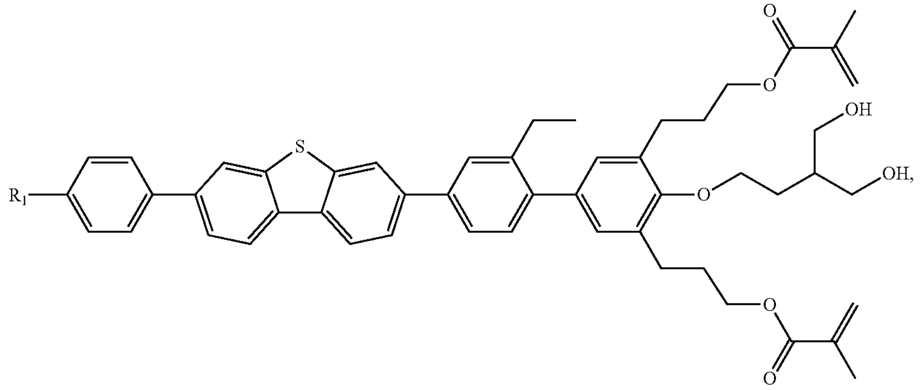
I-16-3
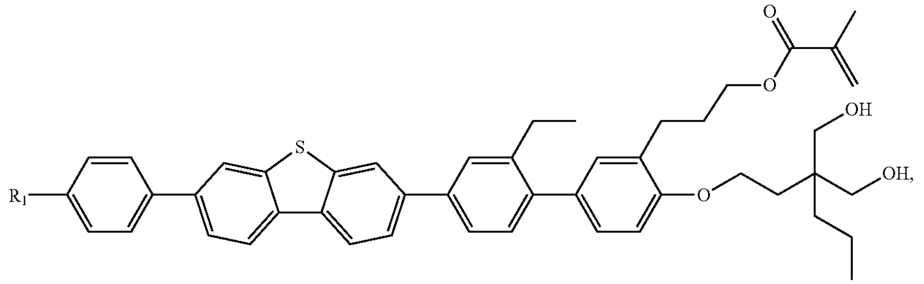
I-16-4
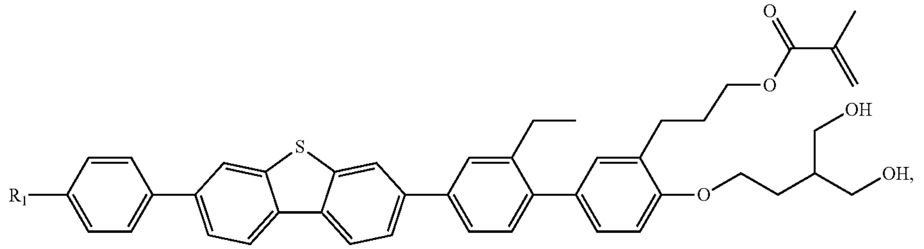

-continued
I-17-1
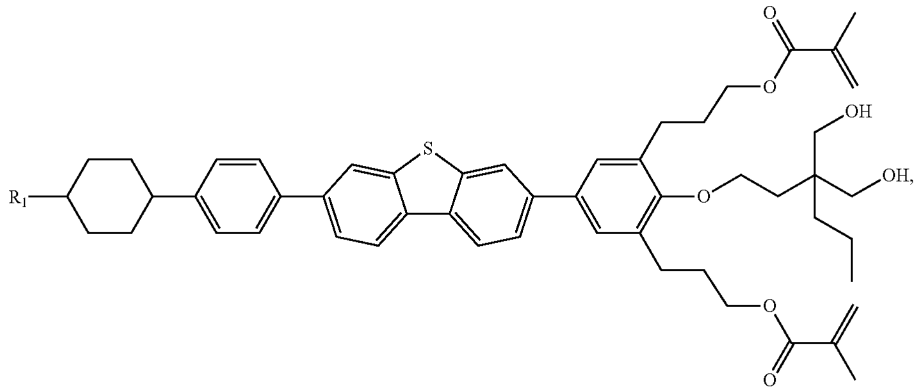
I-17-2
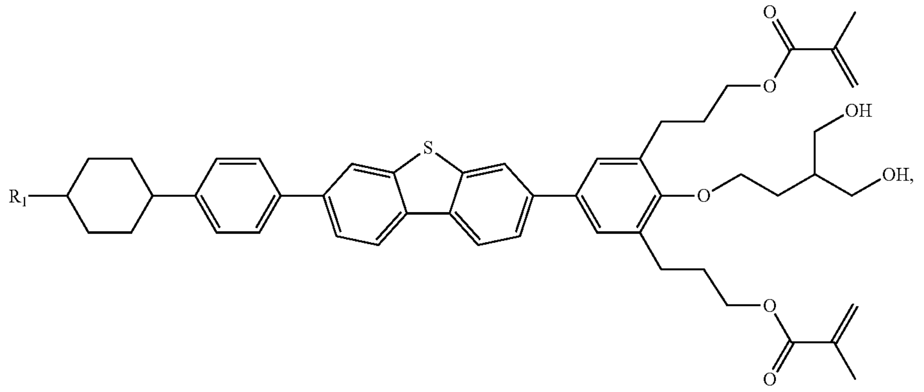
I-17-3
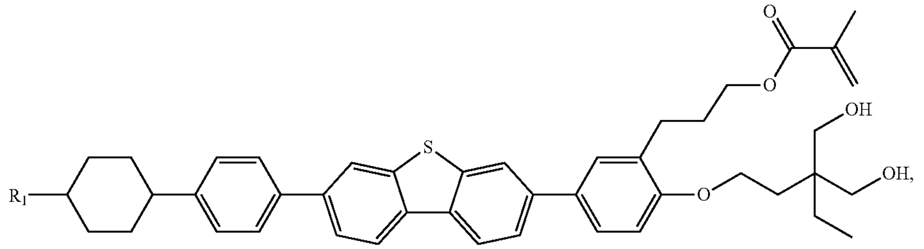
I-17-4
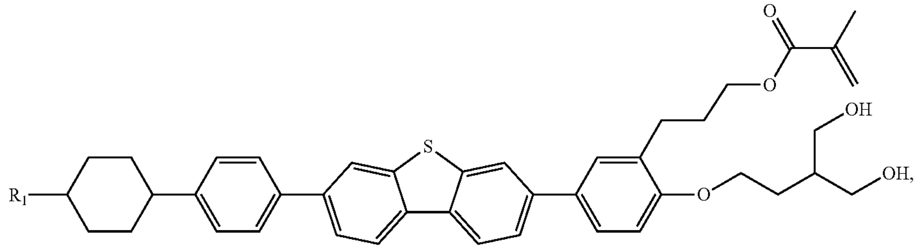

-continued
I-18-1
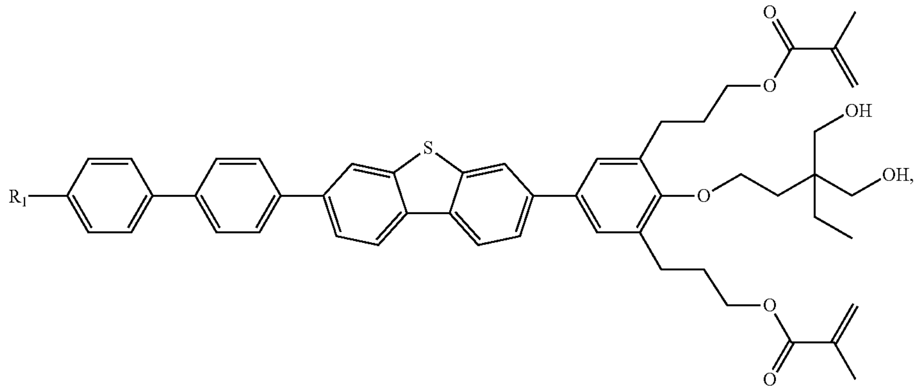
I-18-2
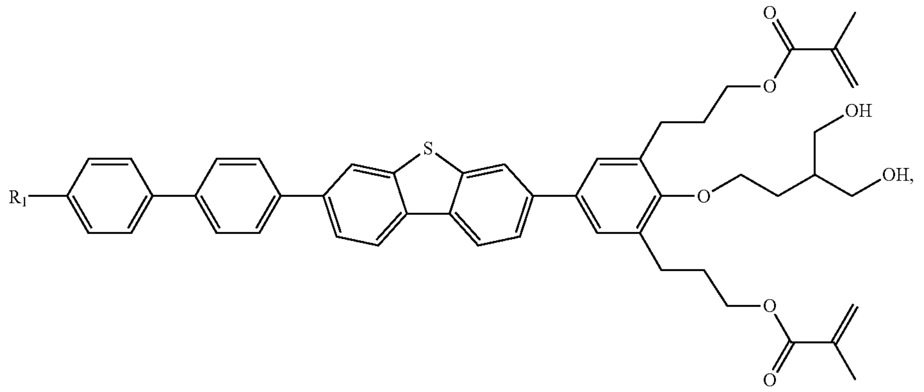
I-18-3
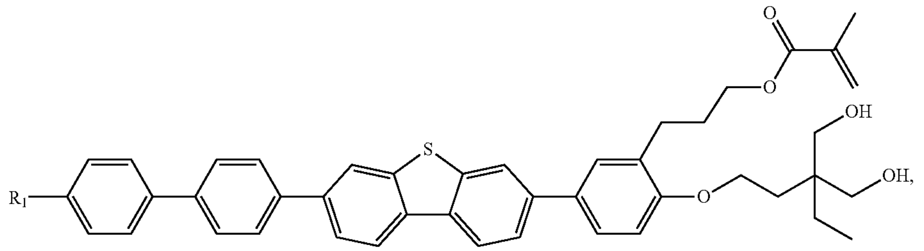
I-18-4
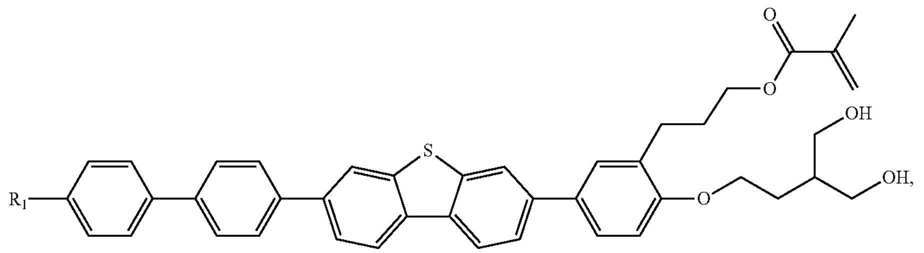

-continued
I-19-1
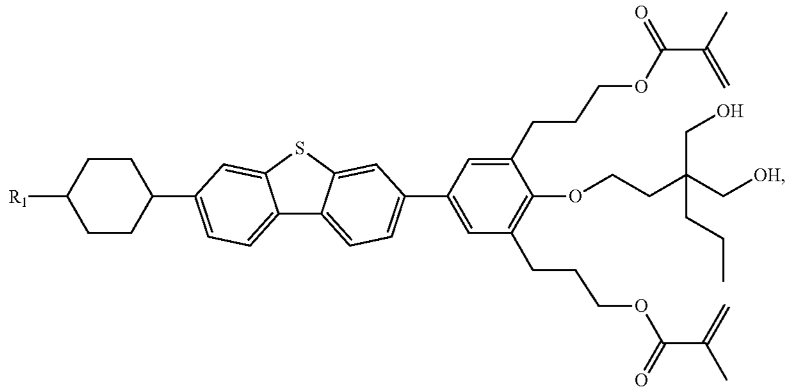
I-19-2
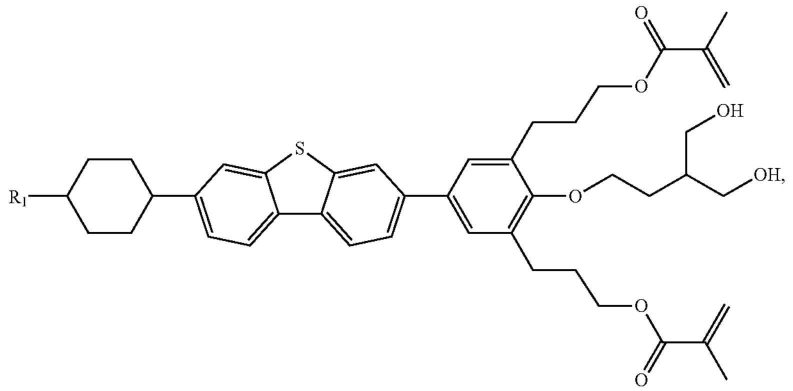
I-19-3
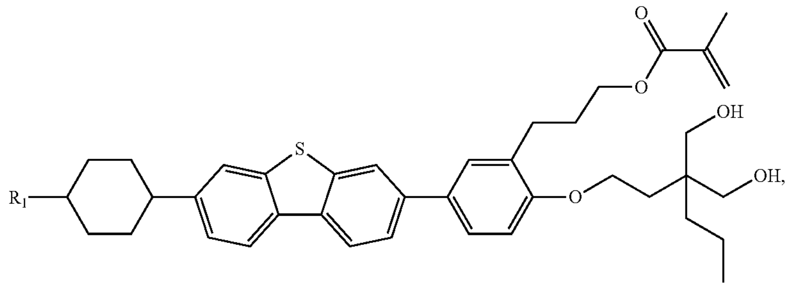
I-19-4
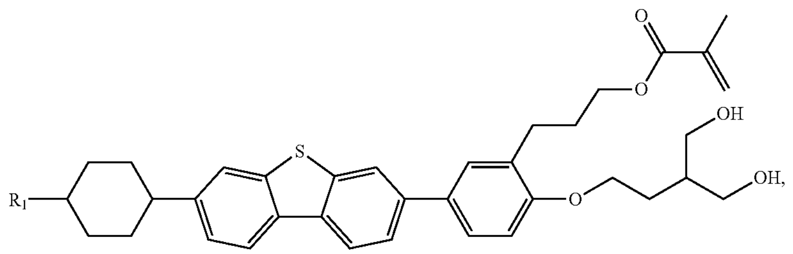

-continued
I-20-1
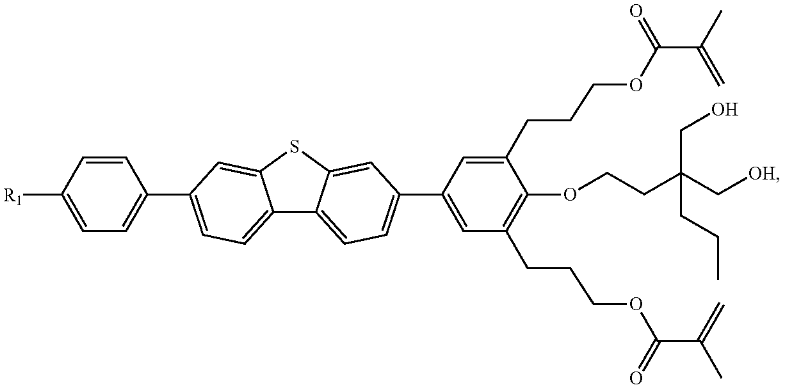
I-20-2
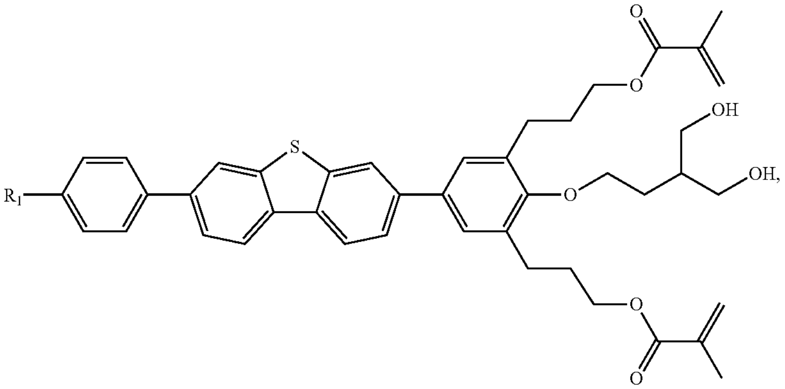
I-20-3
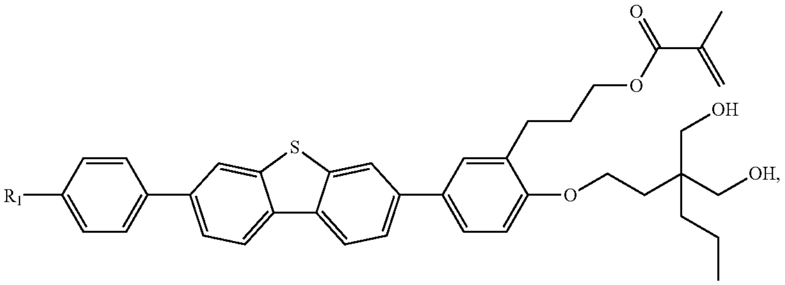
and
I-20-4
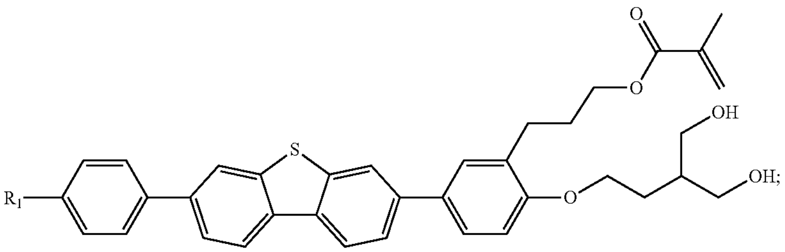
wherein definitions of $R_1$ in formulae I-1-1 to I-20-4 are the same as the definition of $R_1$ in formula I.
6. The liquid crystal composition of claim 1, wherein the self-alignment compound is selected from at least one of a group consisting of the following compounds:

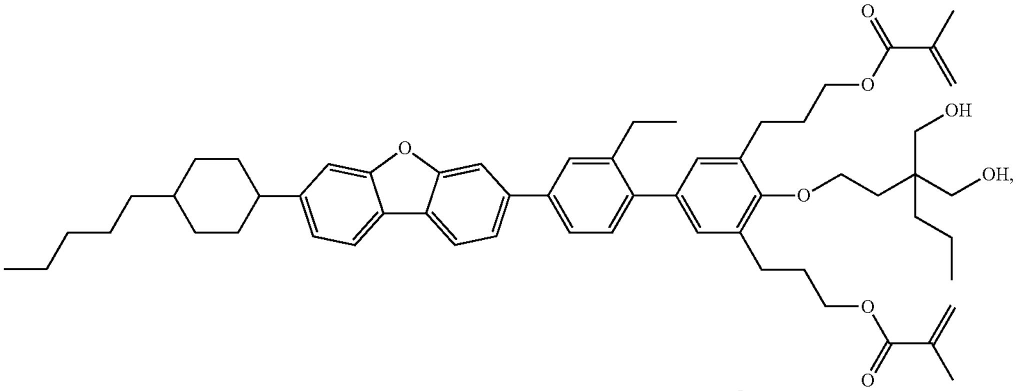
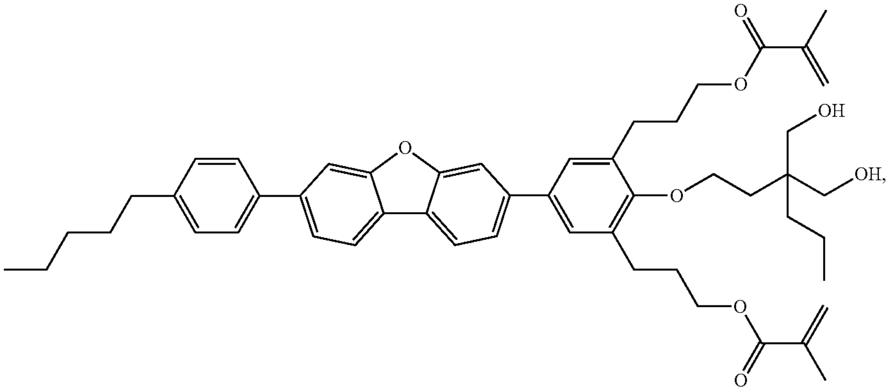
and
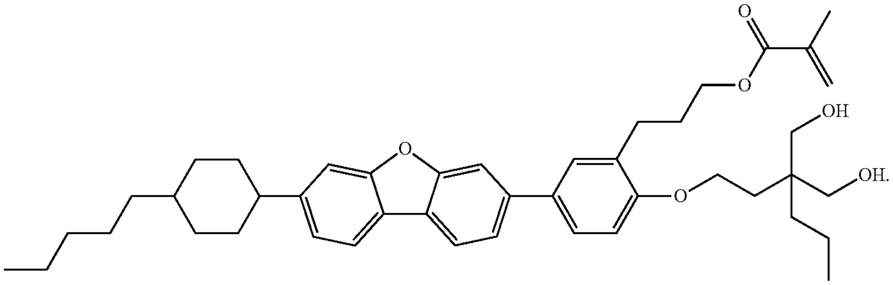
7. The liquid crystal composition of claim 1, wherein the self-alignment compound in the liquid crystal composition ranges from 0.01% to 1.50% by mass.
8. The liquid crystal composition of claim 1, wherein the first polymerizable compound is selected from at least one of a group consisting of the following compounds:
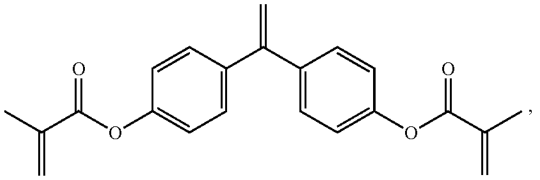
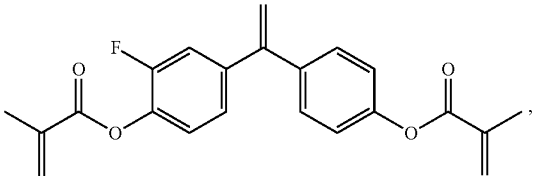
-continued
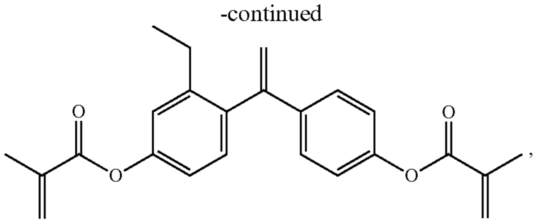
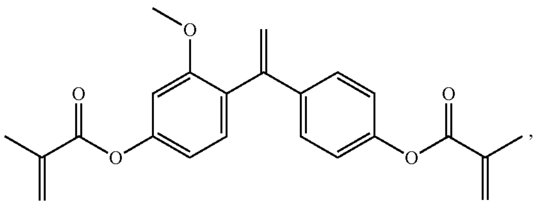

-continued

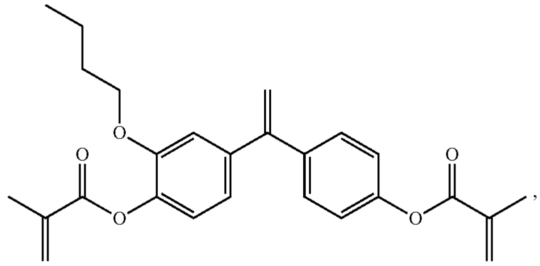

, and

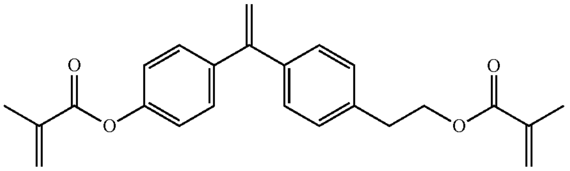

.

9. The liquid crystal composition of claim 1, wherein the first polymerizable compound in the self-alignment compound ranges from 0.01 to 1.20% by mass.

10. The liquid crystal composition of claim 1, wherein the polymerizable compound further comprises a second polymerizable compound represented by the following formula II-2:

(II-2)

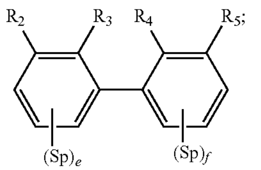

wherein definitions of Sp, $R_2$, $R_3$, $R_4$, and $R_5$, e, and f in formula II-2 are the same as the definitions of Sp, $R_2$, $R_3$, $R_4$, and $R_5$, e, and f in formula II-1.

11. The liquid crystal composition of claim 10, wherein the second polymerizable compound is selected from at least one of a group consisting of the following compounds:

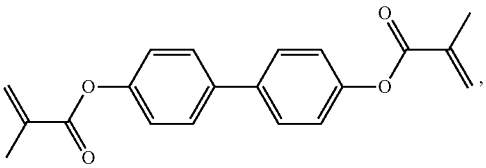

,

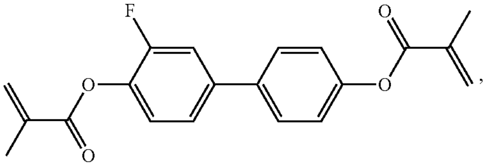

,

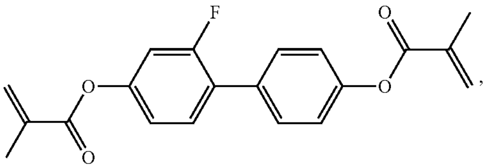

,

-continued

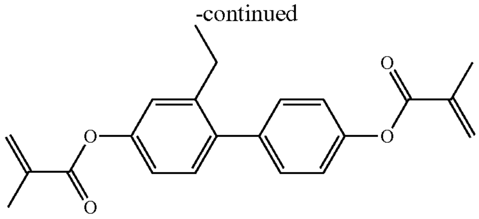

,

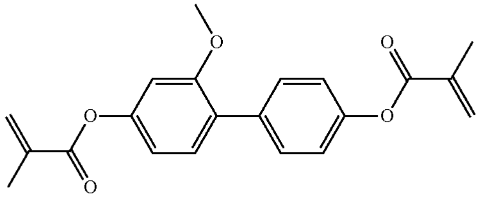

,

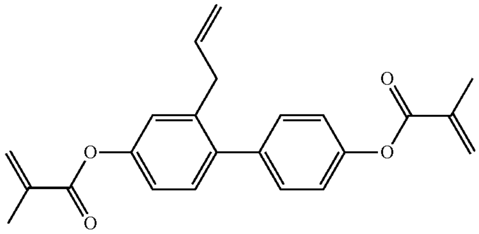

,

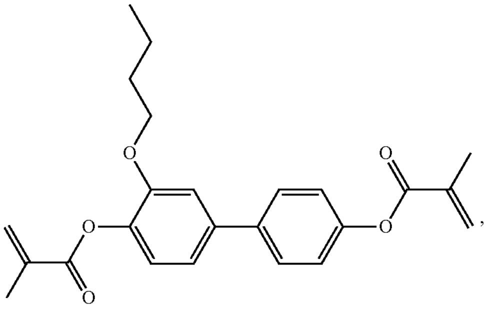

, and

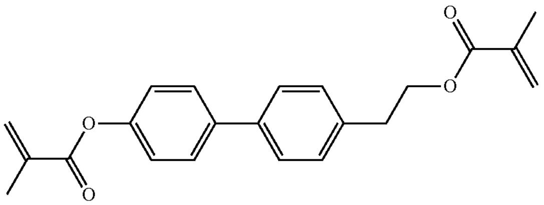

.

12. The liquid crystal composition of claim 10, wherein the second polymerizable compound in the liquid crystal composition ranges from 0.01% to 1.50% by mass.

13. The liquid crystal composition of claim 1, wherein the polymerizable compound further comprises a third polymerizable compound represented by the following formula II-3:

II-3

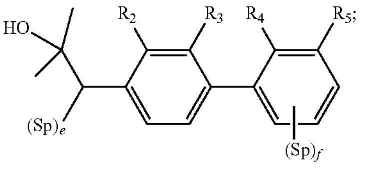

wherein definitions of Sp, $R_2$, $R_3$, $R_4$, and $R_5$, e, and f in formula II-3 are the same as the definitions of Sp, $R_2$, $R_3$, $R_4$, and $R_5$, e, and f in formula II-1.

14. The liquid crystal composition of claim 13, wherein the third polymerizable compound is selected from at least one of a group consisting of the following compounds:

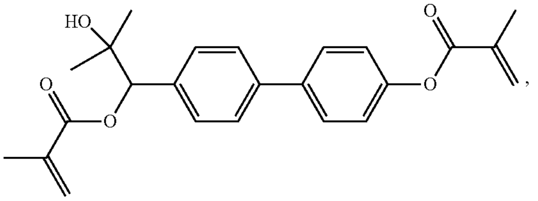

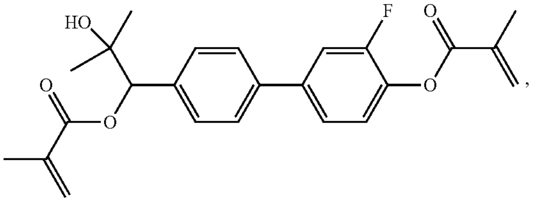

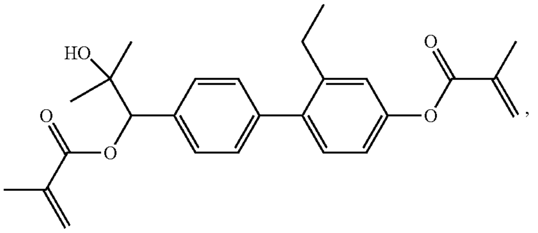

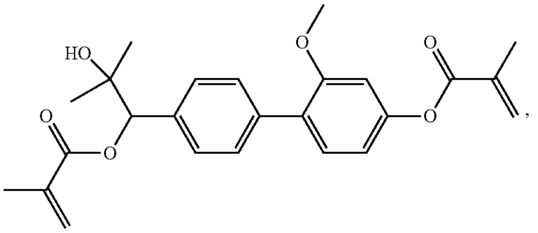

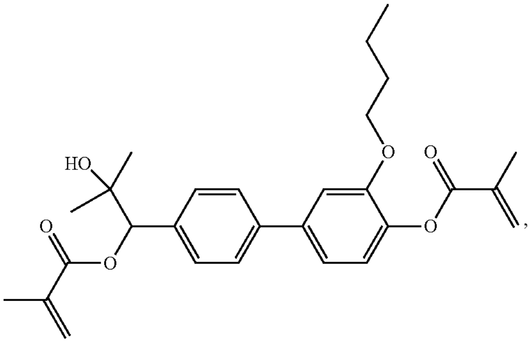

and

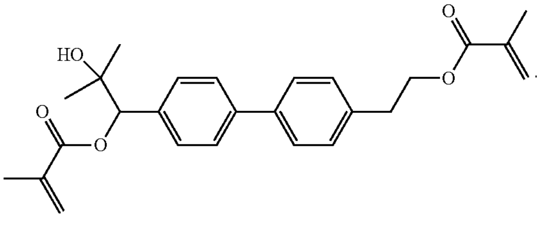

15. The liquid crystal composition of claim 13, wherein the third polymerizable compound in the liquid crystal composition ranges from 0 to 1.20% by mass.

16. The liquid crystal composition of claim 1, wherein the liquid crystal compound is represented by the following formula III:

III

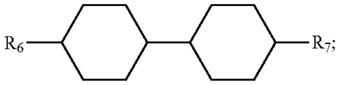

wherein $R_6$ and $R_7$ are independently selected from —H, —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms;

provided that when $R_6$ and $R_7$ have one or more end groups, the one or more end groups in $R_6$ and $R_7$ are not replaced, or, the one or more end groups in $R_6$ and $R_7$ are independently replaced by —CN or —$CF_3$;

provided that when $R_6$ and $R_7$ have one or more —$CH_2$— groups, the one or more —$CH_2$— groups in $R_6$ and $R_7$ are unsubstituted, or, the one or more —$CH_2$— groups in $R_6$ and $R_7$ are independently substituted by —O—, —S—, —CO—, —C(O)O—, —OC(O)—, —CFO—, —$OCF_2$—, —CH—$CH_2$—, —$CH_2O$—, —$OCH_2$—, —CH═CH—, —C≡C—, and heteroatoms therein directly linked to C are not directly linked to each other; and when $R_6$ and $R_7$ have one or more H atoms, the one or more H atoms in $R_6$ and $R_7$ are not replaced, or, the one or more H atoms in $R_6$ and $R_7$ are independently replaced by F, Cl, Br, or I.

17. The liquid crystal composition of claim 16, wherein the liquid crystal compound in the liquid crystal composition ranges from 5% to 70% by mass.

18. The liquid crystal composition of claim 1, wherein the liquid crystal composition further comprises at least one compound selected from at least one of a group consisting of compounds represented by the following formulae IV, V, and VI:

IV

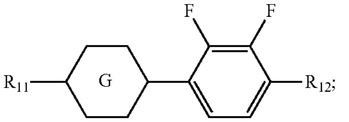

V

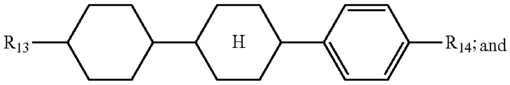

and

VI

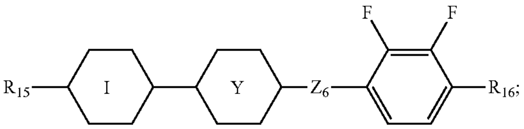

wherein

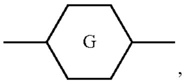

,

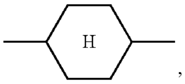

, and

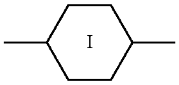

are independently selected from

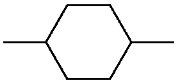

or

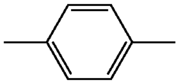

,

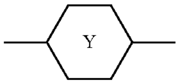

is selected from

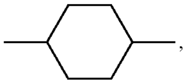

,

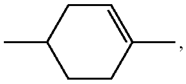

, or

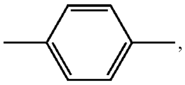

, and one or more —$CH_2$— groups in

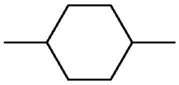

are not replaced or independently replaced by —O—;

$Z_6$ is selected from a single bond, —O—, —S—, —CO—, —C(O)O—, —OC(O)—, —$CF_2$O—, —$OCF_2$—, —$CH_2CH_2$—, —$CH_2$O—, —$OCH_2$—, —CH═CH—, an alkylidene group having 1-10 carbon atoms, an alkenylidene group having 2-10 carbon atoms, or an alkynyl group having 2-10 carbon atoms; provided that when $Z_6$ has one or more —$CH_2$— groups not connected together, the one or more —$CH_2$— groups not connected together in $Z_6$ are unsubstituted, or, the one or more —$CH_2$— groups not connected together in $Z_6$ are independently substituted by —O—, —S—, —CO—, —C(O)O—, —OC(O)—, —$CF_2$O—, —$OCF_2$—, —$CH_2CH_2$—, —CH: O—, —$OCH_2$—, —CH═CH—, or —C≡C—; and when $Z_6$ has one or more H atoms, the one or more H atoms in $Z_6$ are not replaced, or, the one or more H atoms in $Z_6$ are independently replaced by F, Cl, Br, or I; and $R_{11}$, $R_{12}$, $R_{13}$, $R_{14}$, $R_{15}$, and $R_{16}$ are independently selected from —H, —F, —Cl, —Br, —CN, —SCN, —NCS, an alkyl group having 1-10 carbon atoms, an alkoxy group having 1-10 carbon atoms, an alkenyl group having 2-10 carbon atoms, an alkenyloxy group having 2-10 carbon atoms, an alkynyl group having 2-10 carbon atoms, or an alkynyloxy having 2-10 carbon atoms; provided that when $R_{11}$, $R_{12}$, $R_{13}$, $R_{14}$, $R_{15}$, and $R_{16}$ have one or more end groups, the one or more end groups in $R_{11}$, $R_{12}$, $R_{13}$, $R_{14}$, $R_{15}$, and $R_{16}$ are not replaced, or, the one or more end groups in $R_{11}$, $R_{12}$, $R_{13}$, $R_{14}$, $R_{15}$, and $R_{16}$ are independently replaced by —CN or —$CF_3$; when $R_{11}$, $R_{12}$, $R_{13}$, $R_{14}$, $R_{15}$, and $R_{16}$ have one or more —$CH_2$— groups, the one or more —$CH_2$— groups in $R_{11}$, $R_{12}$, $R_{13}$, $R_{14}$, $R_{15}$, and $R_{16}$ are not substituted, or, the one or more —$CH_2$— groups in Rn, $R_{12}$, $R_{13}$, $R_{14}$, $R_{15}$, and $R_{16}$ are independently substituted by —O—, —S—, —CO—, —C(O)O—, —OC(O)—, —$CF_2$O—, —$OCF_2$—, —$CH_2CH_2$—, —$CH_2$O—, —$OCH_2$—, —CH═CH—, or —C≡C—, and heteroatoms therein directly linked to C are not directly linked to each other; and when $R_{11}$, $R_{12}$, $R_{13}$, $R_{14}$, $R_{15}$, and $R_{16}$ have one or more H atoms, the one or more H atoms in $R_{11}$, $R_{12}$, $R_{13}$, $R_{14}$, $R_{15}$, and $R_{16}$ are not replaced, or, the one or more H atoms in $R_{11}$, $R_{12}$, $R_{13}$, $R_{14}$, $R_{15}$, and $R_{16}$ are independently replaced by F, Cl, Br, or I.

19. The liquid crystal composition of claim 18, wherein the liquid crystal composition further comprises at least one compound represented by formula IV, at least one compound represented by formula V, and at least one compound represented by formula VI; and wherein the compound represented by formula IV in the liquid crystal composition ranges from 1% to 30% by mass, the compound represented by formula V in the liquid crystal composition ranges from 1% to 30% by mass, and the compound represented by formula VI in the liquid crystal composition ranges from 1% to 40% by mass.

20. A display panel comprising:

a first substrate;

a second substrate disposed opposite to the first substrate;

a liquid crystal layer disposed between the first substrate and the second substrate;

an alignment layer disposed at least on a side of the first substrate close to the liquid crystal layer, wherein the alignment layer comprises is a polymerization product of the self-alignment compound and the polymerizable compound in the liquid crystal composition as claimed in claim 1, wherein the self-alignment compound is represented by the following formula I, the polymerizable compound comprises a first polymerizable compound, and the first polymerizable compound is represented by the following formula II-1:

I

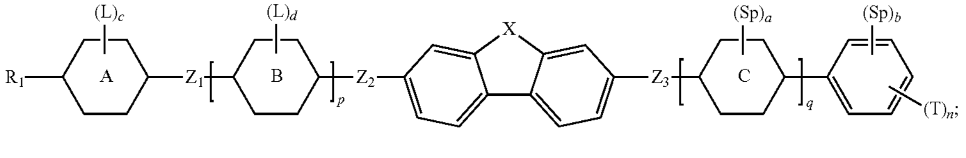

-continued
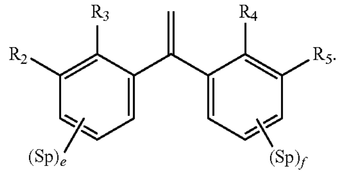
II-1
* * * * *